US012615465B2

(12) United States Patent
Zhang et al.

(10) Patent No.: US 12,615,465 B2
(45) Date of Patent: Apr. 28, 2026

(54) EARPHONES

(71) Applicant: SHENZHEN SHOKZ CO., LTD., Shenzhen (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 152 days.

(21) Appl. No.: 18/432,106

(22) Filed: Feb. 5, 2024

(65) Prior Publication Data

US 2024/0179447 A1 May 30, 2024

Related U.S. Application Data

(63) Continuation of application No. 18/450,371, filed on Aug. 15, 2023, now Pat. No. 11,930,317, which is a (Continued)

(30) Foreign Application Priority Data

Oct. 28, 2022 (CN) ......................... 202211336918.4
Dec. 1, 2022 (CN) ......................... 202223239628.6
Dec. 30, 2022 (WO) ................ PCT/CN2022/144339

(51) Int. Cl.

*H04R 1/10* (2006.01)
*H04R 1/02* (2006.01)
*H04R 1/08* (2006.01)

(52) U.S. Cl.

CPC ............. *H04R 1/1016* (2013.01); *H04R 1/02* (2013.01); *H04R 1/08* (2013.01); *H04R 1/105* (2013.01)

(58) Field of Classification Search

CPC ........ H04R 25/505; H04R 1/025; H04R 1/10; H04R 1/2811; H04R 1/2849; H04R 1/288;

(Continued)

(56) References Cited

U.S. PATENT DOCUMENTS 11,140,469 B1 10/2021 Miller et al.
11,328,702 B1 5/2022 Xiao et al.
(Continued)

FOREIGN PATENT DOCUMENTS

CN 212909891 U 4/2021
CN 113573215 A 10/2021
(Continued)

OTHER PUBLICATIONS

International Search Report in PCT/CN2023/083551 mailed on Jul. 16, 2023, 6 pages.

(Continued)

*Primary Examiner* — Sean H Nguyen
(74) *Attorney, Agent, or Firm* — METIS IP LLC

(57) ABSTRACT

The present disclosure provides an earphone including a sound production component, an ear hook, and a microphone assembly. The microphone assembly includes a first microphone and a second microphone. The sound production component or ear hook includes a first sound hole and a second sound hole corresponding to the first microphone and second microphone, respectively. An extension line of a line connecting a projection of the first sound hole on a sagittal plane of the user and a projection of the second sound hole on the sagittal plane has an intersection point (Continued)

with a projection of an antihelix, a ratio of a first distance between the projection of the first sound hole on the sagittal plane and the projection of the second acoustic hole on the sagittal plane to a second distance between the projection of the second acoustic hole on the sagittal plane and the intersection point is 1.8-4.4.

20 Claims, 24 Drawing Sheets

Related U.S. Application Data continuation of application No. PCT/CN2023/083551, filed on Mar. 24, 2023.

(58) Field of Classification Search
CPC ...... H04R 1/345; H04R 9/066; H04R 1/2876; H04R 17/00; H04R 2460/13; G10K 9/13; G10K 9/22; G10K 11/175; G10K 11/178; G10K 11/26; G10K 2210/3216
USPC .......................................................... 381/151
See application file for complete search history.

(56) References Cited

U.S. PATENT DOCUMENTS

| | | | | |
|---|---|---|---|---|
| 2007/0009133 | A1 | 1/2007 | Gerkinsmeyer | |
| 2012/0020485 | A1 | 1/2012 | Visser et al. | |
| 2016/0134957 | A1 | 5/2016 | Jentz et al. | |
| 2020/0196062 | A1 | 6/2020 | Zhang | |
| 2022/0095029 | A1 * | 3/2022 | Zheng | H04R 1/1008 |
| 2022/0095035 | A1 | 3/2022 | Igarashi et al. | |
| 2022/0103930 | A1 | 3/2022 | Zhang et al. | |
| 2022/0124423 | A1 | 4/2022 | Zheng et al. | |
| 2023/0130211 | A1 | 4/2023 | Li et al. | |
| 2024/0205582 | A1 | 6/2024 | Zhang et al. | |

FOREIGN PATENT DOCUMENTS

| | | | |
|---|---|---|---|
| CN | 113810812 | A | 12/2021 |
| CN | 114286228 | A | 4/2022 |
| CN | 114760554 | A | 7/2022 |
| CN | 115175069 | A | 10/2022 |
| WO | 2021133679 | A1 | 7/2021 |

OTHER PUBLICATIONS

Written Opinion in PCT/CN2023/083551 mailed on Jul. 16, 2023, 8 pages.

The Extended European Search Report in European Application No. 23881095.6 mailed on Jun. 12, 2025, 8 pages.

Decision to Grant a Patent in Japanese Application No. 2024-560782 mailed on Oct. 7, 2025, 6 pages.

* cited by examiner

EARPHONES

CROSS-REFERENCE TO RELATED APPLICATIONS

This application is a continuation of U.S. patent application Ser. No. 18/450,371, filed on Aug. 15, 2023, which is a continuation of International Application No. PCT/CN2023/083551, filed on Mar. 24, 2023, which claims priority of Chinese Patent Application No. 202211336918.4, filled on Oct. 28, 2022, the Chinese application No. 202223239628.6, filed on Dec. 1, 2022, and the PCT application No. PCT/CN2022/144339, filed on Dec. 30, 2022, the contents of each of which are entirely incorporated herein by reference.

TECHNICAL FIELD

The present disclosure relates to the field of acoustic technology, and in particular, to an earphone.

BACKGROUND

With the development of the acoustic output technology, an acoustic device (e.g., an earphone) has been widely used in people's daily life. The acoustic device may be used in conjunction with an electronic device such as a mobile phone, a computer, etc. to provide a user with an auditory feast.

In general, a microphone is disposed on the earphone to pick up the user's voice. A sound collection effect of the microphone depends on how the microphone is disposed on the earphone. How to improve the sound pickup effect of the microphone while ensuring the sound collection effect of the earphone output is an urgent problem to be solved.

SUMMARY

One embodiment of the present disclosure provides an earphone, including: a sound production component; an ear hook configured to place the sound production component near an ear canal of a user without blocking an opening of the ear canal, at least a portion of the sound production component extending into a concha cavity of the user; and a microphone assembly, at least including a first microphone and a second microphone, the first microphone or the second microphone being disposed in the sound production component or the ear hook, the sound production component or the ear hook including a first sound hole and a second sound hole corresponding to the first microphone and the second microphone, respectively; wherein an extension line of a line connecting a projection of the first sound hole on a sagittal plane of the user and a projection of the second sound hole on the sagittal plane may have an intersection point with a projection of an antihelix of the user on the sagittal plane, a first distance may be between the projection of the first sound hole on the sagittal plane and the projection of the second sound hole on the sagittal plane, a second distance may be between the projection of the second sound hole on the sagittal plane and the intersection point, and a ratio of the first distance to the second distance may be 1.8-4.4.

One of the embodiments of the present disclosure further provides an earphone, including: a sound production component; an ear hook configured to place the sound production component near an ear canal of a user without blocking an opening of the ear canal, at least a portion of the sound production component covers an antihelix region of the user; and a microphone assembly, at least including a first microphone and a second microphone, the first microphone or the second microphone being disposed in the sound production component or the ear hook, the sound production component or the ear hook including a first sound hole and a second sound hole corresponding to the first microphone and the second microphone, respectively; wherein an extension line of a line connecting a projection of the first sound hole on a sagittal plane of the user and a projection of the second sound hole on the sagittal plane may have an intersection point with a projection of an inner contour of an auricle of the user on the sagittal plane, a first distance may be between the projection of the first sound hole on the sagittal plane and the projection of the second sound hole on the sagittal plane, a second distance may be between the projection of the second sound hole on the sagittal plane and the intersection point, and a ratio of the first distance to the second distance may be 1.8-4.4.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
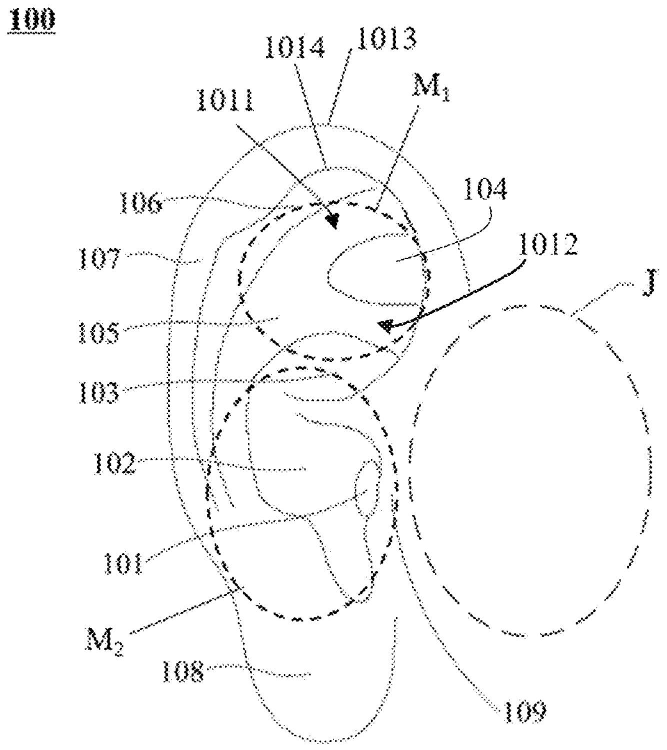
FIG. 1 is a schematic diagram illustrating an exemplary ear according to some embodiments of the present disclosure.

To order to more clearly illustrate the technical solutions related to the embodiments of the present disclosure, a brief introduction of the drawings referred to the description of the embodiments is provided below. Obviously, the drawings described below are only some examples or embodiments of the present disclosure. Those ordinary skilled in the art, without further creative efforts, may apply the present disclosure to other similar scenarios according to these drawings. Unless obviously obtained from the context or the context illustrates otherwise, the same numeral in the drawings refers to the same structure or operation.

FIG. 1 is a schematic diagram illustrating an exemplary ear according to some embodiments of the present disclosure. Referring to FIG. 1, an ear 100 may include an external auditory canal 101, a concha cavity 102, a cymba conchae 103, a triangular fossa 104, an antihelix 105, a scaphoid 106, a helix 107, an earlobe 108, a crus of helix 109, an outer contour 1013, and an inner contour 1014. It should be noted that, for convenience of description, an upper antihelix crus 1011, a lower antihelix crus 1012, and the antihelix 105 are collectively referred to as an antihelix region in the embodiments of the present disclosure. In some embodiments, one or more portions of the ear 100 may support the acoustic device to stabilize the wearing of the acoustic device. In some embodiments, the external auditory canal 101, the concha cavity 102, the cymba conchae 103, the triangular fossa 104, and other portions may have a certain depth and volume in a three-dimensional (3D) space, which may be used to satisfy a wearing requirement of the acoustic device. For example, the acoustic device (e.g., earbuds) may be worn in the external auditory canal 101. In some embodiments, the wearing of the acoustic device may be achieved by using other portions of the ear 100 than the external auditory canal 101. For example, the acoustic device may be worn through the cymba conchae 103, the triangular fossa 104, the antihelix 105, the scaphoid 106, the helix 107, or a combination thereof. In some embodiments, to improve the wearing comfort and reliability of the acoustic device, an earlobe 108 and other portions of the user may be used. By using the portions of the ear 100 other than the external auditory canal 101 to realize the wearing of the acoustic device and the transmission of a sound, the external auditory canal 101 of the user may be "liberated". When the user wears the acoustic device (e.g., the earphone), the acoustic device may not block the external auditory canal 101 of the user, and the user may receive both the sound from the acoustic device and the sound from the environment (e.g., a whistling sound, a car bell, a surrounding voice, a traffic command sound, etc.), which may reduce a probability of traffic accidents. In some embodiments, according to a structure of the ear 100, the acoustic device may be designed into a structure adapted to the ear 100, so as to realize the wearing of the sound production component of the acoustic device at different positions of the ear. For example, when the acoustic device is the earphone, the earphone may include a suspension structure (e.g., an ear hook) and a sound production component physically connected with each other. The suspension structure may match a shape of an auricle, so as to dispose a portion or an entire structure of the sound production component on a front side of the crus of helix 109 (e.g., a region J enclosed by a dotted line in FIG. 1). As another example, when the user wears the earphone, the entire or partial structure of the sound production component may contact an upper portion of the external auditory canal 101 (e.g., the position where one or more of the crus of helix 109, the cymba conchae 103, the triangular fossa 104, the antihelix 105, the scaphoid 106, the helix 107, etc. is located). As another example, when the user wears the earphone, the entire or partial structure of the sound production component may be disposed in a cavity (e.g., a region M1 including at least the cymba conchae 103 and the triangular fossa 104 and a region M2 at least including the concha cavity 102 enclosed by the dotted line in FIG. 1) formed by one or more portions of the ear (e.g., the concha cavity 102, the cymba conchae 103, the triangular fossa 104, etc.).

Different users may have individual differences, resulting in different shapes, sizes, and other dimensional differences of the ears. For the convenience of description and understanding, unless otherwise specified, the present disclosure mainly takes an ear model with a "standard" shape and size for reference, and further describes how the acoustic device in different embodiments is worn on the ear model. For example, a simulator containing a head and the (left and right) ears based on ANSI: S3.36, S3.25 and IEC: 60318-7 standards, such as a GRAS KEMAR, a HEAD Acoustics, a B&K 4128 series, or a B&K 5128 series, may be taken as a reference for wearing the acoustic device to present a situation that most users normally wear the acoustic device. Taking the GRAS KEMAR as an example, the ear simulator may be any one of a GRAS 45AC, a GRAS 45BC, a GRAS 45CC, or a GRAS 43AG. Taking the HEAD Acoustics as an example, the ear simulator may be any one of an HMS II.3, an HMS II.3 LN, or an HMS II.3LN HEC. It should be noted that a range of data measured in the embodiments of the present disclosure is based on the GRAS 45BC KEMAR, but it should be understood that there may be differences between different head models and ear models. There may be a fluctuation of ±10% in the relevant data range. Merely by way of example, a reference ear model may have the following relevant features: a size of a projection of the auricle on a sagittal plane in a vertical axis direction may be in a range of 55 mm-65 mm, and a size of the projection of the auricle on the sagittal plane in a sagittal axis direction may be in a range of 45 mm-55 mm. The projection of the auricle on the sagittal plane refers to the projection of an edge of the auricle on the sagittal plane. The edge of the auricle at least includes an outer contour of the helix, a contour of the earlobe, a contour of a tragus, an intertrack notch, an antitragus tip, a notch between an antitragus and the antihelix, etc. Therefore, in the present disclosure, descriptions such as "worn by the user," "in the wearing state," and "under the wearing state" may mean that the acoustic device described in the present disclosure is worn on the ear of the aforementioned simulator. Of course, considering individual differences of different users, the structure, shape, size, thickness, etc. of one or more portions of the ear 100 may be differentiated in design according to ears with different shapes and sizes. These differentiated designs may be expressed as that feature parameters of one or more portions (e.g., the sound production component, the ear hook, etc. hereinafter) of the acoustic device may have values in different ranges, so as to adapt to different ears.

It should be noted that in the fields of medicine and anatomy, three basic planes including the sagittal plane, a coronal plane, and a horizontal plane as well as three basic axes including the sagittal axis, a coronal axis, and a vertical axis may be used to define a human body. The sagittal plane refers to a section perpendicular to the ground along a front and rear direction of the body, which divides the human body into left and right portions. The coronal plane refers to a section perpendicular to the ground along a left and right direction of the body, which divides the human body into front and rear portions. The horizontal plane refers to a section parallel to the ground along an up and down direction of the body, which divides the human body into upper and lower portions. Correspondingly, the sagittal axis refers to an axis along the front and rear direction of the body and perpendicular to the coronal plane, the coronal axis refers to the axis along the left and right direction of the body and perpendicular to the sagittal plane, and the vertical axis refers to the axis along the up and down direction of the body and perpendicular to the horizontal plane. Further, the front side of the ear in the present disclosure refers to a side of the ear facing a facial region of the human body along the sagittal axis direction. Observing the ear of the above-mentioned simulator along the direction of the coronal axis of the human body, a schematic diagram illustrating a front profile of the ear as shown in FIG. 1 may be obtained.

The above descriptions of the ear 100 are merely provided for the purposes of illustration, and not intended to limit the scope of the present disclosure. For those skilled in the art, various changes and modifications can be made according to the description of the present disclosure. For example, a portion of the acoustic device may cover a portion or an entire structure of the external ear canal 101. These changes and modifications are still within the protection scope of the present disclosure.

Figure 2:
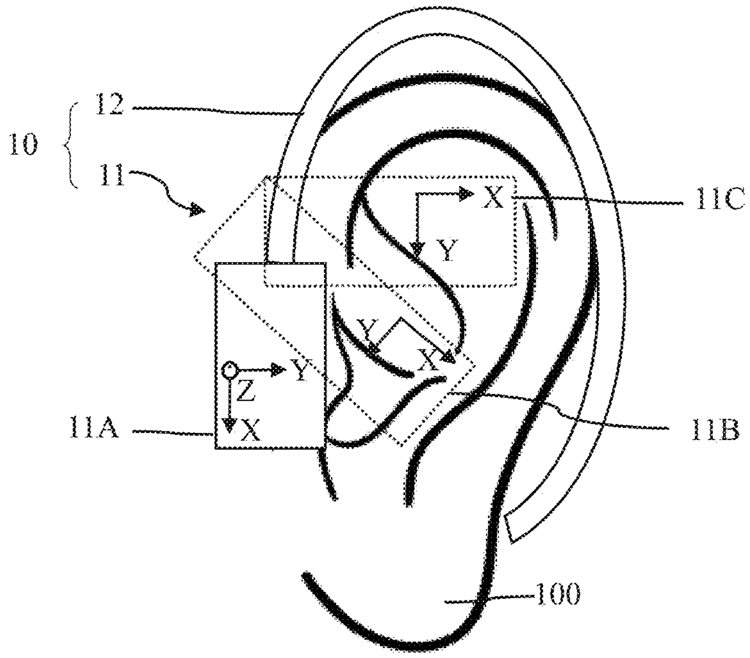
FIG. 2 is a schematic diagram illustrating an exemplary wearing state of an earphone according to some embodiments of the present disclosure.

FIG. 2 is a schematic diagram illustrating an exemplary wearing state of an earphone according to some embodiments of the present disclosure. As shown in FIG. 2, an earphone 10 may include a sound production component 11 and a suspension structure 12. In some embodiments, the sound production component 11 of the earphone 10 may be worn on the user's body (e.g., a head, a neck, or an upper torso of a human body) through the suspension structure 12. In some embodiments, the suspension structure 12 may be an ear hook. The sound production component 11 is connected to one end of the ear hook, and the ear hook may have a shape adapted to the user's ear. For example, the ear hook may have an arc-shaped structure. In some embodiments, the suspension structure 12 may further be a clamping structure adapted to the user's auricle such that the suspension structure 12 may be clamped at the user's auricle. In some embodiments, the suspension structure 12 may include but is not limited to an ear hook, an elastic band, etc., such that the earphone 10 may be better hung on the user, which may prevent the earphone 10 from falling during use.

In some embodiments, the sound production component 11 may be worn on the user's body. A speaker may be disposed in the sound production component 11 and generate a sound to input to the user's ear 100. In some embodiments, the earphone 10 may be combined with products such as glasses, headsets, head-mounted display devices, augmented reality (AR)/virtual reality (VR) helmets, etc. In such cases, the sound production component 11 may be worn near the user's ear 100 in a hanging or clipping manner. In some embodiments, the sound production component 11 may be circular, elliptical, polygonal (regular or irregular), U-shaped, V-shaped, or semicircular such that the sound production component 11 may be directly attached to the user's ear 100.

Combining FIGS. 1 and 2, in some embodiments, when the user wears the earphone 10, at least a portion of the sound production component 11 may be placed in a region J on a front side of the tragus of the user's ear 100 shown in FIG. 1, or in a region M1 and a region M2 on an anterolateral side of the auricle. Exemplary descriptions may be given below in conjunction with different wearing positions (11A, 11B, and 11C) of the sound production component 11. It should be noted that the anterolateral side of the auricle mentioned in the embodiments of the present disclosure refers to a side of the auricle away from the head along the coronal axis. Correspondingly, a posterior inner side of the auricle refers to a side of the auricle toward the head along the coronal axis. In some embodiments, the sound production component 11A may be placed on a side of the user's ear 100 facing the facial region of the human body along the sagittal axis. That is, the sound production component 11A may be placed in the facial region J of the human body on the front side of the ear 100. Further, the speaker is provided inside a housing of the sound production component 11A, and at least one sound guiding hole (not shown in FIG. 2) may be disposed on the housing of the sound production component 11A. The sound guiding hole may be disposed on a side wall of the housing of the sound production component toward or close to the external auditory canal 101 of the user. The speaker may output sound to the external auditory canal 101 of the user through the sound guiding hole. In some embodiments, the speaker may include a diaphragm. A cavity inside the housing of the sound production component 11 may be divided into at least a front cavity and a rear cavity by the diaphragm. The sound guiding hole may be acoustically coupled with the front cavity, and a vibration of the diaphragm drives air in the front cavity to vibrate to generate an air conduction sound. The air conduction sound generated in the front cavity may be transmitted to the outside through the sound guiding hole. In some embodiments, the housing of the sound production component 11 may further include one or more pressure relief holes. The pressure relief hole(s) may be disposed on the side wall of the housing adjacent to or opposite to the side wall where the sound output is disposed. The pressure relief hole may be acoustically coupled with the rear cavity. When the diaphragm vibrates, the air in the rear cavity may be driven to vibrate to generate an air conduction sound. The air conduction sound generated in the rear cavity may be transmitted to the outside through the pressure relief hole. In some embodiments, the speaker in the sound production component 11A may output sounds with a phase difference (e.g., opposite phases) through the sound guiding hole and the pressure relief hole, respectively. The sound guiding hole may be disposed on the side wall of the housing of the sound production component 11A toward the external auditory canal 101 of the user. The pressure relief hole may be disposed on the side of the housing of the sound production component 11 away from the external auditory canal 101 of the user. In such cases, the housing may be used as a baffle to increase a sound path difference between the sound guiding hole and the pressure relief hole, thereby increasing a sound intensity at the external auditory canal 101 while reducing a volume of a sound leakage in a far field. In some embodiments, the sound production component 11 may have a long axis direction X and a short axis direction Y perpendicular to a thickness direction Z and orthogonal to each other. The long axis direction X may be defined as a direction with the greatest extension size in shapes (e.g., when the shape of the projection is rectangular or approximately rectangular, the long axis direction is a length direction of the rectangle or the approximate rectangle) of two-dimensional (2D) projections (e.g., a projection of the sound production component 11 on the plane where the outer side of the sound production component 11 is located, or a projection of the sound production component 11 on the sagittal plane) of the sound production component 11. The short axis direction Y may be defined as a direction perpendicular to the long axis X in the shape of the projection of the sound production component 11 on the sagittal plane (e.g., when the shape of the projection is rectangular or approximately rectangular, the short axis direction is a width direction of the rectangle or the approximate rectangle). The thickness direction Z may be defined as a direction perpendicular to the 2D projection plane. For example, the thickness direction Z may be consistent with the direction of the coronal axis, which both point to the left and right direction of the body. In some embodiments, when the sound production component 11 is inclined in the wearing state, the long axis direction X and the short axis direction Y may be still parallel or approximately parallel to the sagittal plane, and the long axis direction X may have a certain angle with the sagittal axis direction. That is, the long axis direction X may be inclined accordingly. And the short axis direction Y may have a certain angle with the direction of the vertical axis, that is, the short axis direction Y may be inclined, as the sound production component 11B shown in FIG. 2. In some embodiments, a portion or an entire structure of the sound production component 11B may extend into the concha cavity. That is, a projection of the sound production component 11B on the sagittal plane and a projection of the concha cavity on the sagittal plane have an overlapping part. More description regarding the sound production component 11B may be found elsewhere in the present disclosure, for example, FIG. 3 and relevant descriptions thereof. In some embodiments, the sound production component 11 may be in a horizontal state or an approximately horizontal state in the wearing state, as the sound production component 11C shown in FIG. 2, the long axis direction X may be consistent with or approximately consistent with the sagittal axis direction, which both point to the front and rear direction of the body, and the short axis Y direction may be consistent with or approximately consistent with the vertical axis direction, which both point to the up and down direction of the body. It should be noted that in the wearing state, the sound production component 11C being in an approximately horizontal state refers to that an angle between the long axis direction X of the sound production component 11C shown in FIG. 2 and the sagittal axis is within a specific range (e.g., not greater than 20°). In addition, the wearing position of the sound production component 11 is not limited to positions of the sound production component 11A, the sound production component 11B, and the sound production component 11C shown in FIG. 2. Any position within the region J, the region M1, or the region M2 may be the wearing position of the sound production component 11. For example, a portion or an entire structure of the sound production component 11 may be placed in the region J enclosed by the dotted line in FIG. 1. As another example, or a portion or an entire structure of the sound production component may be in contact with one or more portions such as the crus of helix 109, the cymba conchae 103, the triangular fossa 104, the antihelix 105, the scaphoid 106, and the helix 107 of the ear 100. As another example, a portion or an entire structure of the sound production component 11 may be placed in a cavity (e.g., the region M1 enclosed by the dotted line at least including the cymba conchae 103 and the triangular fossa 104, and the region M2 enclosed by the dotted line at least including the concha cavity 102 shown in FIG. 1) formed by one or more portions of the ear 100 (e.g., the concha cavity 102, the cymba conchae 103, the triangular fossa 104, etc.).

To improve a stability of the earphone 10 in the wearing state, the earphone 10 may adopt any one or a combination of the following modes. First, the suspension structure 12 is at least partially configured as a profiled structure that fits at least one of the posterior inner side of the auricle and the head, so as to increase a contact area between the suspension structure 12 and the ear and/or the head, thereby increasing a resistance preventing the earphone 10 from falling off from the ear. Second, the suspension structure 12 is at least partially configured as an elastic structure such that the suspension structure 12 may have a certain deformation in the wearing state, so as to increase a positive pressure of the suspension structure 12 on the ear and/or the head, thereby increasing the resistance preventing the earphone 10 from falling off from the ear. Third, the suspension structure 12 is at least partially configured to lean against the ear and/or the head in the wearing state such that the suspension structure 12 forms a reaction force that presses the ear, making the sound production component 11 press on the anterolateral side of the auricle (e.g., the region M1 and the region M2 shown in FIG. 1), thereby increasing the resistance preventing the earphone 10 from falling off from the ear. Fourth, the sound production component 11 and the suspension structure 12 may be configured to clamp the antihelix region, the region where the concha cavity is located, etc. from the anterolateral side and the posterior inner side of the auricle in the wearing state, thereby increasing the resistance preventing the earphone 10 from falling off from the ear. Fifth, at least a portion of the sound production component 11 or a structure connected thereto is configured to extend into cavities such as the concha cavity 102, the cymba conchae 103, the triangular fossa 104, the scaphoid 106, etc., thereby increasing the resistance preventing the earphone 10 from falling off from the ear.

Figure 3:
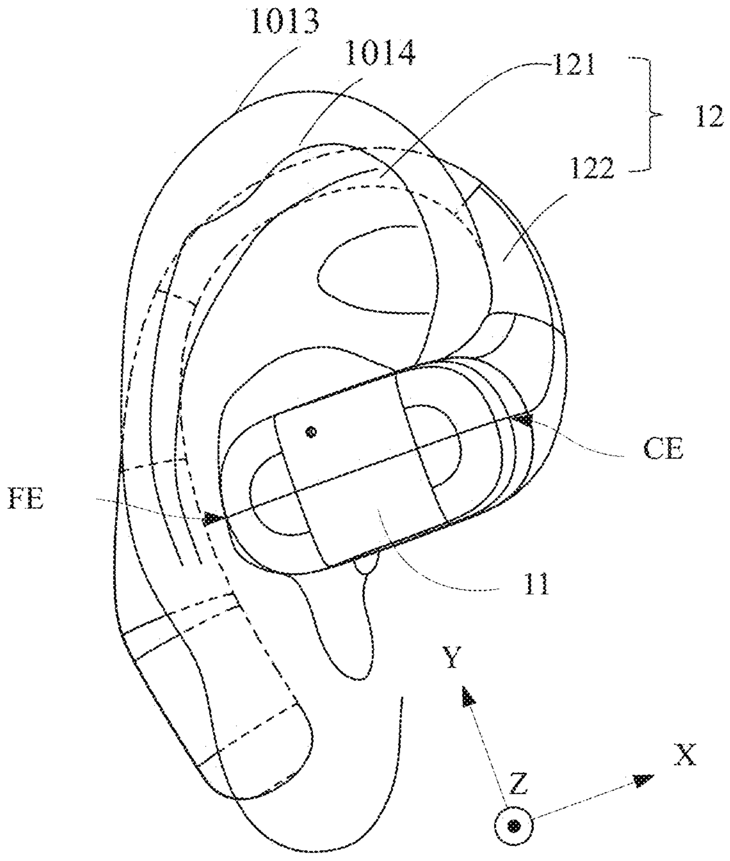
FIG. 3 is a schematic diagram illustrating a sound production component of an earphone protruding into a concha cavity in a wearing state according to some embodiments of the present disclosure.

Merely by way of example, with reference to FIG. 3, in the wearing state, an end FE (also referred to as a free end) of the sound production component 11 may extend into the concha cavity. Optionally, the sound production component 11 and the suspension structure 12 may be configured to clamp the ear region corresponding to the concha cavity from the front and rear sides of the ear region, thereby increasing the resistance preventing the earphone 10 from falling off from the ear, and improving the stability of the earphone 10 in the wearing state. For example, the end FE of the sound production component may be pressed in the concha cavity in the thickness direction Z. As another example, the end FE may abut against the concha cavity in the long axis direction X and/or the short axis direction Y (e.g., abut against an inner wall of the concha cavity opposite to the end FE). It should be noted that the end FE of the sound production component 11 refers to an end of the sound production component 11 opposite to a fixed end connected to the suspension structure 12. The end FE is also referred to as the free end. The sound production component 11 may be a regular or irregular structure. To further illustrate the end FE of the sound production component 11, exemplary descriptions are given as follows. For example, when the sound production component 11 has a cuboid structure, an end wall of the sound production component 11 is a plane, and the end FE of the sound production component 11 is an end side wall opposite to the fixed end connected to the suspension structure 12 in the sound production component 11. As another example, when the sound production component 11 is a sphere, an ellipsoid, or an irregular structure, the end FE of the sound production component 11 refers to a specific region away from the fixed end obtained by cutting the sound production component 11 along a Y-Z plane (a plane formed by the short axis direction Y and the thickness direction Z). A ratio of a size of the specific region along the long axis direction X to a size of the sound production component along the long axis direction X may be 0.05-0.2.

Figure 4:
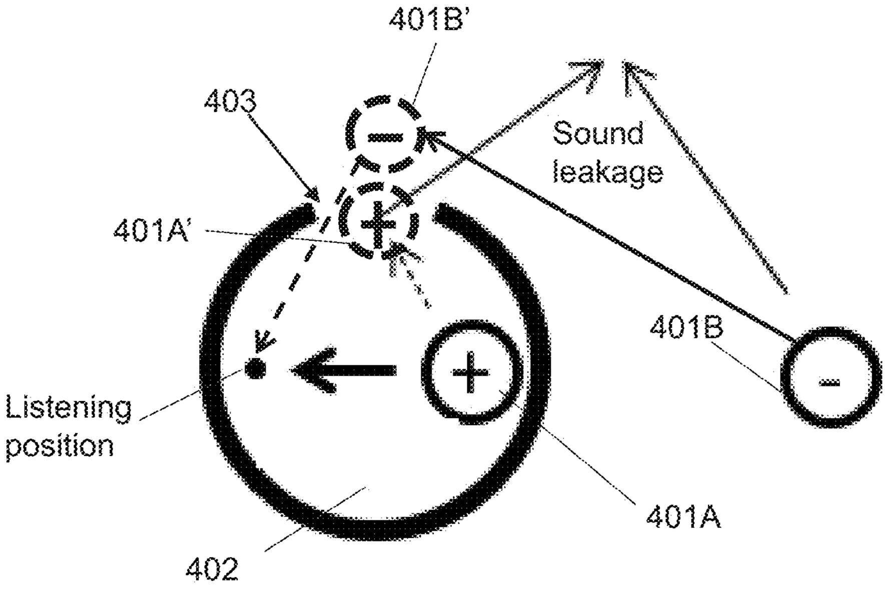
FIG. 4 is a schematic diagram illustrating an acoustic model of a cavity-like structure according to some embodiments of the present disclosure.

By at least partially extending the sound production component 11 into the concha cavity, a listening volume at a listening position (e.g., at an opening of the ear canal), especially the listening volume at middle and low frequencies, may be improved and a good far-field sound leakage canceling effect may be obtained. For illustration purposes only, when a portion or an entire structure of the sound production component 11 extends into the concha cavity 102, the sound production component 11 and the concha cavity 102 may form a structure similar to a cavity (hereinafter referred to as a cavity-like structure). In the embodiments of the present disclosure, the cavity-like structure may be understood as a semi-closed structure surrounded by the side wall of the sound production component 11 and the concha cavity 102. In the semi-closed structure, the listening position (e.g., the opening of the ear canal) is not completely sealed off from the external environment, instead, there is a leaky structure (e.g., an opening, a gap, a pipe, etc.) in an acoustic communication with the external environment. When the user wears the earphone 10, one or more sound guiding holes may be provided on the housing of the sound production component 11 near or toward the user's ear canal, and other side walls of the housing of the sound production component 11 (e.g., a side wall away from or facing away from the user) are provided with one or more pressure relief holes. The one or more sound guiding holes are acoustically coupled with the front cavity of the earphone 10, and the one or more pressure relief holes are acoustically coupled with the rear cavity of the earphone 10. Taking the sound production component 11 including one sound guiding hole and one pressure relief hole as an example, the sound output from the sound guiding hole and the sound output from the pressure relief hole may be approximately regarded as with two sound sources. Phases of sounds from the two sound sources are opposite to form a dipole. The sound production component 11 and the inner wall of the concha cavity 102 corresponding to the sound production component 11 form the cavity-like structure. The sound source corresponding to the sound guiding hole is disposed in the cavity-like structure, and the sound source corresponding to the pressure relief hole is disposed outside the cavity-like structure. In such cases, an acoustic model shown in FIG. 4 is formed. As shown in FIG. 4, a cavity-like structure 402 may include a listening position and at least one sound source 401A. The "include" here may indicate that at least one of the listening position and the sound source 401A is inside the cavity-like structure 402, or at least one of the listening position and the sound source 401A is at an inner edge of the cavity-like structure 402. The listening position may be equivalent to the opening of the ear canal of the ear, or the listening position may be an acoustic reference point of the ear, such as an ear reference point (ERP), a drumhead reference point (DRP), etc., or the listening position may be an entrance structure leading to a listener, etc. The sound source 401B is disposed outside the cavity-like structure 402. The sound sources 401A and 401B with opposite phases form the dipole. The dipole respectively radiates sounds to the surrounding space, and the sounds interfere and cancel each other to to reduce or eliminate the sound leakage. Since a sound path difference between the two sounds is relatively great at the listening position, a sound canceling effect is relatively insignificant, and a louder sound may be heard at the listening position than at other positions. Specifically, since the sound source 401A is surrounded by the cavity-like structure 402, most of the sound radiated from the sound source 401A may reach the listening position through a direct radiation or a reflection. In contrast, without the cavity-like structure 402, most of the sound radiated from the sound source 401A may not reach the listening position. Therefore, the cavity-like structure 402 may significantly increase the sound volume reaching the listening position. Furthermore, only a small portion of the sound with an opposite phase radiated from the sound source 401B outside the cavity-like structure 402 enters the cavity-like structure 402 through a leakage structure 403 of the cavity-like structure 402, which is equivalent to generating a secondary sound source 401B' at the leakage structure 403. An intensity of the secondary sound source 401B' is significantly smaller than the sound source 401B, and also significantly smaller than the sound source 401A. The sound produced by the secondary sound source 401B' has a weak canceling effect on the sound source 401A in the cavity, which significantly increases the listening volume at the listening position. For the sound leakage, the sound source 401A radiates sound to the outside through the leakage structure 403 of the cavity, which is equivalent to generating a secondary sound source 401A' at the leakage structure 403. Since almost all the sounds radiated by the sound source 401A are output from the leakage structure 403, and the size of the cavity-like structure 402 is much smaller than a spatial size for evaluating the sound leakage (a difference between the size of the cavity-like structure 402 and the spatial size is at least one order of magnitude), an intensity of the secondary sound source 401A' may be considered equivalent to an intensity of the sound source 401A. For the external space, the canceling effect between sounds generated by the secondary sound source 401A' and the sound source 401B is equivalent to the canceling effect between sounds generated by the sound source 401A and the sound source 401B. That is, a considerable sound leakage reduction effect is maintained using a cavity-like structure.

In a specific application scenario, the outer wall of the housing of the sound production component 11 is usually a plane or a curved surface, while a contour of the concha cavity is an uneven structure. When a portion or an entire structure of the sound production component 11 extends into the concha cavity, the sound production component 11 and the contour of the concha cavity form a cavity-like structure that communicates with the outside. Further, the sound guiding hole may be disposed at a position of the housing of the sound production component toward the opening of the user's ear canal and near an edge of the concha cavity, and the pressure relief hole may be disposed at a position of the sound production component 11 facing away from or away from the opening of the ear canal. In such cases, the acoustic model shown in FIG. 4 may be obtained, which may improve a listening volume at the opening of the ear canal of the user when the user wears the earphone, and reduce the far-field sound leakage.

Figure 5:
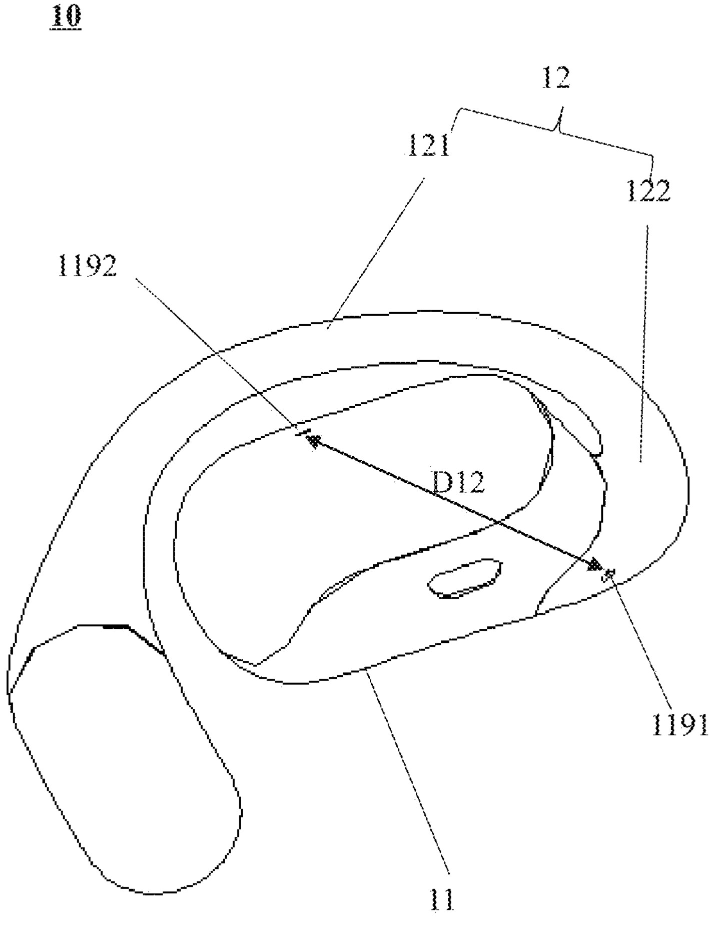
FIG. 5 is a schematic diagram illustrating an exemplary structure of an earphone according to some embodiments of the present disclosure.

FIG. 5 is a schematic diagram illustrating an exemplary structure of an earphone according to some embodiments of the present disclosure.

Referring to FIG. 5, the earphone 10 may include the sound production component 11 and the suspension structure 12. In some embodiments, the sound production component 11 of the earphone 10 may include a transducer and a housing for accommodating the transducer. The transducer may be an element capable of receiving an electrical signal and converting the electrical signal into an audio signal for output. In some embodiments, differentiated by frequency, types of the transducer may include a low frequency (e.g., 30 Hz-150 Hz) speaker, a mid-low frequency (e.g., 150 Hz-500 Hz) speaker, a mid-high frequency (e.g., 500 Hz-5 kHz) speaker, a high frequency (e.g., 5 kHz-16 kHz) speaker, a full range (e.g., 30 Hz-16 kHz) speaker, or any combination thereof. The low frequency, the high frequency, etc. mentioned here only represent an approximate range of the frequency. In different application scenarios, there may be different division manners. For example, a frequency division point may be determined. The low frequency may represent a frequency range below the frequency division point, and the high frequency may represent frequencies above the frequency division point. The frequency division point may be any value within an audible range of a human ear, for example, 500 Hz, 600 Hz, 700 Hz, 800 Hz, 1000 Hz, etc.

In some embodiments, the transducer may include a diaphragm. When the diaphragm vibrates, sounds may be transmitted from a front side and a rear side of the diaphragm, respectively. In some embodiments, a front cavity (not shown) for transmitting the sounds is provided at the front side of the diaphragm in the housing. The front cavity is acoustically coupled with a sound guiding hole, and the sound on the front side of the diaphragm may be emitted from the front cavity through the sound guiding hole. A rear cavity (not shown) for transmitting the sounds is provided at the rear side of the diaphragm in the housing. The rear cavity is acoustically coupled with the pressure relief hole, and the sound on the rear side of the diaphragm may be emitted from the rear cavity through the pressure relief hole.

Referring to FIG. 5, in the present disclosure, taking the ear hook being the suspension structure 12 as an example for illustration, in some embodiments, the ear hook may include a first portion 121 and a second portion 122 connected in sequence. The first portion 121 may be hung between the posterior inner side of the auricle and the head of the user, and the second portion 122 may extend towards an anterolateral side of the auricle (a side of the auricle facing away from the human head along a coronal axis) and connect the sound production component 11 such that the sound production component 11 may be placed near the user's ear canal without blocking the opening of the ear canal. In some embodiments, the sound guiding hole may be disposed on the side wall of the housing of the sound production component 11 facing the auricle such that the sound generated by the transducer is guided out of the housing and transmitted to the opening of the ear canal. In some embodiments, when the user wears the earphone 10, at least a portion of the sound production component 11 may extend into the user's concha cavity (e.g., a position of the sound production component 11B relative to the ear shown in FIG. 2), thus forming the cavity-like structure to improve a listening volume at the opening of the ear canal.

In some embodiments, the earphone 10 may further include a microphone for collecting acoustic signals (such as a user voice, an ambient sound, etc.). The microphone may be disposed in the ear hook or in the sound production component. The sound production component or the ear hook may include a sound hole in an acoustic communication with the microphone. In some embodiments, the earphone 10 may include a microphone assembly, and the microphone assembly may include a first microphone and a second microphone. The first microphone and the second microphone may respectively collect the sound signals such as the user voice, the ambient sound, etc. at corresponding positions thereof. In some embodiments, the first microphone and the second microphone may be disposed in the sound production component 11. In some embodiments, the first microphone and the second microphone may be disposed in the ear hook. In some embodiments, one of the first microphone and the second microphone may be disposed in the ear hook, and the other may be disposed in the sound production component 11. The following will be described in conjunction with FIG. 5 as an example. As shown in FIG. 5, the first microphone (not shown in FIG. 5) is disposed in the ear hook, and a first sound hole 1191 in an acoustic communication with the first microphone is disposed on the ear hook. The second microphone (not shown in FIG. 5) is disposed in the sound production component 11. A second sound hole 1192 is disposed on the sound production component 11 and is in an acoustic communication with the second microphone. When the user wears the earphone, neither the first sound hole 1191 nor the second sound hole 1192 are blocked, so as to receive sound information when the user speaks or the sound information of the outside. In some embodiments, the first sound hole 1191 and the second sound hole 1192 may be a dual-hole structure. For example, a count of the first sound holes 1191 is two, the first microphone corresponds to the two first sound holes 1191, and the two first sound holes 1191 communicate with each other inside the ear hook or the sound production component. When there is a pressure fluctuation caused by an airflow velocity in the external environment, since the first sound hole 1191 and the second sound hole 1192 are configured as a dual hole structure, a pressure balance between the first sound holes 1191 and the second sound holes 1192 may be achieved on the outside (an outer side of the ear hook or the sound production component where the sound holes are disposed), and then the pressure fluctuation may be transferred to the inside of the first sound hole 1191 and the second sound hole 1192. Since an inner central axis of the first sound hole 1191 and the second sound hole 1192 are perpendicular to an airflow direction, the pressure fluctuation may be reduced, and a wind noise caused by the pressure fluctuation may be correspondingly reduced. In such cases, the first microphone, the second microphone, as well as the first sound hole 1191 in the acoustic communication with the first microphone, and the second sound hole 1192 in the acoustic communication with the second microphone may reduce the wind noise. In some embodiments, the first sound hole 1191 and the second sound hole 1192 may have regular shapes such as circular holes, square holes, elliptical holes, and diamond holes, or irregular shapes. The shape of the first sound hole 1191 may be the same as or different from the shape of the second sound hole 1192.

Figure 6:
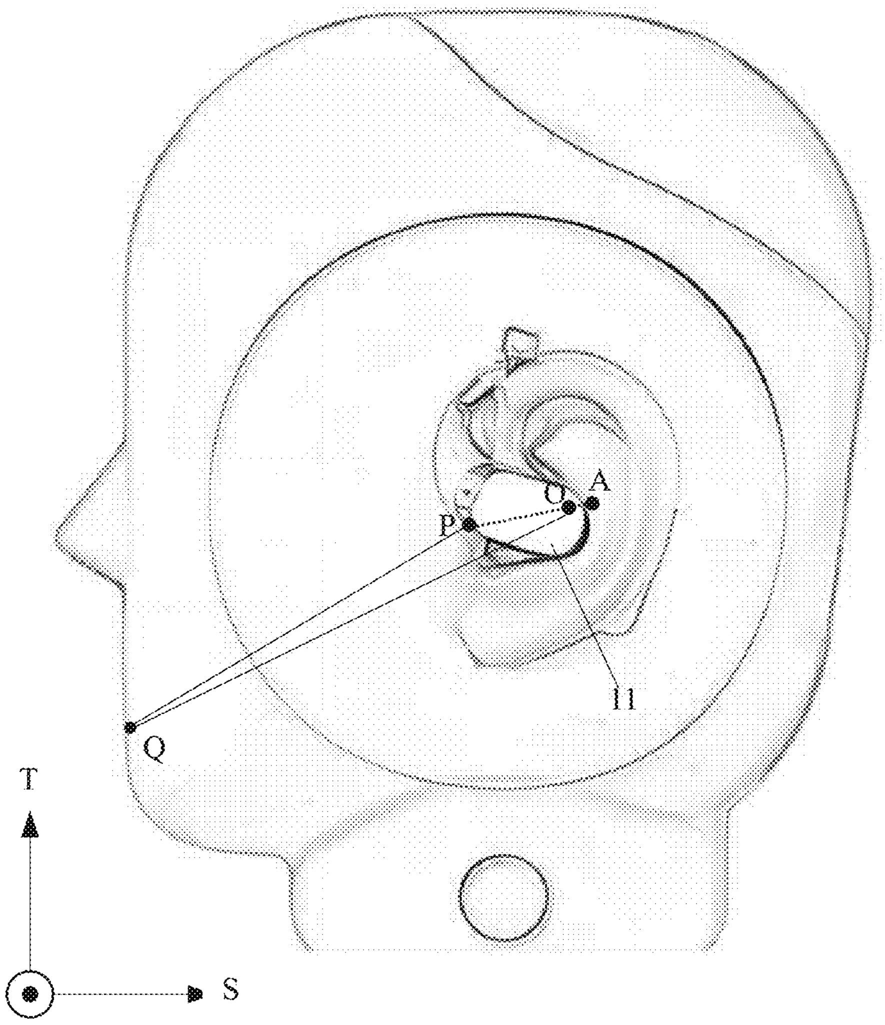
FIG. 6 is a schematic diagram illustrating an exemplary wearing state of an earphone according to some embodiments of the present disclosure.

FIG. 6 is a schematic diagram illustrating an exemplary wearing state of an earphone according to some embodiments of the present disclosure.

Referring to FIG. 5 and FIG. 6, in some embodiments, when the earphone 10 is in the wearing state, at least a portion of the sound production component 11 may extend into the concha cavity of the user. In some embodiments, a line connecting the first sound hole 1191 and the second sound hole 1192 may point to the user's mouth such that a first microphone and a second microphone have a good sound collection effect. In some embodiments, in the wearing state, the first sound hole 1191 may be disposed at a position closest to the mouth on the earphone 10, so as to improve the sound collection effect when the first microphone collects the sound from the user's mouth. Both the first sound hole 1191 and the second sound hole 1192 are relatively close to the user's mouth such the sound from the user's mouth is a near-field sound for the first microphone and the second microphone. In addition, the distance from the first sound hole 1191 to the user's mouth is different from the distance from the second sound hole 1192 to the user's mouth such that there is a difference between the sound received by the first microphone and the sound received by the second microphone from the user's mouth (e.g., difference in amplitudes or phases of the sounds). Noise from the environment may be regarded as far-field sound for the first microphone and the second microphone, and the noises received by the first microphone and the second microphone are approximately the same (e.g., the amplitudes or phases of the noises are approximately the same). Then a better human voice effect after a noise cancellation may be obtained by subtracting a signal received by the second microphone from the signal received by the first microphone and then amplifying the signal subtracted. In such cases, a certain distance needs to be disposed between the first sound hole 1191 and the second sound hole 1192 for a subsequent signal processing. When the earphone 10 is in the wearing state, at least a portion of the sound production component 11 extends into the concha cavity. On the premise that the first sound hole 1191 is placed close to the user's mouth and a certain distance is between the first sound hole 1191 and the second sound hole 1192, the second sound hole 1192 may be closer to the antihelix. As a result, when a sound wave generated by the user's speech or an external sound wave is transmitted to the antihelix, the antihelix may have a reflection effect on the sound wave, especially in a frequency range of 3 kHz-8 kHz, resulting in that the sound received by the second microphone is greater than the sound received by the first microphone, which may affect the noise reduction and the sound collection effect. Based on the above problem, in some embodiments, the distance between the first sound hole 1191 and the second sound hole 1192 and a distance between the second sound hole 1192 and an edge of the antihelix of the user may be adjusted to ensure the noise reduction effect and the sound collection effect of the earphone. As shown in FIG. 6, when the earphone 10 is in the wearing state, the first sound hole 1191 may have a first projection point P on the sagittal plane of the user (such as the T-S plane shown in FIG. 6), and the second sound hole 1192 may have a second projection point O on the sagittal plane. In some embodiments, to more clearly describe the position relationship between the first sound hole 1191, the second sound hole 1192, and the antihelix of the user's auricle, the distance between the first sound hole 1191 and the second sound hole 1192 may be reflected by a first distance OP between the first projection point P of the first sound hole 1191 on the sagittal plane and the second projection point O of the second sound hole 1192 on the sagittal plane. In some embodiments, an extension line of a line connecting the first projection point P of the first sound hole on the sagittal plane of the user and the second projection point O of the second sound hole on the sagittal plane has an intersection point A with the projection of the antihelix of the user on the sagittal plane. The distance between the second sound hole 1192 and the antihelix of the user may be reflected by a second distance OA between the second projection point O of the second sound hole on the sagittal plane and the intersection point A. The concha cavity refers to a dimpled region below the crus of the helix, that is, the edge of the concha cavity is at least formed by a side wall below the crus of the helix, an outline of the tragus, an intertragic notch, an apex of anti-tragus, a helicine notch, and an outline of the antihelix corresponding to the concha cavity. In some embodiments, to ensure that the first microphone and the second microphone in the earphone 10 have better sound collection effect and noise reduction effect, a ratio of a first distance OP between the first projection point P and the second projection point O to the second distance OA between the second projection point O and the intersection point A is between 1.8-4.4. To reduce the influence of the antihelix on the second microphone, the distance between the second sound hole 1192 and the antihelix may be increased, and the distance between the first sound hole 1191 and the second sound hole 1192 may be increased to facilitate the subsequent signal processing. For example, the ratio of the first distance OP to the second distance OA may be between 2.5-3.8. As another example, when a wearing position of the earphone remains unchanged, to further reduce the influence of the antihelix on the second microphone, the distance between the second sound hole 1192 and the antihelix may be increased, and the distance between the first sound hole 1191 and the second sound hole 1191 may be increased to facilitate the subsequent signal processing. In some embodiments the ratio of the first distance OP to the second distance OA may be between 2.8-3.5. To reduce the influence of the antihelix on the second microphone and facilitate the subsequent signal processing, the distance between the second sound hole 1192 and the antihelix may be further increased, and the distance between the first sound hole 1191 and the second sound hole 1192 may be further increased. For example, the ratio of the first distance OP to the second distance OA may be between 3.0-3.3.

It should be noted that in the present disclosure, the first projection point P refers to a centroid of the projection of the first sound hole 1191 on the sagittal plane of the user. Similarly, the second projection point O refers to the centroid of the projection of the second sound hole 1192 on the sagittal plane of the user. When sizes of the first sound hole 1191 and the second sound hole 1192 are relatively small (e.g., diameters of the first sound hole 1191 and the second sound hole 1192 are less than 2 mm), the projections of the first sound hole 1191 and the second sound hole 1192 on the sagittal plane may be approximately regarded as two points.

Considering that if the second sound hole 1192 is close to the antihelix, when the sound waves generated by the user or the external sound waves are transmitted to the antihelix, the antihelix may have a reflection effect on the sound waves, especially in the frequency range of 3 kHz-8 KHz. As a result, the sound received by the second microphone may be louder than the sound received by the first microphone, which may affect the noise reduction effect and the sound collection effect. In addition, due to a limited size of the sound production component 11, it is necessary to ensure a relatively great distance between the first sound hole 1191 and the second sound hole 1192. When the second sound hole 1192 is far away from the antihelix, the distance between the first sound hole 1191 and the second sound hole 1192 may become smaller, which may affect the subsequent signal processing. In such cases, in some embodiments, to ensure that the sound from the user's mouth received by the first microphone has a sufficient difference from the sound from the user's mouth received by the second microphone, and at the same time to reduce a sound enhancement effect of the antihelix on the second sound hole 1192, a distance between the second projection point O of the second sound hole 1192 on the sagittal plane and the intersection point A may be between 2 mm-10 mm. To reduce the sound enhancement effect of the antihelix on the second sound hole 1192 and improve the sound collection effect of the first microphone and the second microphone, the distance between the second sound hole 1192 and the antihelix may be increased. In some embodiments, the distance between the projection point O and the intersection point A may be between 4 mm-10 mm. To further reduce the reflection effect of the antihelix on the sound waves and further improve the sound collection effect of the first microphone and the second microphone, the distance between the second sound hole 1192 and the antihelix may be further increased. For example, the distance between the second projection point O and the intersection point A may be between 6 mm-10 mm. When the second sound hole 1192 is disposed at a position relatively far from the antihelix, the reflection effect of the antihelix on the sound wave may hardly affect the second sound hole 1192. For example, the distance between the second projection point O and the intersection point A may be between 8 mm-10 mm.

When the distance between the first sound hole 1191 and the second sound hole 1192 is too small, an amplitude difference and a phase difference of the low-frequency sound signals received by the first microphone and the second microphone may be too small, making it more difficult to perform the subsequent processing of the low-frequency signals. Therefore, the distance between the first sound hole 1191 and the second sound hole 1192 may not be too small.

In some embodiments, to ensure that the first microphone and the second microphone have better sound collection effects and to facilitate the subsequent signal processing, the distance between the first sound hole 1191 and the second sound hole 1192 may be not less than 10 mm. To ensure the portability of the earphone and the comfort of the user when wearing the earphone, the size of the sound production component 11 should not be too large. Correspondingly, the distance between the first sound hole 1191 and the second sound hole 1192 may be limited by the size of the sound production component 11. In some embodiments, the distance between the first sound hole 1191 and the second sound hole 1192 may be not greater than 50 mm. In some embodiments, considering a size limitation of the sound production component 11 and to make the first microphone and the second microphone have a better sound collection effect and facilitate the subsequent signal processing, the distance between the first sound hole 1191 and the second sound hole 1192 may be between 10 mm-50 mm. The distance between the first sound hole 1191 and the second sound hole 1192 mentioned here refers to a straight-line distance between centers of openings of the first sound hole 1191 and the second sound hole 1192 on the outer side of the sound production component 11 or the ear hook 12 (for example, the distance D12 shown in FIG. 5). Considering that a too large size of the sound production component 11 may affect the stability and comfort when wearing the earphone, on the premise that the first microphone and the second microphone may have a better sound collection effect and are easy to perform the subsequent signal processing, the distance between the first sound hole 1191 and the second sound hole 1192 may be appropriately reduced such that the size of the sound production component 11 may be relatively small. For example, in some embodiments, the distance between the first sound hole 1191 and the second sound hole 1192 may be between 20 mm-47 mm. As another example, to make the sound signal received by the first microphone and the second microphone have a sufficient difference, and to make the sound production component 11 have a suitable size, the distance between the first sound hole 1191 and the second sound hole 1192 may be between 27 mm-32 mm. Merely by way of example, the distance between the first sound hole 1191 and the second sound hole 1192 may be 26 mm.

In some embodiments, the distance between the first sound hole 1191 and the second sound hole 1192 may be reflected by a distance between the first projection point P of the first sound hole 1191 on the sagittal plane and the second projection point O of the second sound hole 1192 on the sagittal plane. It should be understood that when the line connecting the first sound hole 1191 and the second sound hole 1192 is not parallel to the sagittal plane of the user, the distance between the first sound hole 1191 and the second sound hole 1192 may have certain difference from the distance between the first projection point P and the second projection point O. Specifically, the distance between the first sound hole 1191 and the second sound hole 1192 may be greater than the distance between the first projection point P and the second projection point O. Referring to the descriptions regarding the distance between the first sound hole 1191 and the second sound hole 1192, considering the limitation of the size of the sound production component 11 and to make the first microphone and the second microphone have better sound collection effects to facilitate the subsequent signal processing, in some embodiments, the distance between the first projection point P of the first sound hole 1191 on the sagittal plane and the second projection point O of the second sound hole 1192 on the sagittal plane may be between 8 mm-48 mm. For example, the distance between the first projection point P of the first sound hole 1191 on the sagittal plane and the second projection point O of the second sound hole 1192 on the sagittal plane may be between 18 mm-45 mm. As another example, the distance between the first projection point P of the first sound hole 1191 on the sagittal plane and the second projection point O of the second sound hole 1192 on the sagittal plane may be between 25 mm-30 mm.

In the wearing state, the distance between the first sound hole 1191 and the user's mouth (point Q in FIG. 6) may be smaller than the distance between the second sound hole 1192 and the user's mouth to facilitate the subsequent signal processing. As shown in FIG. 6, when the earphone 10 is in the wearing state, the first sound hole 1191 may have a first projection point P on the sagittal plane of the user (e.g., the T-S plane shown in FIG. 6), the second sound hole 1192 may have a second projection point O on the sagittal plane, and a third projection point Q may be used to represent a projection of the user's mouth (e.g., lips) on the sagittal plane of the user. The user's mouth has the third projection point Q on the sagittal plane of the user, and a distance between P and Q is less than a distance between O and Q.

In some embodiments, the line connecting the first projection point P of the first sound hole 1191 on the sagittal plane of the user and the second projection point O of the second sound hole 1192 on the sagittal plane approximately points to the third projection point Q of the user's mouth on the sagittal plane. In such cases, a directivity algorithm may be constructed based on the sounds received by the first microphone and the second microphone such that a clearer voice of the user may be received. In some embodiments, a line PQ connecting the first projection point P and the third projection point Q may form a certain angle with a line OQ connecting the second projection point O and the third projection point Q. To ensure a directivity of the first sound hole 1191 and the second sound hole 1192, the angle between PQ and OQ may be smaller than 30°. In some embodiments, the angle between PQ and OQ may be 5°-25°. For example, the angle between PQ and OQ may be 8°-15°. Merely by way of example, in some embodiments, the angle between PQ and OQ may be 0°, 3°, 9° or 15°, etc.

Referring to FIG. 5, in some embodiments, the first sound hole 1191 may be disposed on a second portion 122 of the ear hook (a portion of the ear hook close to the sound production component). Specifically, in some embodiments, the first sound hole 1191 may be disposed near a connection between the second portion 122 of the ear hook and the sound production component 11. For example, the first sound hole 1191 may be disposed on the second portion 122 of the ear hook or on the sound production component 11. In the present disclosure, the first sound hole 1191 being disposed near the connection between the second portion 122 of the ear hook and the sound production component 11 refers to that a minimum distance between the first sound hole 1191 and the connection is not greater than 4 mm. In some embodiments, a position relationship between the first sound hole 1191 and the second portion 122 of the ear hook as well as the sound production component 11 may be represented by a distance between the projection of the first sound hole 1191 on the sagittal plane and a projection of the connection on the sagittal plane. For example, in some embodiments, the minimum distance between the projection of the first sound hole 1191 on the sagittal plane and the projection of the connection on the sagittal plane may be not greater than 4 mm. When the user wears the earphone, the sound production component 11 may be closer to the user's mouth. To improve the sound collection effect of the first microphone, in some embodiments, the minimum direction between the projection of the first sound hole 1191 on the sagittal plane and the projection of the connection on the sagittal plane may be not greater than 3 mm. In some embodiments, the first sound hole 1191 may be disposed at the connection between the sound production component 11 and the second portion 122 of the ear hook. Then the first sound hole 1191 may be closer to the user's mouth and the first microphone may have a better sound collection effect. In some embodiments, the sound production component 11 and the second portion 122 of the ear hook may be mutually independent structures, and the sound production component 11 and the second portion 122 of the ear hook may be connected through splicing, embedding, plugging, etc. The connection between the sound production component 11 and the second portion 122 of the ear hook may refer to a connection gap between the sound production component 11 and the second portion 122 of the ear hook. The projection of the connection between the sound production component 11 and the second portion 122 of the ear hook on the sagittal plane refers to the projection of the connection gap on the sagittal plane. In some embodiments, the first sound hole 1191 disposed near the connection between the sound production component 11 and the second portion 122 of the ear hook (e.g., the first sound hole 1191 may be disposed on the second portion 122 of the ear hook) may ensure that the first sound hole 1191 is close to the user without occupying an inner space of the sound production component 11, which may facilitate an installation of the transducer and a wiring of an internal circuit, thereby effectively improving production efficiency.

It should further be noted that, in some embodiments, when the sizes of the first sound hole 1191 and the second sound hole 1192 are small, the first sound hole 1191 and the second sound hole 1192 may be approximately regarded as two points. In some embodiments, when the sizes of the first sound hole 1191 and the second sound hole 1192 are relatively large, the distance between the first sound hole 1191 and the connection between the sound production component 11 and the second portion 122 of the ear hook may be understood as a minimum distance from a center of the first sound hole 1191 to the connection between the sound production component 11 and the second portion 122 of the ear hook. Correspondingly, when the size of the first sound hole 1191 is small, the projection of the first sound hole 1191 on the sagittal plane may be approximately regarded as a point. The minimum distance from the projection of the first sound hole 1191 on the sagittal plane to the projection of the connection between the sound production component 11 and the second portion 122 of the ear hook on the sagittal plane refers to the minimum distance from a projection point of the first sound hole 1191 on the sagittal plane to the projection of the connection on the sagittal plane. When the size of the first sound hole 1191 is relatively large, the minimum distance from the projection of the first sound hole 1191 on the sagittal plane to the projection of the connection between the sound production component 11 and the second portion 122 of the ear hook on the sagittal plane refers to the minimum distance from a centroid of the projection of the first sound hole 1191 on the sagittal plane to the projection of the connection on the sagittal plane. Similarly, the distance between the sound hole and a certain side (e.g., an inner side, an upper side) of the sound production component 11 described elsewhere in the present disclosure may be understood as the minimum distance from the center of the sound hole to the side of the sound production component 11.

It should be understood that the positions of the first sound hole 1191 and the second sound hole 1192 shown in FIG. 5 are only illustrative. In some embodiments, the first sound hole 1191 and/or the second sound hole 1192 may be disposed at other unobstructed positions. For example, in some embodiments, the first sound hole 1191 and the second sound hole 1192 may be disposed together on the outer side of the sound production component 11. As another example, in some embodiments, the first sound hole 1191 may be disposed on the outer side of the sound production component 11, and the second sound hole 1192 may be disposed on the upper side of the sound production component 11. It should be noted that, in the present disclosure, the inner side of the sound production component 11 refers to a side closest to the user's head when the earphone 10 is worn (referring to the inner side IS in FIGS. 15A and 15B), and the upper side of the sound production component 11 refers to a side farthest from the ground when the earphone 10 is worn (referring to the upper side US in FIGS. 15A and 15B). Correspondingly, the side opposite to the inner side may be regarded as the outer side of the sound production component 11 (referring to the outer side OS in FIG. 15A), and the side opposite to the upper side may be regarded as the lower side of the sound production component 11 (referring to the lower side LS in FIG. 15B). In some embodiments, each of the upper side, the lower side, the inner side, and the outer side of the sound production component 11 may be planar and/or non-planar. Specific distribution positions of the first sound hole 1191 and the second sound hole 1192 are described below with reference to FIG. 7 to FIG. 16B.

Figure 7:
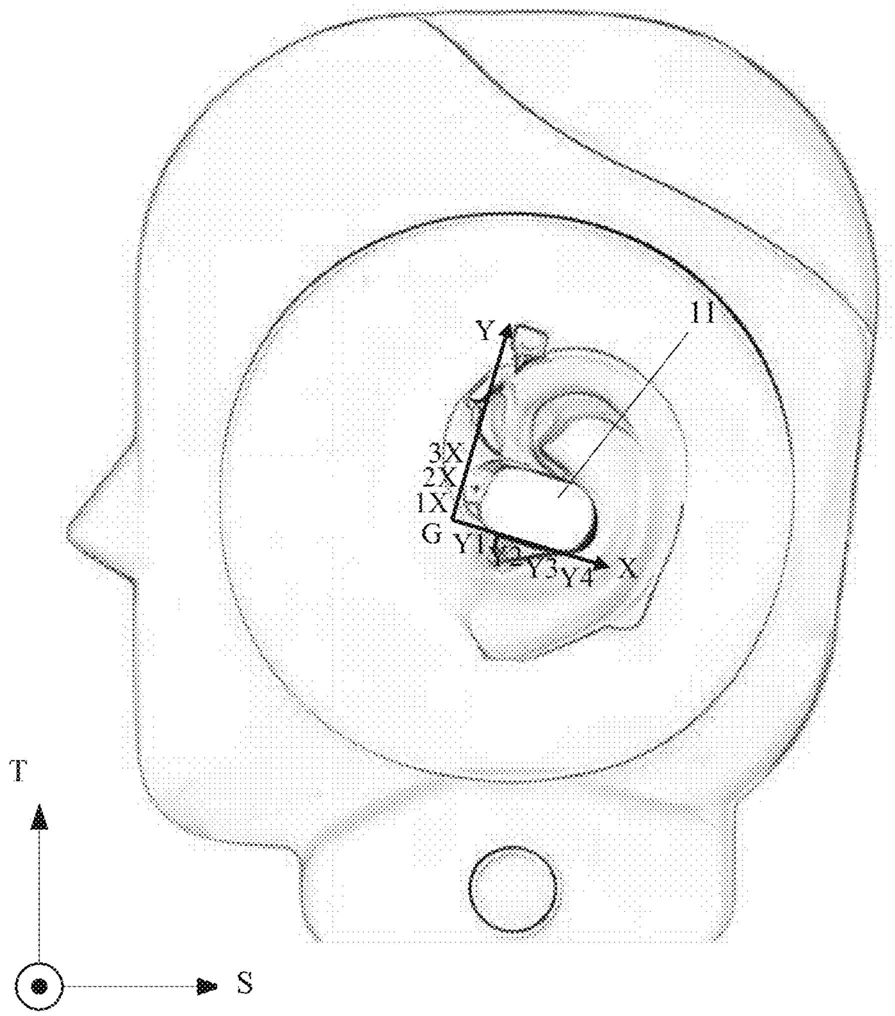
FIG. 7 is another schematic diagram illustrating an exemplary wearing state of an earphone according to some embodiments of the present disclosure.

FIG. 7 is a schematic diagram illustrating an exemplary wearing state of an earphone according to some embodiments of the present disclosure.

Figure 8:
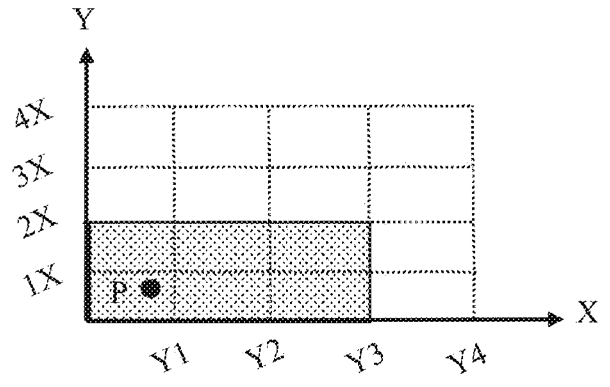
FIG. 8 is a schematic diagram illustrating a coordinate system established based on a projection of a sound production component on a sagittal plane according to some embodiments of the present disclosure.

Referring to FIG. 7, a projection of the sound production component 11 on the sagittal plane may include a long axis direction X and a short axis direction Y. FIG. 8 is a schematic diagram illustrating a coordinate system established based on the projection of the sound production component on the sagittal plane according to some embodiments of the present disclosure. Referring to FIG. 8, a coordinate system is established with the long axis direction X and the short axis direction Y, and the coordinates in the coordinate system may indicate a position of the first sound hole 1191 relative to the sound production component 11. A Y axis is parallel to the short axis direction Y and tangent to a projection of a front side of the sound production component 11 on the sagittal plane. The X axis is parallel to the long axis direction X and tangent to a projection of the lower side of the sound production component 11 on the sagittal plane. In some embodiments, a position of the Y axis may be determined in the following manner: firstly determining the projection of the sound production component 11 on the sagittal plane; determining a tangent line parallel to the short axis direction Y and tangent to the projection of a rear side of the sound production component 11 on the sagittal plane (also referred to as "tangent line I"); determining a center of a projection of the diaphragm or a magnetic circuit assembly in the sound production component 11 on the sagittal plane; and determining a symmetry line of the tangent I about the center, and determining the symmetry line as a straight line where the Y axis is located.

Referring to FIG. 8, on the Y axis, 1X may indicate a straight line Y=1, 2X may indicate the straight line Y=2, 3X may indicate the straight line Y=3, 4X may indicate the straight line Y=4, etc. Similarly, on the X axis, Y1 may indicate the straight line X=1, Y2 may indicate the straight line X=2, Y3 may indicate the straight line X=3, etc. In some embodiments, the coordinates of points in the coordinate system may be indicated as YX. For example, on the line Y=2, the line Y=2 is parallel to the X axis. As the value of Y=2 remains unchanged, the coordinates of points on the straight line may be uniformly indicated as 2X. When X has different values, different positions may be obtained, such as position 21, position 22, position 23, etc. As shown in FIG. 7 and FIG. 8, in some embodiments, the sound production component 11 may be divided into 4 portions in the long axis direction X, and the sound production component 11 may be divided into 4 portions in the short axis direction Y. In some embodiments, the sound production component 11 may further be divided into other counts of equal portions in the long axis direction X and the short axis direction Y. Taking the coordinate system as a reference, a sound collection effect of the first sound hole 1191 at different positions are described below.

Figure 9:
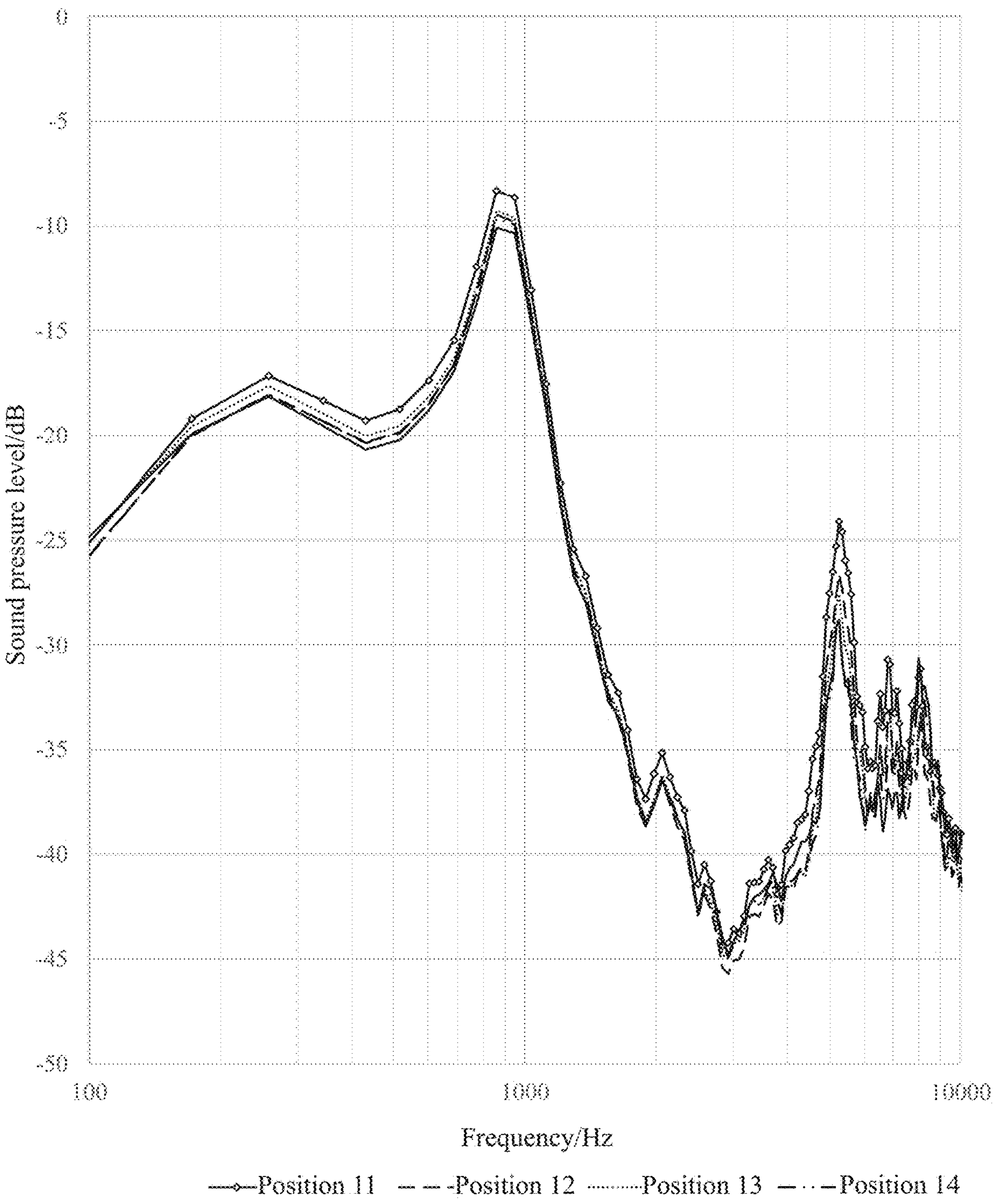
FIG. 9 is a schematic diagram illustrating sound collection curves of a first sound hole at different positions according to some embodiments of the present disclosure.

FIG. 9 is a schematic diagram illustrating sound collection curves of a first sound hole at different positions according to some embodiments of the present disclosure. As shown in FIG. 9, when Y=1, coordinates along the X axis on a straight line Y=1 may be uniformly expressed as 1X, and when X takes different values, the corresponding positions may be determined, such as position 11, position 12, position 13, position 14, etc. FIG. 9 shows that to ensure that the first microphone has a better sound collection effect while ensuring that the second hole has a specific distance from the first sound hole, and that the second sound hole may be as far away from the antihelix as possible, a ratio of a distance between the first projection point P of the first sound hole 1191 on the sagittal plane and the projection of the front side of the sound production component 11 on the sagittal plane along the long axis direction X to the size of the projection of the sound production component 11 on the sagittal plane along the long axis direction X may be not greater than 0.75. That is, when the sound production component 11 is divided into 4 equal portions along the long axis direction X, the first projection point P is disposed in a region where X≤3. To make the first sound hole 1191 close to the user's mouth so as to improve the sound collection effect of the first microphone, in some embodiments, the ratio of the distance between the first projection point P of the first sound hole 1191 on the sagittal plane and the projection of the front side of the sound production component 11 on the sagittal plane along the long axis direction X to the size of the projection of the sound production component 11 on the sagittal plane along the long axis direction X may be not greater than 0.5. In some embodiments, to make the first sound hole 1191 closer to the user's mouth so as to improve the sound collection effect of the first microphone, the ratio of the distance between the first projection point P of the first sound hole 1191 on the sagittal plane and the projection of the front side of the sound production component 11 on the sagittal plane along the long axis direction X to the size of the projection of the sound production component 11 on the sagittal plane along the long axis direction X may be not greater than 0.3. In some embodiments, to make the first sound hole 1191 closer to the user's mouth so as to improve the sound collection effect of the first microphone, the ratio of the distance between the first projection point P of the first sound hole 1191 on the sagittal plane and the projection of the front side of the sound production component 11 on the sagittal plane along the long axis direction X to the size of the projection of the sound production component 11 on the sagittal plane along the long axis direction X may be not greater than 0.2. The first sound hole 1191 may be disposed near the front side of the sound production component such that the position of the second acoustic hole 1192 may have more choices, which may ensure that the second sound hole may have a specific distance from the first sound hole and that the second sound hole may be as far away from the antihelix as possible. Accordingly, in some embodiments, the ratio of the distance between the first projection point P of the first sound hole 1191 on the sagittal plane and the projection of the front side of the sound production component 11 on the sagittal plane along the long axis direction X to the size of the projection of the sound production component 11 on the sagittal plane along the long axis direction X may be not greater than 0.1. In some embodiments, the first sound hole 1191 may be disposed on the front side of the sound production component 11. In such cases, the first sound hole 1191 may be closer to the user's mouth in the horizontal direction, and the sound collection effect of the first microphone may be better. It should be noted that, for the convenience of understanding, the distance between the first projection point P of the first sound hole 1191 on the sagittal plane and the projection of the front side of the sound production component 11 on the sagittal plane along the long axis direction X refers to a distance between the projection point P and the Y axis, that is, the distance between the first projection point P and the tangent line along the short axis direction Y and tangent to the projection of the front side of the sound production component 11 on the sagittal plane.

Figure 10:
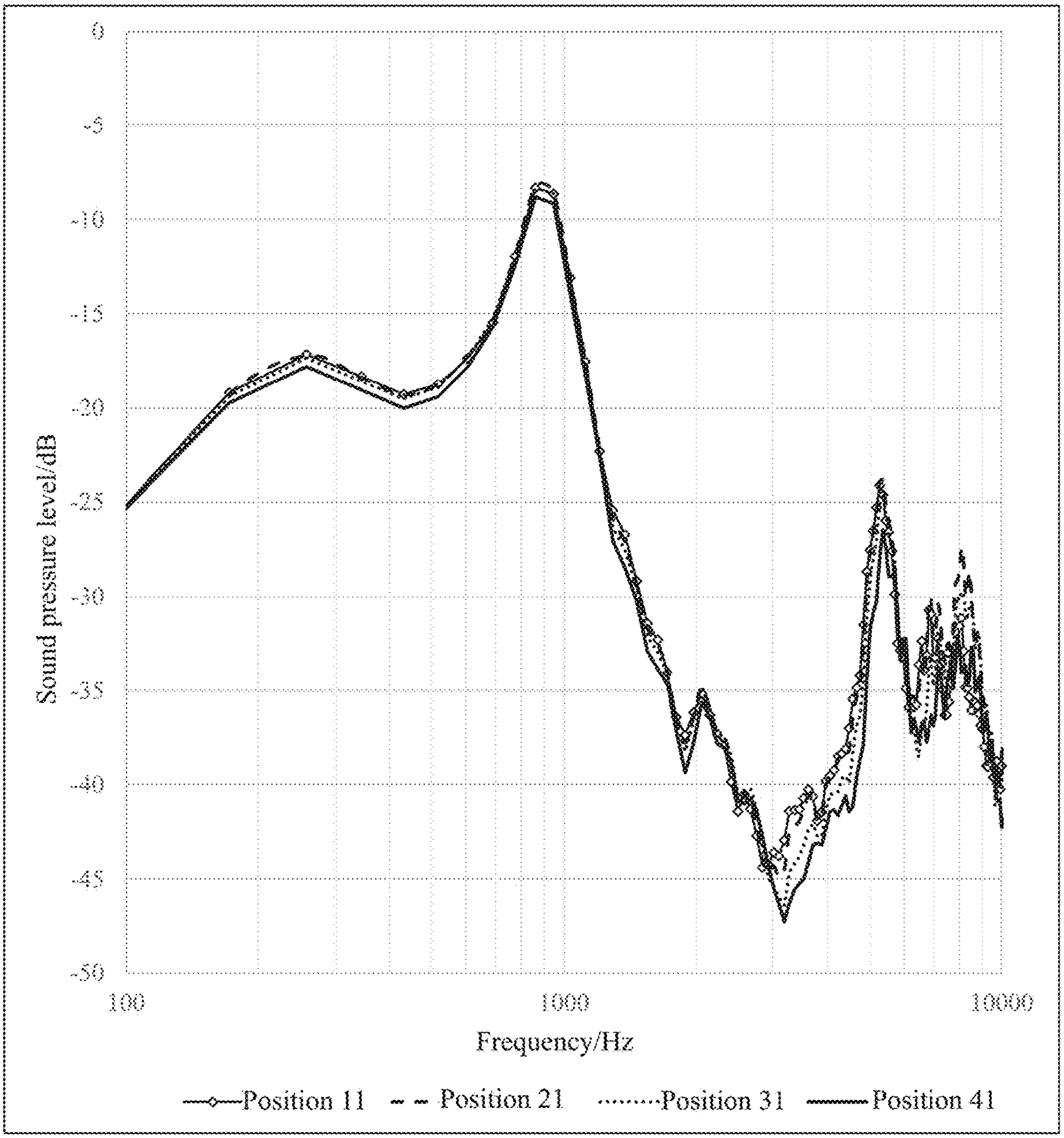
FIG. 10 is a schematic diagram illustrating sound collection curves of a first sound hole at different positions according to some other embodiments of the present disclosure.

FIG. 10 is a schematic diagram illustrating sound collection curves of a first sound hole at different positions according to some other embodiments of the present disclosure. As shown in FIG. 10, when X=1, coordinates along the Y axis on the straight line X=1 may be uniformly expressed as Y1, and when Y takes different values, the corresponding positions may be determined, such as position 11, position 21, position 31, position 41, etc. FIG. 10 shows sound collection situations of the first microphone disposed at position 11, position 21, position 31, and position 41 respectively. According to FIG. 10, on Y1, the smaller the Y axis coordinate is, the closer the first microphone is to the user's mouth, and the better the sound collection effect of the first microphone.

In some embodiments, to make the first microphone have a better sound collection effect, a ratio of a distance between the first projection point P of the first sound hole 1191 on the sagittal plane and the projection of the lower side of the sound production component 11 on the sagittal plane along the short axis direction Y to a size of the projection of the sound production component 11 on the sagittal plane along the short axis direction Y may be not greater than 1. Considering that when the first sound hole 1191 and the second sound hole 1192 are disposed on the sound production component 11 at the same time, if the first sound hole 1191 is disposed on the upper side or the front side of the sound production component at a position with the maximum distance relative to the long axis direction X, the line connecting the sound hole 1191 and the second sound hole 1192 cannot point to the user's mouth, which may affect the sound collection effect. In some embodiments, the ratio of the distance between the first projection point P of the first sound hole 1191 on the sagittal plane and the projection of the lower side of the sound production component 11 on the sagittal plane along the short axis direction Y to a size of the projection of the sound production component 11 on the sagittal plane along the short axis direction Y may be not greater than 0.5. That is, when the sound production component is divided into 4 equal portions along the short axis direction Y, the first projection point P is disposed in a region where Y≤2. In some embodiments, to make the first sound hole 1191 closer to the user's mouth and improve the sound collection effect of the first microphone, the ratio of the distance between the first projection point P of the first sound hole 1191 on the sagittal plane and the projection of the lower side of the sound production component 11 on the sagittal plane along the short axis direction Y to a size of the projection of the sound production component 11 on the sagittal plane along the short axis direction Y may be not greater than 0.4. In some embodiments, the ratio of the distance between the first projection point P of the first sound hole 1191 on the sagittal plane and the projection of the lower side of the sound production component 11 on the sagittal plane along the short axis direction Y to a size of the projection of the sound production component 11 on the sagittal plane along the short axis direction Y may be not greater than 0.3. When the first sound hole 1191 is disposed near the lower side of the sound production component, the position of the second sound hole 1192 may have more choices, which may ensure that the second sound hole 1192 may have a specific distance from the first sound hole, and the line connecting the first sound hole and the second sound hole may be more accurately directed to the user's mouth. Based on the above considerations, in some embodiments, the ratio of the distance between the first projection point P of the first sound hole 1191 on the sagittal plane and the projection of the lower side of the sound production component 11 on the sagittal plane along the short axis direction Y to a size of the projection of the sound production component 11 on the sagittal plane along the short axis direction Y may be not greater than 0.1. In some embodiments, the first sound hole 1911 may be disposed on the lower side of the sound production component 11. In such cases, the first sound hole 1191 may be closer to the user's mouth in a vertical direction, and the sound collection effect of the first microphone may be better. It should be noted that, for the convenience of understanding, the distance between the first projection point P of the first sound hole 1191 on the sagittal plane and the projection of the lower side of the sound production component 11 on the sagittal plane along the short axis direction Y refers to a distance between the projection point P and the X axis, that is, a distance between the first projection point P and a tangent along the long axis direction X and tangent to the projection of the lower side of the sound production component 11 on the sagittal plane.

Figure 11:
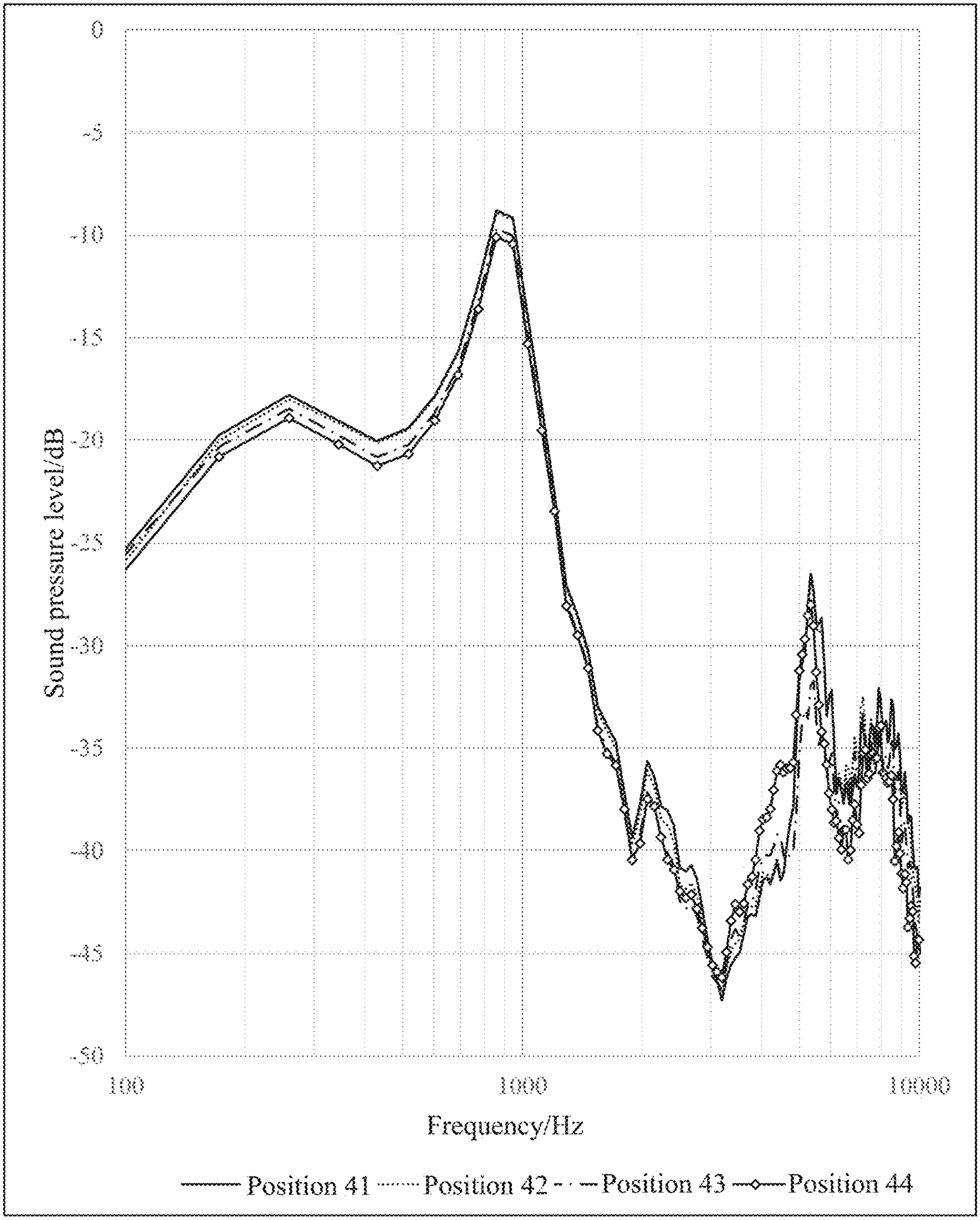
FIG. 11 is a schematic diagram illustrating sound collection curves of a second sound hole at different positions according to some other embodiments of the present disclosure.

FIG. 11 is a schematic diagram illustrating sound collection curves of a second sound hole at different positions according to some other embodiments of the present disclosure. As shown in FIG. 11, when Y=4, coordinates along the X-axis on the straight line Y=4 may be uniformly expressed as 4X, and when X takes different values, the corresponding positions may be determined, such as position 41, position 42, position 43, position 44, etc. FIG. 11 shows sound collection effects at positions 41, 42, 43, and 44 respectively. According to FIG. 11, on 4X, as X increases, a distance from the second sound hole to the user's antihelix becomes smaller, and the influence of a reflection of the antihelix becomes greater. For example, when X is large, a sound collection of the second microphone in a frequency band after 3 kHz significantly increases, which results in different laws of changes of the sound collection curve of the second microphone before and after 3 kHz. That is, if the second sound hole 1192 is disposed at a position closer to the antihelix, the sound collection effect of the second sound hole 1192 after 3 kHz may be stronger than the sound collection effect of the first sound hole 1191, which results in poorer sound pickup effects of the first microphone and the second microphone to the user's mouth.

Figure 12:
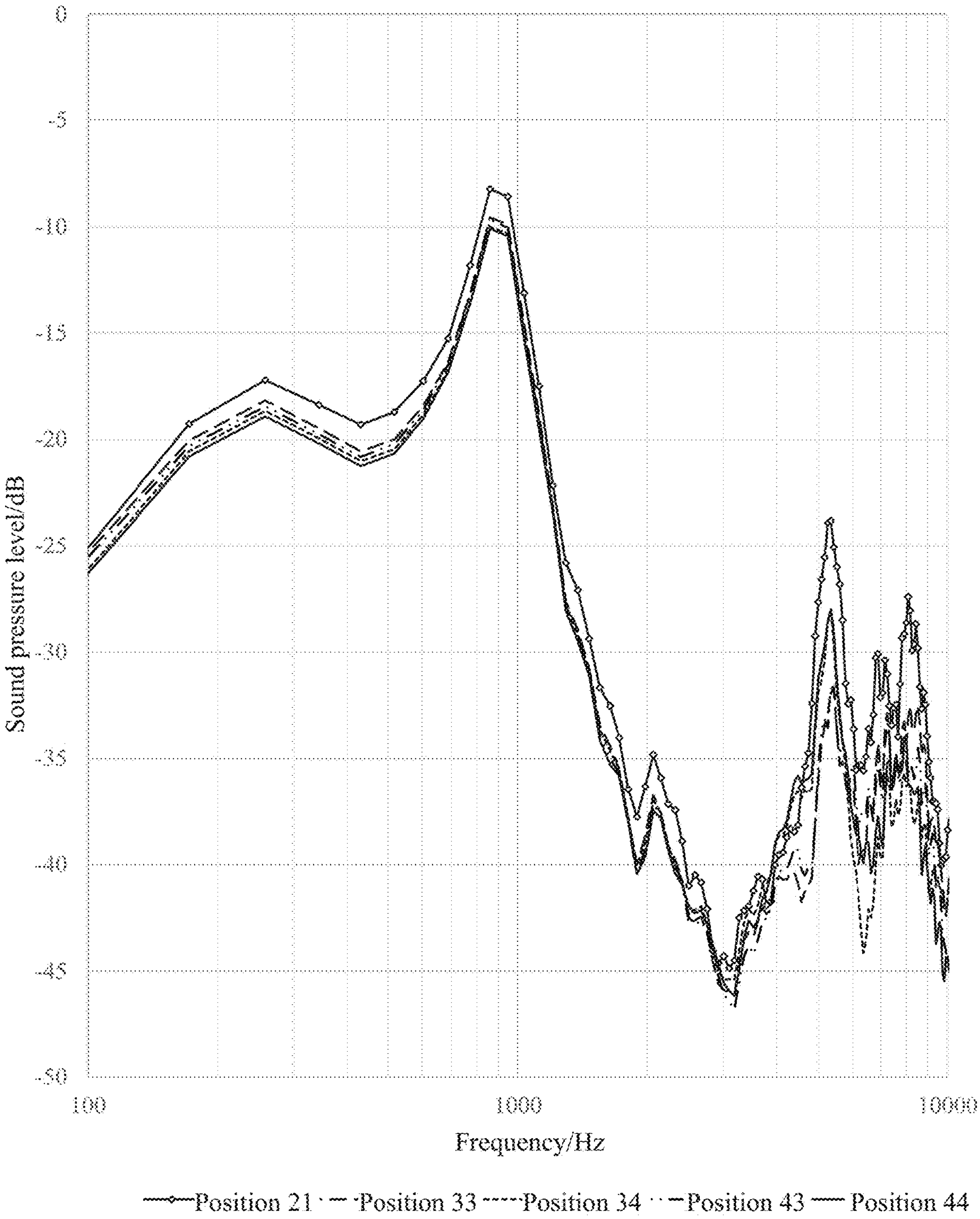
FIG. 12 is a schematic diagram illustrating sound collection curves of a sound hole at different positions according to some other embodiments of the present disclosure.

FIG. 12 is a schematic diagram illustrating sound collection curves of a sound hole at different positions according to some other embodiments of the present disclosure. As shown in FIG. 12, a sound collection effect of the microphone at position 21 is better than the sound collection effects of the microphone at position 33, position 34, position 43, and position 44. In some embodiments, the first sound hole 1191 may be disposed at position 21, and the second sound hole 1192 may be disposed at position 33, position 34, position 43, or position 44. In such cases, the first sound hole 1191 may have a better sound collection effect than the second sound hole 1192 in the whole frequency band. When the second sound hole 1192 is disposed at the position 33 or the position 34, the sound collection effect of the second sound hole 1192 is better, and the sound collection curve of the second sound hole 1192 may be consistent with the sound collection curve of the first sound hole 1191. After signals of the first microphone and the second microphone are processed, the sound from the user's mouth may be obtained in a wider frequency band. When the second sound hole 1192 is disposed at position 43 or position 44, a distance between the second sound hole 1192 and the first sound hole 1191 is greater, which may facilitate a noise reduction. After the signals of the first microphone and the second microphone are processed, a clearer voice from the user's mouth may be obtained in a low-frequency range.

Figure 13:
FIG. 13 is a schematic diagram illustrating sound collection curves of a sound hole at different positions according to some other embodiments of the present disclosure.

FIG. 13 is a schematic diagram illustrating sound collection curves of a sound hole at different positions according to some other embodiments of the present disclosure. FIG. 13 shows a sound collection effect of the microphone at positions 11 and 14. The sound collection effect of the microphone at position 11 is better than the sound collection effect of the microphone at position 14 in the entire frequency range. In some embodiments, the first sound hole 1191 may be disposed at position 11, and the second sound hole 1192 may be disposed at position 14. In such cases, both the first sound hole 1191 and the second sound hole 1192 have good sound collection effects. After the signals of the first microphone and the second microphone are processed, the sound from the user's mouth may be obtained in a wider frequency band.

Figure 14:
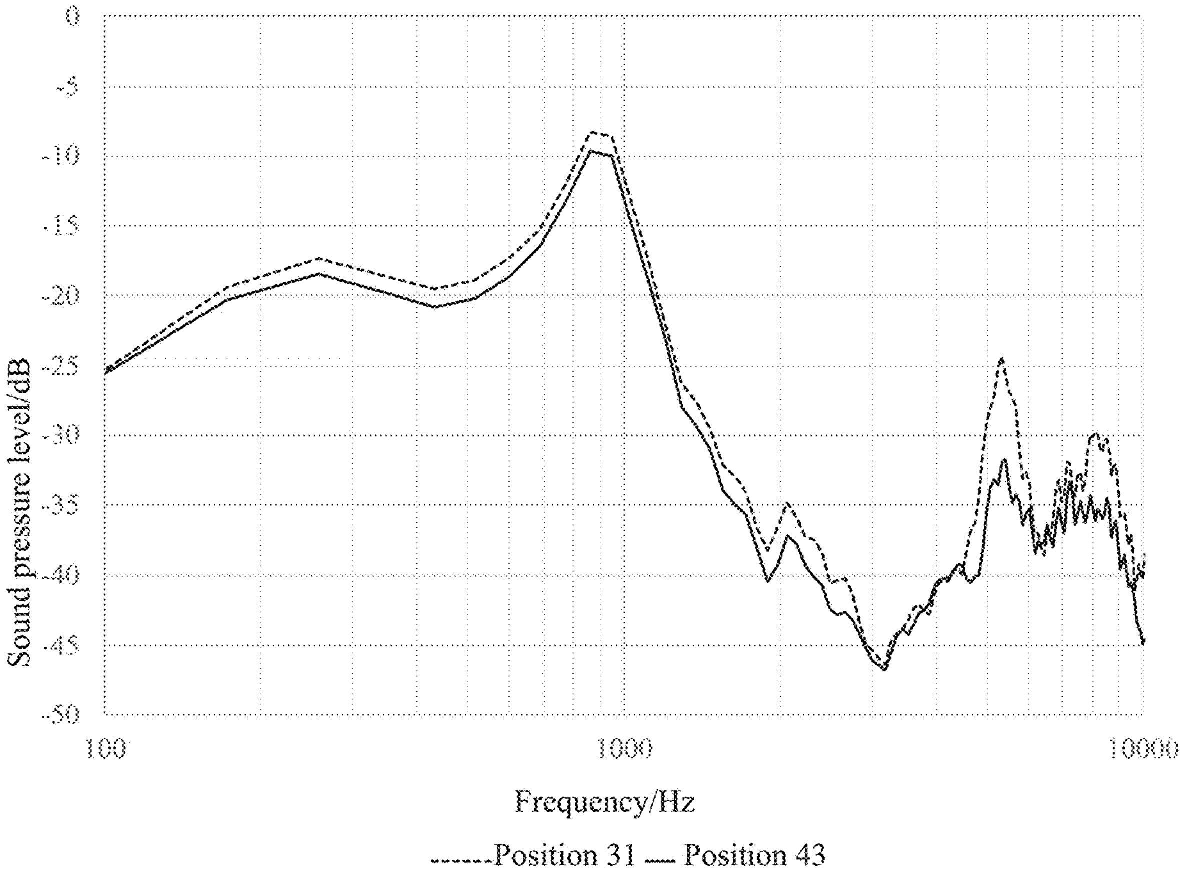
FIG. 14 is a schematic diagram illustrating sound collection curves of a sound hole at different positions according to some other embodiments of the present disclosure.

FIG. 14 is a schematic diagram illustrating sound collection curves of a sound hole at different positions according to some other embodiments of the present disclosure. FIG. 14 shows the sound collection effects of the microphone at positions 31 and 43. The sound collection effect of the microphone at position 31 is better than the sound collection effect of the microphone at position 43 in the entire frequency range. In some embodiments, the first sound hole 1191 may be disposed at position 31, and the second sound hole 1192 may be disposed at position 43. In such cases, both the first sound hole 1191 and the second sound hole 1192 may have good sound collection effects. After the signals of the first microphone and the second microphone are processed, the sound from the user's mouth may be obtained in a wider frequency band.

In some embodiments, a projection of the sound production component 11 on the sagittal plane may have a racetrack shape, and extension lines of the two sides of the racetrack-shaped projection that are close to the mouth (that is, the projection of the lower side and the front side of the sound production component 11) have an intersection point. The intersection point may be defined as a fourth projection point (e.g., the intersection point G of the X axis and the Y axis shown in FIG. 7, or an origin of the X-Y coordinate system shown in FIG. 8). To make the first sound hole 1191 as close as possible to the user's mouth, a distance between the first projection point P and the fourth projection point of the first sound hole 1191 on the sagittal plane needs to satisfy a preset condition. The greater the distance, the farther the distance from the first projection point P to the intersection point G shown in FIG. 7 or the origin of the X-Y coordinate system shown in FIG. 8. Correspondingly, the farther the distance between the first sound hole 1191 and the user's mouth, and the poor the sound collection effect of the first microphone. In some embodiments, to ensure the sound collection effect of the first microphone, the distance between the first projection point and the fourth projection point may be not greater than 5 mm. To improve the sound collection effect of the first microphone, the first sound hole 1191 may be disposed on the sound production component 11 at a position closer to the user's mouth. In some embodiments, the distance between the first projection point P and the fourth projection point may be not greater than 3 mm. In some embodiments, the distance between the first projection point P and the fourth projection point may be not greater than 1 mm. The first sound hole 1191 may be closer to the position of the user's mouth, so as to further improve the sound collection effect of the first microphone. It should be noted that the projection of the sound production component 11 on the sagittal plane is not limited to the above-mentioned racetrack shape, but may further be other regular (e.g., rectangular, elliptical, circular, etc.) or irregular shapes, as long as the first sound hole 1191 may be disposed close to the user's mouth or close to the origin of the X-Y coordinate system.

Figure 15A:
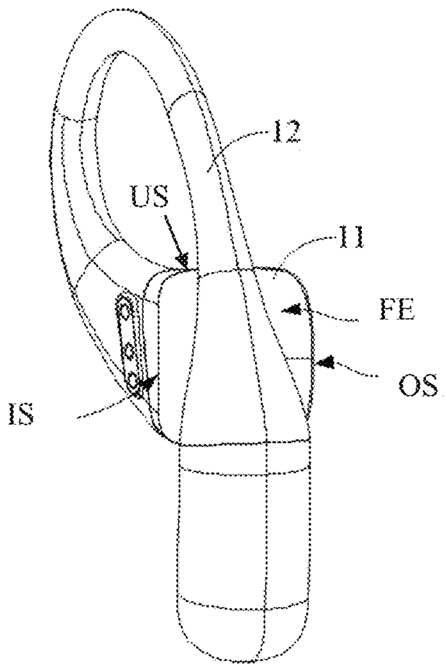
FIG. 15A is a schematic diagram illustrating an exemplary structure of an earphone according to other embodiments of the present disclosure.
Figure 15B:
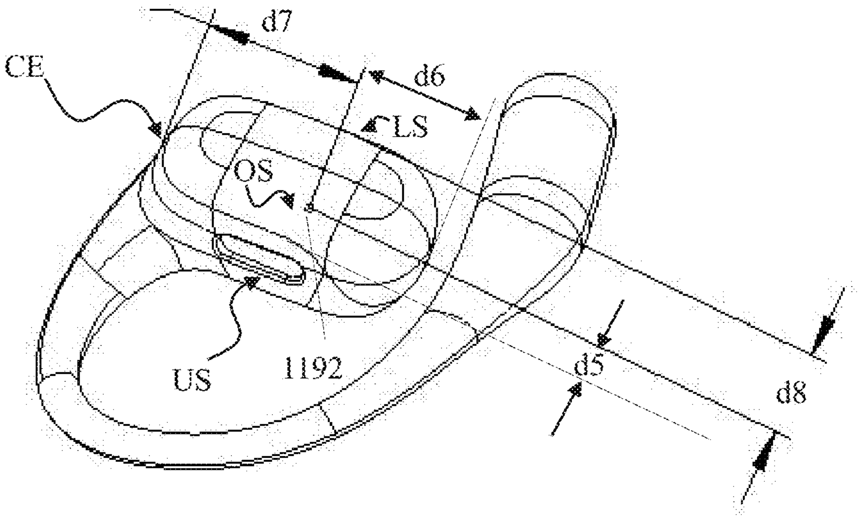
FIG. 15B is a schematic diagram illustrating an exemplary structure of an earphone according to some other embodiments of the present disclosure.

FIG. 15A and FIG. 15B are schematic diagrams illustrating exemplary structures of an earphone according to some other embodiments of the present disclosure.

Figure 16A:
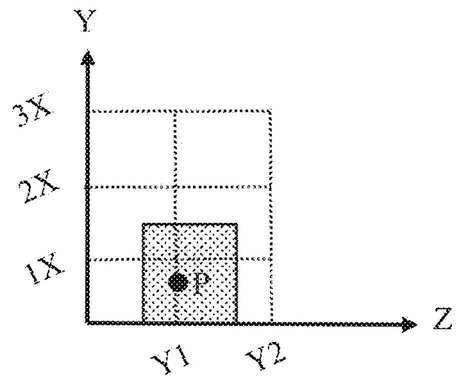
FIG. 16A is a schematic diagram illustrating an exemplary coordinate system established according to a sound production component according to some other embodiments of the present disclosure.
Figure 16B:
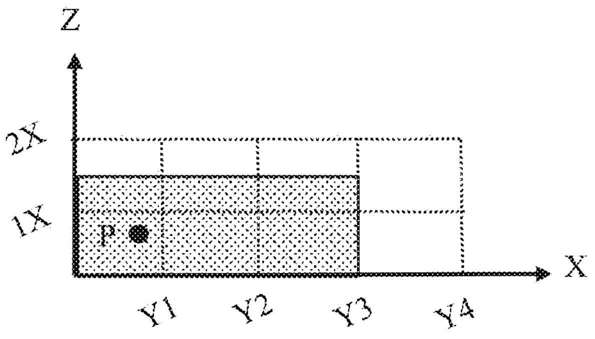
FIG. 16B is a schematic diagram illustrating an exemplary coordinate system established according to a sound production component according to some other embodiments of the present disclosure.

Referring to FIG. 15A and FIG. 15B, in some embodiments, the first sound hole 1191 may be disposed on a lower side LS or a front side CE of the sound production component 11. FIG. 16A and FIG. 16B are schematic diagrams illustrating exemplary coordinate systems established according to a sound production component according to some other embodiments of the present disclosure. Specifically, as shown in FIG. 16A, when the first sound hole 1191 is disposed on the front side CE of the sound production component 11, the coordinate of the first sound hole 1191 in the long axis direction X of the sound production component 11 is 0, and a relative position relationship between the first sound hole 1191 and the sound production component 11 may be represented by a Y-Z coordinate system. The Z axis is a thickness direction of the sound production component 11, which is perpendicular to the long axis direction X and the short axis direction Y of the sound production component 11. Similarly, as shown in FIG. 16B, when the first sound hole 1191 is disposed on the lower side LS of the sound production component 11, the coordinate of the first sound hole 1191 in the short axis direction Y of the sound production component 11 is 0, and the relative position relationship between the first sound hole 1191 and the sound production component 11 may be represented by an X-Z coordinate system. The greater the Z value, the farther the distance between the first sound hole 1191 and the inner side of the sound production component 11. The greater the X value, the farther the distance between the first sound hole 1191 and the front side of the sound production component 11. The greater the Y value, the farther the distance between the first sound hole 1191 and the in lower side of the sound production component 11.

Considering that when the first sound hole 1191 is too close to the inner side of the sound production component 11 (e.g., less than 2 mm), the first sound hole 1191 may be blocked by the user's ear in the wearing state, and the first microphone may also collect a noise generated by a friction between the user's ear and the sound production component 11. In such cases, regardless of whether the first sound hole 1191 is located on the lower side or the front side of the sound production component, the distance between the first sound hole 1191 and the inner side of the sound production component 11 may not be too small. In addition, the two ears and the mouth of the human body are regarded as three points in space, and the three points construct an approximately isosceles triangle region. When the earphone is in the wearing state, the sound production component 11 needs to be disposed inclined to extend into the concave concha cavity. That is, a line connecting any two points on the outer side of the sound production component 11 may not point to the triangular region. If the first sound hole 1191 is too close to the outer side of the sound production component 11 (e.g., the distance between the first sound hole 1191 and the outer side is less than 2 mm), even if the second sound hole 1192 is disposed on the outer side of the sound production component 11, it cannot ensure that the line connecting the first sound hole 1191 and the second sound hole 1192 points to the user's mouth. In some embodiments, when the first sound hole 1191 is disposed on the lower side or the front side of the sound production component 11, to ensure the sound collection effect of the first sound hole 1191 and that the line connecting the first sound hole 1191 and the second sound hole 1192 points to a region on the front side of the user, a ratio of a distance between the first sound hole 1191 and the inner side of the sound production component 11 in the thickness direction Z of the sound production component to a size of the sound production component 11 along the thickness direction Z may be between 0.25-0.7. In some embodiments, the ratio of the distance between the first sound hole 1191 and the inner side of the sound production component 11 in the thickness direction Z of the sound production component to the size of the sound production component 11 along the thickness direction Z may be between 0.25-0.65. The first sound hole 1191 may be disposed at a relatively far distance from the inner side of the sound production component 11, so as to reduce an influence of noise generated by the friction between the sound production component 11 and the ear. Meanwhile, the distance between the first sound hole 1191 and the outer side of the sound production component 11 may be reduced such that the line connecting the first sound hole 1191 and the second sound hole 1192 may point to the user's mouth. In some embodiments, the ratio of the distance between the first sound hole 1191 and the inner side of the sound production component 11 in the thickness direction Z of the sound production component to the size of the sound production component 11 along the thickness direction Z may be between 0.3-0.6. In some embodiments, the ratio of the distance between the first sound hole 1191 and the inner side of the sound production component 11 in the thickness direction Z of the sound production component to the size of the sound production component 11 along the thickness direction Z may be between 0.3-0.4. The distance between the first sound hole 1191 and the outer side of the sound production component 11 may be further reduced such that the line connecting the first sound hole 1191 and the second sound hole 1192 may point to the user's mouth more accurately. In some embodiments, the inner side of the sound production component 11 may be a curved side. The distance between the first sound hole 1191 and the inner side of the sound production component 11 in the thickness direction Z of the sound production component may be equivalent to a distance between the center of the first sound hole 1191 and a tangent plane to the inner side of the sound production component 11. The tangent plane of the inner side of the sound production component 11 is a plane parallel to the long axis direction X and the short axis direction Y and tangent to the inner side.

In some embodiments, the first sound hole 1191 may be disposed on the ear hook (e.g., a position on the ear hook closest to the user's mouth). Correspondingly, to ensure a directivity of the line connecting the second sound hole 1192 and the first sound hole 1191, when the first sound hole 1191 is disposed on the ear hook, the second sound hole 1192 may be disposed near a connection between the upper side and the front side of the sound production component 11. In some embodiments, the structure or shape of the ear hook of the earphone 10 may be configured to satisfy a position requirement of the second sound hole 1192. In such cases, the line connecting the second sound hole 1192 and the first sound hole 1191 may be approximately pointed to the user's mouth, and the distance between the second sound hole 1192 and the first sound hole 1191 may be greater than a preset condition.

In some embodiments, the second sound hole 1192 may be disposed on a side of the sound production component 11 that does not form an auxiliary cavity (i.e., the cavity-like structure) with the concha cavity. In some embodiments, the second sound hole 1192 may be disposed on at least one of the upper side US, the lower side LS, and the outer side OS of the sound production component 11, and the first sound hole 1191 and the second sound hole 1192 are both disposed to avoid components (e.g., the speaker, a main control circuit board, etc.) inside the housing of the sound production component 11. For example, the second sound hole 1192 may be disposed on any one of the upper side US, the lower side LS, and the outer side OS of the sound production component 11. As another example, the second sound hole 1192 may be disposed at the connection of any two sides of the upper side US, the lower side LS, and the outer side OS of the sound production component 11. In some embodiments, to make the first sound hole 1191 have a large distance between the second sound hole 1192, while considering the directivity of the line connecting the first sound hole 1191 and the second sound hole 1192, the first sound hole 1191 may be usually disposed diagonally. For example, the first sound hole 1191 is disposed at a lower left corner as shown in FIG. 6, and the second sound hole 1192 is disposed at an upper right corner as shown in FIG. 6. To illustrate a position of the second sound hole 1192 more clearly, the upper side US, the lower side LS, and the rear side FE of the sound production component 11 are used as references for description. In some embodiments, the second sound hole 1192 may be disposed on the outer side OS of the sound production component 11. In some embodiments, to avoid that the distance between the second sound hole 1192 and the antihelix of the user is too small to affect the quality of the collected sound, a distance d6 between the second sound hole 1192 and the rear side FE may be 8 mm-12 mm. In some embodiments, the distance d6 between the second sound hole 1192 and the rear side FE may be 9 mm-10 mm. To prevent that the line connecting the first sound hole 1191 and the second sound hole 1192 cannot point to the user's mouth, a distance between the second sound hole 1192 and the upper side US or the lower side LS of the sound production component 11 may be not too great or too small. For example, a distance d5 between the second sound hole 1192 and the upper side US of the sound production component 11 may be 1 mm-3 mm, or a distance d8 between the second sound hole 1192 and the lower side LS may be 4 mm-8 mm. In some embodiments, the distance d5 between the second sound hole 1192 and the upper side US may be 2 mm-2.5 mm, or the distance d8 between the second sound hole 1192 and the lower side LS may be 6 mm-8 mm. To prevent the distance between the second sound hole 1192 and the first sound hole 1191 from being too small, in some embodiments, a distance d7 between the second sound hole 1192 and the front side CE may be 8 mm-12 mm. It should be noted that, in the present disclosure, the distances from the second sound hole 1192 to the upper side, the front side, the rear side, and the lower side of the sound production component 11 refer to the distances from the center of the opening of the second sound hole 1192 on the outer side of the housing of the sound production component 11 to the upper side, the front side, or the rear side of the sound production component 11. When the side (such as the upper side, the front side, the rear side, and the lower side) of the sound production component 11 is a plane, the distance from the second sound hole 1192 to the side is a distance from the center of the opening of the second sound hole 1192 on the outer side of the housing of the sound production component 11 to the plane. When the side of the sound production component 11 is a curved side, the distance is the distance from the center of the opening of the second sound hole 1192 on the outer side of the housing of the sound production component 11 to a tangent plane of the curved side. In the present disclosure, the tangent plane corresponding to the upper side of the sound production component 11 refers to a plane parallel to the X-Z plane (or the coordinate system) and tangent to the upper side of the sound production component 11 shown in FIG. 16B. Similarly, the tangent plane corresponding to the lower side of the sound production component 11 refers to the plane parallel to the X-Z plane (or the coordinate system) and tangent to the lower side of the sound production component 11 shown in FIG. 16B. The tangent plane corresponding to the front side of the sound production component 11 refers to the plane parallel to the Y-Z plane (or the coordinate system) and tangent to the front side of the sound production component 11 shown in FIG. 16A. The tangent plane corresponding to the rear side of the sound production component 11 refers to the plane parallel to the X-Z plane (or the coordinate system) and tangent to the rear side of the sound production component 11 shown in FIG. 16A.

Figure 17:
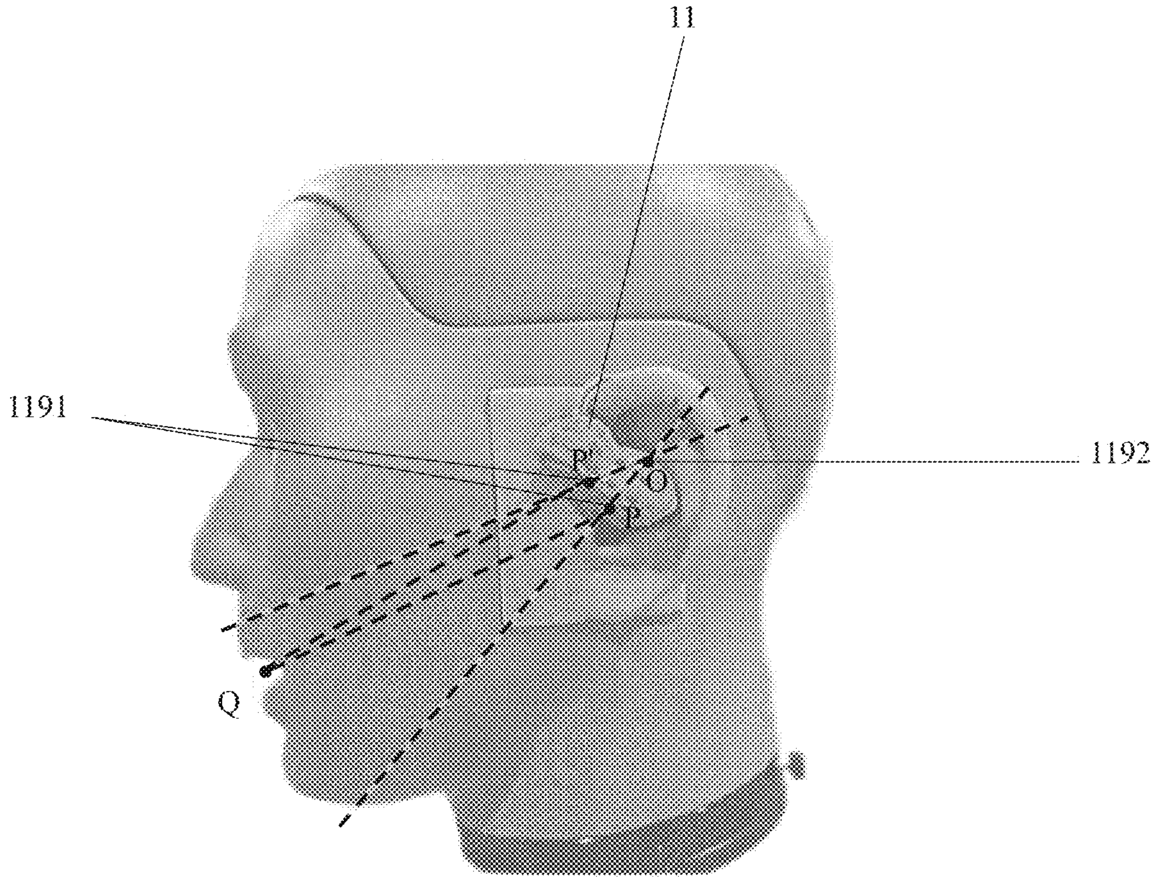
FIG. 17 is a schematic diagram illustrating an exemplary position relationship between a first sound hole, a second sound hole, and a user's mouth according to some embodiments of the present disclosure.

FIG. 17 is a schematic diagram illustrating an exemplary position relationship between a first sound hole, a second sound hole, and a user's mouth according to some embodiments of the present disclosure. As shown in FIG. 17, in some embodiments, the line connecting the first sound hole 1191 and the second sound hole 1192 may point to the user's mouth such that the first sound hole 1191 and the second sound hole 1192 may have a good sound collection effect. As shown in FIG. 17, point O indicates the position of the second sound hole 1192, points P and P' indicate two different positions of the first sound hole 1191, respectively, and point Q indicates the position of the user's mouth. In some embodiments, an included angle between the line connecting the first sound hole 1191 and the second sound hole 1192 and the line connecting the first sound hole 1191 and the user's mouth Q is about 150°, that is, the angle OPQ and/or the angle OP'Q is about 150°. Merely by way of example, in some embodiments, the angle OPQ or the angle OP'Q may be between 140°-180°, that is, the first sound hole 1191, the second sound hole 1192, and the user's mouth may be approximately disposed on a same straight line.

Figure 18:
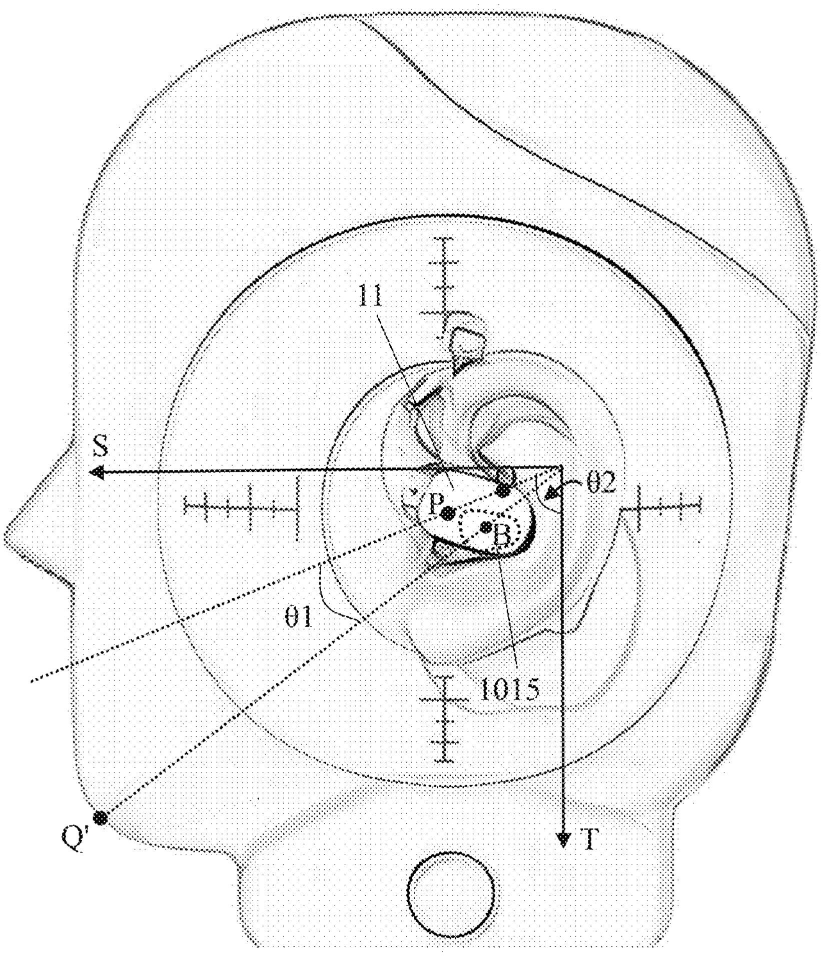
FIG. 18 is a schematic diagram illustrating an exemplary wearing state of an earphone according to some other embodiments of the present disclosure.

FIG. 18 is a schematic diagram illustrating an exemplary wearing state of an earphone according to some other embodiments of the present disclosure.

When the line connecting the first sound hole 1191 and the second sound hole 1192 points to the face of the user (e.g., when the line is disposed in a middle region between a sagittal axis S and a vertical axis T in FIG. 18), the first microphone and the second microphone may have a relatively good sound collection effect. When the line connecting the first sound hole 1191 and the second sound hole 1192 points to the region between the user's mouth and a bottom of the mandible of the user, the sound collection effect of the first microphone and the second microphone may be relatively good. In such cases, in some embodiments, to improve the sound collection effect of the earphone 10, the line connecting the first sound hole 1191 and the second sound hole 1192 may point to or approximately point to the region between the user's mouth and the bottom of the mandible of the user. In some embodiments, the bottom of the mandible of the user refers to a point of the mandible of the user farthest from the user's ear.

Referring to FIG. 18, when the earphone 10 is in the wearing state, the bottom of the mandible of the user may have a fifth projection point Q' on the sagittal plane of the user, and the center of the projection of the opening of the ear canal of the user on the sagittal plane (e.g., the dotted line region 1015 in FIG. 18) is B. Since a least a portion of the sound production component 11 of the earphone 10 extends into the user's concha cavity in the wearing state, a line connecting the fifth projection point Q' and the center B of the projection of the opening of the ear canal on the sagittal plane may reflect the relative position relationship between the sound production component 11 and the bottom of the mandible of the user.

Continuing to refer to FIG. 18, the first sound hole 1191 may have a first projection point P on the sagittal plane of the user, and the second sound hole 1192 may have a second projection point O on the sagittal plane of the user. In some embodiments, to make the first sound hole 1191 and the second sound hole 1192 have better directivity, that is, to make the line connecting the first sound hole 1191 and the second sound hole 1192 point to the region between the user's mouth and the bottom of the mandible, an angle θ1 between the line connecting the first projection point P and the second projection point O and the line connecting the fifth projection point Q' and the center B of the projection of the opening of the ear canal on the sagittal plane may be not greater than 45°. In some embodiments, the angle θ1 may be 6°-35°. In such cases, the line connecting the first sound hole 1191 and the second sound hole 1192 may point to the region near the user's mouth. In some embodiments, the angle θ1 may be 10°-25°, in such cases, the line connecting the first sound hole 1191 and the second sound hole 1192 may point to the user's mouth more accurately.

Considering that when the line connecting the first projection point P of the first sound hole 1191 on the sagittal plane and the second projection point O of the second sound hole 1192 on the sagittal plane points to the region between the user's mouth and the bottom of the mandible, the first microphone and the second microphone may have better sound collection effects. The distribution positions of the first projection point P and the second projection point O are further described by taking a vertical axis of the user as a reference. Continuing to refer to FIG. 18, to make the line connecting the first projection point P and the second projection point O point to the region between the user's mouth and the end point of the bottom of the mandible, so as to obtain the user's voice when speaking effectively, the line connecting the first projection point P and the second projection point O has a corresponding critical direction, for example, the sagittal axis S and the vertical axis T shown in FIG. 18. When the line connecting the first projection point P and the second projection point O is in an S-T coordinate system, the sound collection effect of the first microphone and the second microphone may be improved. The critical direction is described in connection with the wearing state of the earphone. As shown in FIG. 18, the mouth is at the lower left of the ear. If the line connecting the first projection point P and the second projection point O points to the upper left, the upper, the lower right, the upper right, or the right of the ear, a sound signal obtained by the first microphone and the second microphone when the user speaks may be extremely small. In such cases, the line connecting the first projection point P and the second projection point O pointing to the left side of the ear may be a critical direction, and the line connecting the first projection point P and the second projection point O pointing to the lower side of the ear may be a critical direction. It should be understood that the critical direction mentioned in the embodiment of the present disclosure is used to represent a critical value which the line connecting the first projection point P and the second projection point O (or the line connecting the first sound hole 1191 and the second sound hole 1192) points to. For example, as shown in FIG. 18, when the line connecting the first projection point P and the second projection point O points to the two critical directions, the first microphone and the second microphone may have a better directivity. The sagittal axis S and vertical axis T of the user are used to represent the two critical directions mentioned above. In some embodiments, an angle θ2 between the line connecting the first projection point P and the second projection point O and the vertical axis of the user may be less than 90°. To make the line connecting the first projection point P and the second projection point O point to the region close to the user's mouth or the bottom of the mandible of the user, so as to improve the sound collection effect of the first microphone and the second microphone when the user speaks, in some embodiments, the angle θ2 between the line connecting the first projection point P and the second projection point O and the vertical axis of the user may be in a range of 20°-80°. In some embodiments, the angle θ2 may be in a range of 40°-70°. In such cases, the line connecting the first projection point P and the second projection point O may point to the region of the user's mouth or the bottom of the mandible of the user. In some embodiments, the angle θ2 may be in a range of 42°-65°. In such cases, the line connecting the first projection point P and the second projection point O may point to the user's mouth more accurately.

Figure 19:
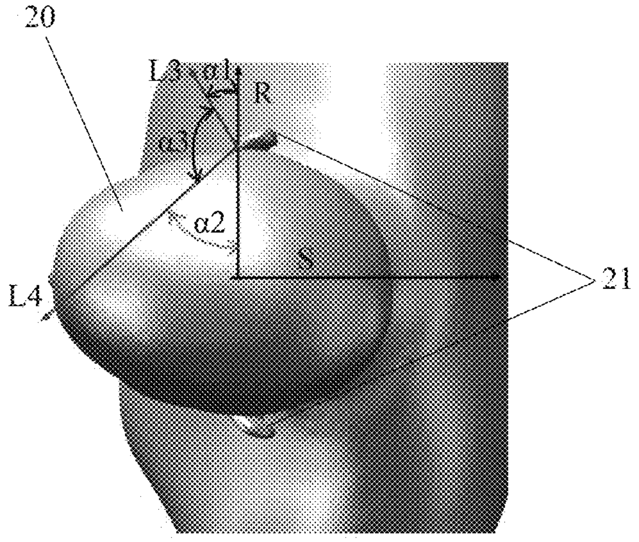
FIG. 19 is a schematic diagram illustrating an exemplary wearing state of an earphone according to some other embodiments of the present disclosure.

FIG. 19 is a schematic diagram illustrating an exemplary wearing state of an earphone according to some other embodiments of the present disclosure.

To further illustrate the positions of the first sound hole 1191 and the second sound hole 1192 in the earphone, a coronal axis R of the user is used for description. When an angle between the line connecting the first sound hole 1191 and the second sound hole 1192 and the coronal axis is too small, the line connecting the first sound hole 1191 and the second sound hole 1192 may be approximately regarded as pointing to the left or right of the head of the human body. As a result, the sound collection effect of the microphone when collecting the user's speech is not good. When the angle between the line connecting the first sound hole 1191 and the second sound hole 1192 and the coronal axis is too great, the line connecting the first sound hole 1191 and the second sound hole 1192 may point directly to the user's head. As a result, the sound collection effect of the microphone when collecting the user's speech is not good. To ensure that the line connecting the first sound hole 1191 and the second sound hole 1192 points to the front of the human face as much as possible, the angle between the line connecting the first sound hole 1191 and the second sound hole 1192 and the coronal axis of the user (e.g., the R axis in FIG. 18, the R axis is perpendicular to the sagittal plane (i.e., an S-T plane)) may be between −30°–−135°, which may ensure that the line connecting the first sound hole 1191 and the second sound hole 1192 may point to the front side of the human face. More descriptions regarding the angle between the line connecting the first sound hole 1191 and the second sound hole 1192 relative to the coronal axis of the user may be found in FIG. 19 and the relevant descriptions thereof.

Referring to FIG. 19, FIG. 19 illustrates a relative relationship between the user's head and the coronal axis and the sagittal axis of the user. The reference sign 20 indicates the user's head, and reference sign 21 indicates the user's ear. As shown in FIG. 19, in some embodiments of the present disclosure, a direction of the coronal axis shown in FIG. 19 may be used as a reference, and radial L3 and radial L4 may indicate the critical directions of the line connecting the first sound hole 1191 and the second sound hole 1192. That is, when the line connecting the first sound hole 1191 and the second sound hole 1192 is between the radial L3 and the radial L4, the line connecting the first sound hole 1191 and the second sound hole 1192 may point to the front side of the user's face. In some embodiments, an angle α1 between the radial L3 and the coronal axis R is about 30°, and an angle α2 between the radial L4 and the sagittal axis S is about 45°. Accordingly, an angle α3 between the line connecting the first sound hole 1191 and the second sound hole 1192 and the coronal axis R of the user may be between −30°-- 135°. In some embodiments, the angle α3 may be between −50°-- 125°. In such cases, the line connecting the first sound hole 1191 and the second sound hole 1192 may point to the region close to the user's mouth. In some embodiments, the angle α3 may be between −90°--115°. In such cases, the line connecting the first sound hole 1191 and the second sound hole 1192 may point to the region of the user's mouth. When the angle α3 is −90°, the line connecting the first sound hole 1191 and the second sound hole 1192 may be parallel to the sagittal plane of the user. It should be noted that the angle here is determined with the clockwise direction as a positive direction.

Figure 20:
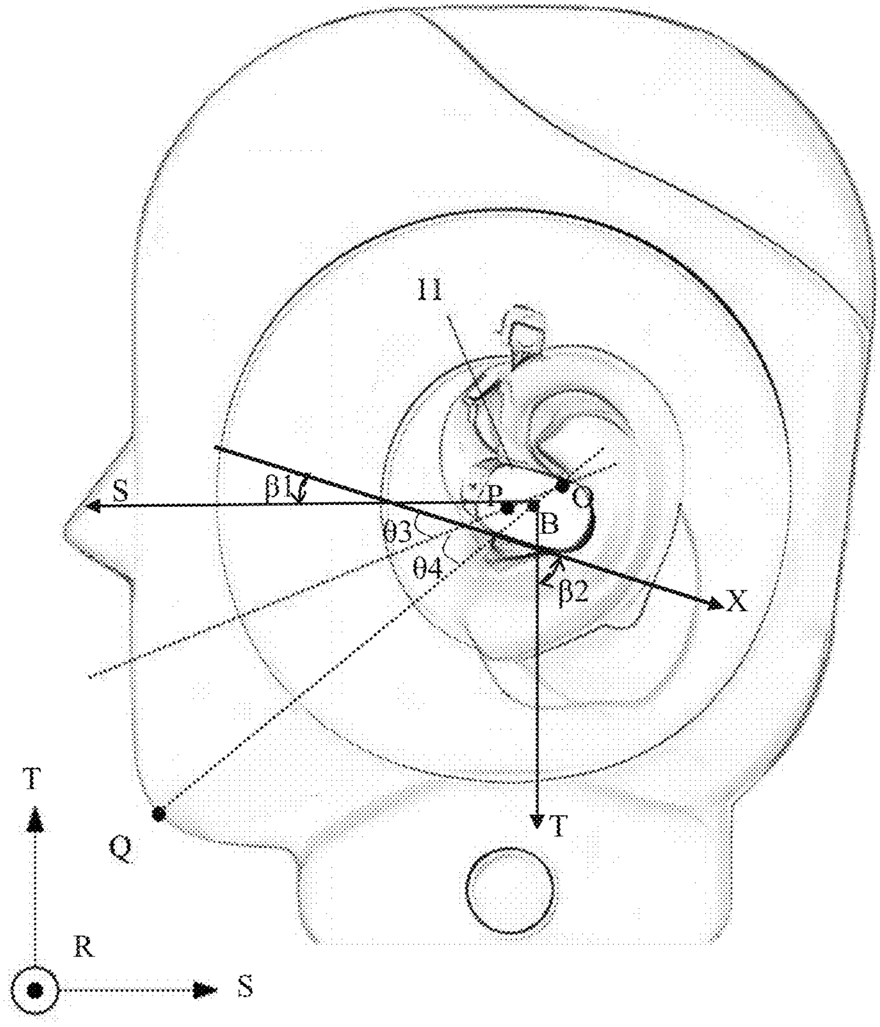
FIG. 20 is a schematic diagram illustrating an exemplary wearing state of an earphone according to some other embodiments of the present disclosure.

FIG. 20 is a schematic diagram illustrating an exemplary wearing state of an earphone according to some other embodiments of the present disclosure.

Referring to FIG. 20, the first sound hole 1191 may have a first projection point P on the sagittal plane of the user, and the second sound hole 1192 may have a second projection point O on the sagittal plane of the user. An angle between the line connecting the first projection point P and the second projection point O and a long axis direction X of the projection of the sound production component 11 on the sagittal plane may be indicated as θ3. It should be understood that when the earphone 10 is in the wearing state, the position of the sound production component 11 relative to the ear may be regarded as unchanged. In such cases, an angle θ4 between the line connecting the fifth projection point Q' of the bottom of the mandible of the user on the sagittal plane and the center B of the projection of the opening of the ear canal of the user on the sagittal plane and the long axis direction X of the projection of the sound production component 11 may be approximately regarded as unchanged. The closer θ3 is to θ4, the better the directivity of the line connecting the first sound hole 1191 and the second sound hole 1192. In some embodiments, the angle θ3 may be adjusted to adjust the sound collection effect of the first sound hole 1191 and the second sound hole 1192.

As shown in FIG. 20, the sagittal axis S and the vertical axis T may indicate critical directions of the line connecting the first projection point P and the second projection point O relative to the long axis direction X of the projection of the sound production component 11 on the sagittal plane. That is, when the line connecting the first projection point P and the second projection point O is in the coordinate system S-T, the sound collection effect of the first microphone and the second microphone when the user speaks may be improved. Specifically, in some embodiments of the present disclosure, when the earphone 10 is in the wearing state, an angle β1 between the long axis direction X and the sagittal axis S may be about 20°, and an angle β2 between the long axis direction X and the vertical axis T may be about 45°. The angle θ4 between the line connecting the fifth projection point Q' of the bottom of the mandible of the user on the sagittal plane and the center B of the projection of the opening of the ear canal of the user on the sagittal plane and the long axis direction X of the projection of the sound production component 11 may be between 50°-75°. Accordingly, in some embodiments, the angle between the line connecting the first projection point P and the second projection point O and the long axis direction X of the projection of the sound production component 11 on the sagittal plane may be represented by taking a negative direction of the long axis direction X shown in FIG. 20 as 0° and the counterclockwise direction as the positive direction. Then the angle θ3 between the line connecting the first projection point P and the second projection point O and the long axis direction X of the projection of the sound production component 11 on the sagittal plane may be between 20°-135°. In some embodiments, the angle θ3 may be 45°-70°. In such cases, the line connecting the first projection point P and the second projection point O may more accurately point to the region between the user's mouth and the bottom of the mandible of the user.

Figure 21A:
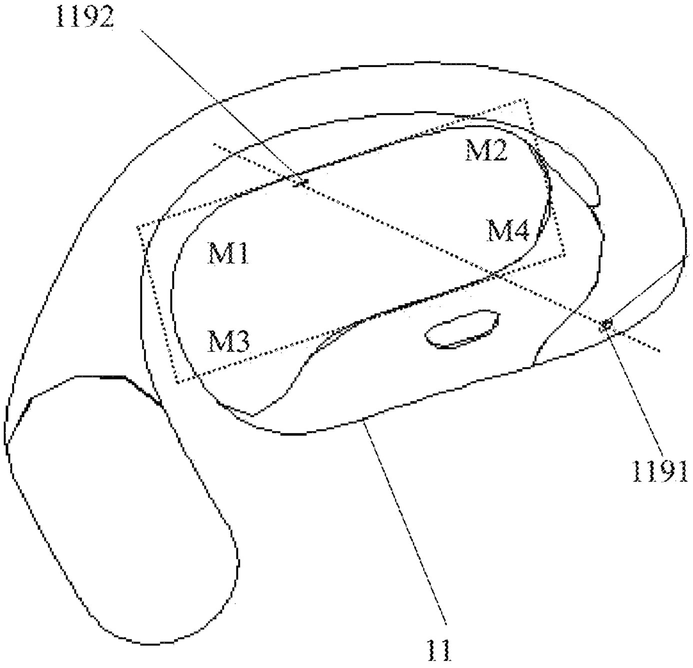
FIG. 21A is a schematic diagram illustrating an exemplary wearing state of an earphone according to some other embodiments of the present disclosure.
Figure 21B:
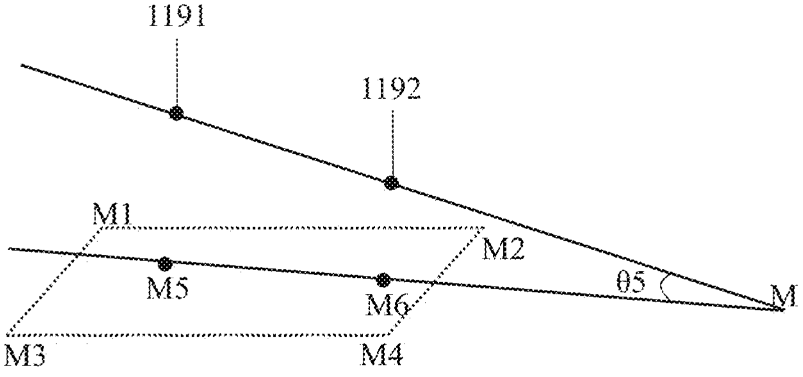
FIG. 21B is a schematic diagram illustrating an angle between a line connecting a first sound hole and a second sound hole and an outer side of a sound production component according to some embodiments of the present disclosure.

FIG. 21A is a schematic diagram illustrating an exemplary wearing state of an earphone according to some other embodiments of the present disclosure. FIG. 21B is a schematic diagram illustrating an angle between a line connecting a first sound hole and a second sound hole and an outer side of a sound production component according to some embodiments of the present disclosure.

Referring to FIG. 21A and FIG. 21B, in some embodiments, the angle between the line connecting the first sound hole 1191 and the second sound hole 1192 and the outer side of the sound production component 11 may be indicated as θ5. In some embodiments, the outer side of the sound production component 11 may be a plane. In such cases, the angle between the line connecting the first sound hole and the second sound hole and the outer side may be an angle between the line connecting the first sound hole and the second sound hole and the plane. In some embodiments, the outer side of the sound production component 11 may be a curved side, and the angle between the line connecting the first sound hole and the second sound hole and the outer side refers to an angle between the line connecting the first sound hole and the second sound hole and a plane tangent to the curved side of the outer side. Take the outer side being a plane as an example for illustration. In some embodiments, the outer side of the sound production component 11 may be indicated by four points M1, M2, M3, and M4 on the outer side. In some embodiments, the first sound hole 1191 and the second sound hole 1192 may be disposed on the same side or on different sides of the sound production component 11. For example, in some embodiments, the first sound hole 1191 and the second sound hole 1192 may both be disposed on the outer side of the sound production component 11. As another example, in some embodiments, the first sound hole 1191 may be disposed on the front side of the sound production component 11, and the second sound hole 1192 may be disposed on the outer side of the sound production component 11. As another example, in some embodiments, the first sound hole 1191 may be disposed on the lower side of the sound production component 11, and the second sound hole 1192 may be disposed on the outer side of the sound production component 11.

As shown in FIG. 21B, the first sound hole 1191 has a projection point M5 on the outer side M1M2M3M4, and the second sound hole 1192 has a projection point M6 on the outer side M1M2M3M4. The angle θ5 between the line connecting the first sound hole 1191 and the second sound hole 1192 and the outer side of the sound production component 11 refers to an angle between the line connecting the projection point M5 and the projection point M6 and the line connecting the first sound hole 1191 and the second sound hole 1192.

It should be understood that the angle θ5 may reflect the relative position relationship between the first sound hole 1191 and the second sound hole 1192 in the thickness direction of the sound production component 11, and may further reflect the directivity of the line connecting the first sound hole 1191 and the second sound hole 1192 relative to the user's mouth. In some embodiments, to make the line connecting the first sound hole 1191 and the second sound hole 1192 have better directivity, so as to ensure that the first sound hole 1191 and the second sound hole 1192 have a better sound collection effect, the angle θ5 may be between 0°-60°. In such cases, the line connecting the first sound hole 1191 and the second sound hole 1192 may be approximately directed to the region in front of the user's face such that the first microphone and the second microphone may have a better sound collection effect. In some embodiments, the angle θ5 may be 10°-50°. In such cases, the line connecting the first sound hole 1191 and the second sound hole 1192 may be approximately pointed to the region close to the user's mouth, thereby improving the sound collection effects of the first microphone and the second microphone. In some embodiments, the angle θ5 may be 25°-38°. In such cases, the line connecting the first sound hole 1191 and the second sound hole 1192 may point to the user's mouth, thereby improving the sound collection effects of the first microphone and the second microphone.

In some embodiments, to improve the sound collection effects of the first sound hole 1191 and the second sound hole 1192, the first sound hole 1191 and the second sound hole 1192 may have large areas. In some embodiments, diameters of the first sound hole and the second sound hole may be greater than 0.8 mm. In some embodiments, the diameters of the first sound hole and the second sound hole may be greater than 0.85 mm, so as to further improve the sound collection effects of the first sound hole 1191 and the second sound hole 1192. In some embodiments, the diameters of the first sound hole and the second sound hole may be 0.9 mm.

In some embodiments, to improve dustproof and/or waterproof effects of the first sound hole 1191 and the second sound hole 1192, the areas of the first sound hole 1191 and the second sound hole 1192 may be not too large. Accordingly, in some embodiments, to improve the sound collection effect and dustproof and waterproof effects of the first sound hole 1191 and the second sound hole 1192, the diameters of the first sound hole 1191 and the second sound hole 1192 may be between 0.8 mm-3 mm. For example, in some embodiments, the diameters of the first sound hole 1191 and the second sound hole 1192 may be 0.8 mm-2.5 mm, so as to further improve the dustproof and waterproof effects of the first sound hole 1191 and the second sound hole 1192. In some embodiments, the diameters of the first sound hole 1191 and the second sound hole 1192 may be 0.85 mm-1.5 mm, so as to further improve the sound collection effect and dustproof and waterproof effects of the first sound hole 1191 and the second sound hole 1192. It should be noted that, in the present disclosure, the first sound hole 1191 and the second sound hole 1192 may have the same or different hole diameters. When the shape of the first sound hole 1191 and/or the second sound hole 1192 is irregular, the diameter may be understood as a maximum inner diameter or an average inner diameter.

In some embodiments, considering that if a depth of the first sound hole 1191 and the second sound hole 1192 are too large (e.g., greater than 8 mm), a sound loss may be generated when the sounds are transmitted to the first microphone and the second microphone, and sounds in the mid-high frequency may be sharper. Therefore, to improve the sound collection effects of the first sound hole 1191 and the second sound hole 1192, the depth of the first sound hole 1191 and/or the second sound hole 1192 may be less than 4 mm. In some embodiments, the depth of the first sound hole 1191 or the second sound hole 1192 refers to a distance from the opening of the first sound hole 1191 or the second sound hole 1192 to the corresponding microphone. In some embodiments, when the first microphone and the second microphone are disposed close to the housing, the depths of the first sound hole 1191 and the second sound hole 1192 may be equal to a thickness of the housing. For example, in some embodiments, the depths of the first sound hole 1191 and the second sound hole 1192 may be less than 2.5 mm, so as to further reduce the sound loss when the sounds are transmitted to the first microphone and the second microphone, and improve the sound collection effect for the sounds at the mid-high frequency.

In some embodiments, to improve the sound collection effect of the first sound hole 1191 and the second sound hole 1192, the depths of the first sound hole 1191 and the second sound hole 1192 may be consistent. If the depth of the first sound hole 1191 is inconsistent with the depth of the second sound hole 1192, a portion of the sounds may travel an extra distance, which may cause different responses of the first sound hole 1191 and the second sound hole 1192 to the noise, thereby affecting a noise reduction effect and the sound quality of the earphone 10.

In some embodiments, the first sound hole 1191 and the second sound hole 1192 may include a dustproof and waterproof net. The first sound hole 1191 and the second sound hole 1192 may be sealed, for example, by a silicone sleeve, a double-sided tape, etc.

In some embodiments, an adjustment algorithm may be used in the earphone 10 such that a low-frequency response of the earphone 10 may be improved when the volume is low, and at the same time there is no change when the volume is high, so as to avoid damage to the speaker due to a broken sound. According to the adjustment algorithm, the user may independently adjust the sound collection effect of the earphone.

Figure 22:
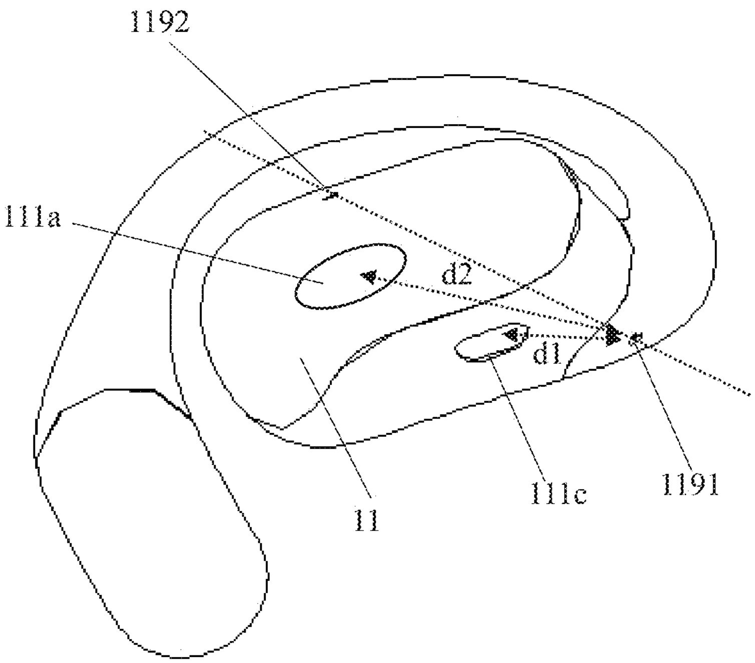
FIG. 22 is a schematic diagram illustrating an exemplary structure of an earphone according to some other embodiments of the present disclosure.

FIG. 22 is a schematic diagram illustrating an exemplary structure of an earphone according to some other embodiments of the present disclosure.

Referring to FIG. 22, in some embodiments, the sound production component 11 may further include at least one sound guiding hole (such as a sound guiding hole 111*a*) and at least one pressure relief hole (such as a pressure relief hole 111*c*). The sound guiding hole 111*a* is disposed on an inner side of the sound production component 11, and the pressure relief hole 111*c* is disposed on a lower side of the sound production component 11. In some embodiments, the pressure relief hole 111*c* may further be disposed on any one of an upper side, a front side, a rear side, and an outer side of the sound production component. In some embodiments, a distance between the first sound hole 1191 and the pressure relief hole 111*c*, as well as a distance between the first sound hole 1191 and the sound guiding hole 111*a* may satisfy a certain relationship, so as to prevent an echo of the sounds from the sound guiding hole 111*a* and the pressure relief hole 111*c* generated at the first sound hole 1191 and the second sound hole 1192.

Referring to FIG. 22, in some embodiments, the distance between the first sound hole 1191 and the pressure relief hole 111*c* may be indicated as d1, and the distance between the first sound hole 1191 and the sound guiding hole 111*a* may be indicated as d2. In some embodiments, as a hole mainly used for the sound collection, the first sound hole 1191 may be disposed near an acoustic zero point (e.g., a region where the sound leakages of the sound guiding hole 111*a* and the pressure relief hole 111*c* cancel each other), so as to reduce interference of the speaker to the first microphone. Specifically, in some embodiments, to dispose the first sound hole 1191 near the acoustic zero point, a difference between d1 and d2 may be less than 10 mm. The smaller the difference between d1 and d2, the more effectively the sound leakages of the sound hole 111*a* and the pressure relief hole 111*c* cancel each other. In some embodiments, the difference between d1 and d2 may be less than 6 mm. In some embodiments, the difference between d1 and d2 may be less than 4 mm, so as to further reduce the interference of the speaker to the first microphone.

Figure 23:
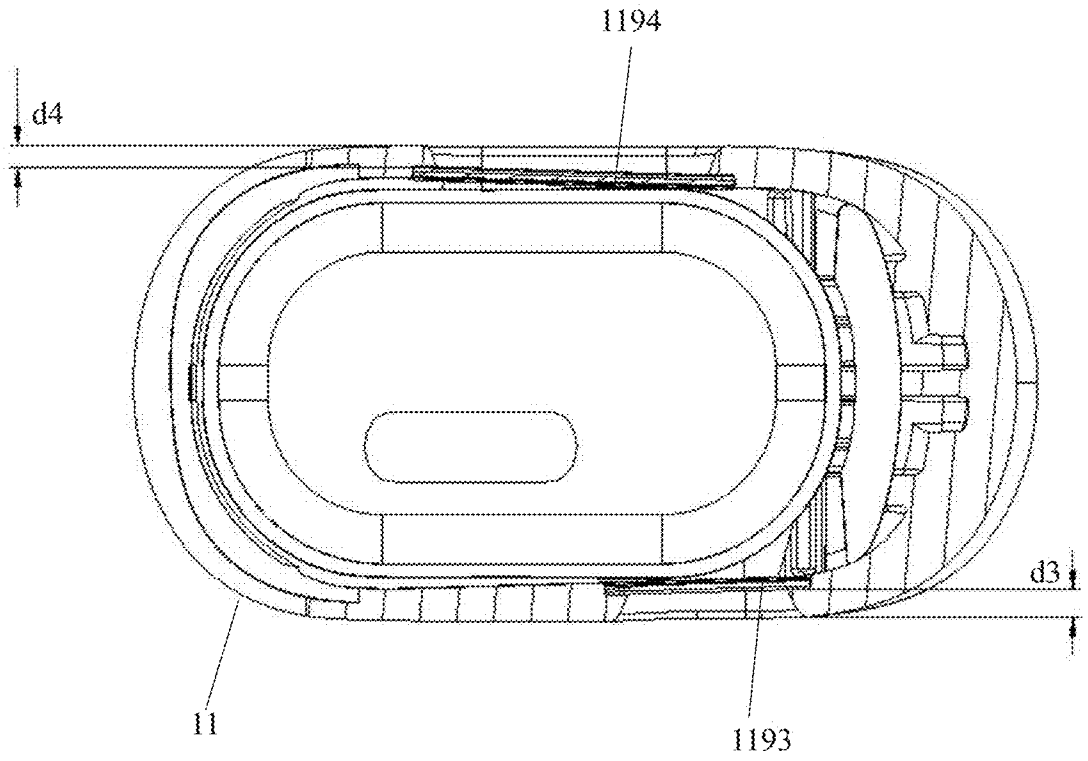
FIG. 23 is a schematic diagram illustrating a cross-sectional structure of an exemplary sound production component of an earphone according to some other embodiments of the present disclosure.

FIG. 23 is a schematic diagram illustrating a cross-sectional structure of an exemplary sound production component of an earphone according to some other embodiments of the present disclosure.

Referring to FIG. 23, in some embodiments, a first acoustic resistance net 1193 may be disposed in the first sound hole 1191, and a second acoustic resistance net 1192 may be disposed in the second sound hole 1192. The first acoustic resistance net 1193 and the second acoustic resistance net 1194 may refer to structures with a certain acoustic resistance effect but do not completely block a sound transmission. In some embodiments, the first acoustic resistance net 1193 and/or the second acoustic resistance net 1193 may include a gauze and/or a steel net. In some embodiments, the first acoustic resistance net 1193 and the second acoustic resistance net 1194 may be respectively disposed in the first sound hole 1191 and the second sound hole 1192 by double-sided tape or glue. In some embodiments, the waterproof and dustproof effects of the first sound hole 1191 and the second sound hole 1192 may be improved through the first acoustic resistance net 1193 and the second acoustic resistance net 1194.

Referring to FIG. 23, in some embodiments, a distance between the first acoustic resistance net 1193 and an outer side of the housing of the sound generating sound production component 11 where the first acoustic resistance net 1193 is disposed may be indicated as d3, and a distance between the second acoustic resistance net 1194 and the outer side of the housing of the sound generating sound production component 11 where the second acoustic resistance net 1194 is disposed may be indicated as d4. It should be noted that, in the present disclosure, d3 and d4 may be the same or different. For example, when the distances d3 and d4 are the same, transmission efficiencies of the sounds passing through the first sound hole 1191 and the second sound hole 1192 may be approximately the same, which may improve the sound collection effects of the first microphone and the second microphone. For example, in some embodiments, the distance d3 may be between 0.5 mm-2 mm, and the distance d4 may further be between 0.5 mm-2 mm. In some embodiments, the distance d3 may be between 0.5 mm-1.5 mm, and the distance d4 may be between 0.5 mm-1.5 mm.

In some embodiments, to make frequency responses of the sounds received by the first microphone and the second microphone relatively flat, and improve a signal-to-noise ratio (SNR) of the sounds received by the first microphone and the second microphone, the first acoustic resistance network 1193 and the second acoustic resistance net 1194 may to have a certain acoustic resistance, for example, greater than 45 Mrayls. For example, as acoustic impedances of the first acoustic resistance net 1193 and the second acoustic resistance net 1194 increase, corresponding resonant frequencies of the first microphone or the second microphone move to a low frequency, and peak values of resonance peaks become smooth gradually. Moreover, to improve transmission efficiencies of the sounds at the first sound hole 1191 and the second sound hole 1192, thereby improving the sound collection effects of the first microphone and the second microphone, acoustic resistances of the first acoustic resistance net 1193 and the second acoustic resistance net 1194 may be not too great. Accordingly, in some embodiments, to improve the sound collection effects of the first sound hole 1191 and the second sound hole 1192, the acoustic resistances of the first acoustic resistance net 1193 and the second acoustic resistance net 1194 may be between 45 Mryls-320 Mryls. In some embodiments, the acoustic resistances of the first acoustic resistance net 1193 and the second acoustic resistance net 1194 may be 80 Mryls-260 Mryls. In such cases, the frequency response of the sound received at the first microphone or the second microphone is relatively flat, and the quality of the sound collected by the first microphone or the second microphone may be relatively high, which may further ensure that the first microphone or the second microphone has a high sensitivity to the sound. In some embodiments, the acoustic resistances of the first acoustic resistance network 1193 and the second acoustic resistance network 1194 may be 120 Mryls-200 Mryls. In such cases, the first microphone or the second microphone may have a higher sensitivity to the sound, and the frequency response of the sound received by the first microphone or the second microphone may be flatter, which may improve the quality of the sound collected by the first microphone or the second microphone. It should be noted that, a measurement of the acoustic resistance of the first acoustic resistance net 1193 and the second acoustic resistance net 1194 may be performed by ultrasonic echo measurement, or the acoustic resistance may be determined as a product of a density of the acoustic resistance net and a sound speed.

The denser the net of the acoustic resistance net, the greater the corresponding acoustic resistance of the acoustic resistance net, the more obvious a suppression effect of the acoustic resistance net on the user's voice from the user's mouth, and the smaller the intensity of the sound received by the microphone. Accordingly, parameters (e.g., a net density, a net size, a thickness, etc.) of the first acoustic resistance network 1193 and the second acoustic resistance network 1194 may be configured such that the acoustic resistances of the first acoustic resistance network 1193 and the second acoustic resistance network 1194 may be in a preset acoustic resistance range.

For example, in some embodiments, the first acoustic resistance net 1193 and/or the second acoustic resistance net 1194 may include a plurality of holes. An aperture of each hole may be in a range of 15 μm-51 μm. In some embodiments, to improve the waterproof and dustproof effects of the first sound hole 1191 and the second sound hole 1192 while considering the transmission efficiency of the sound, the aperture of each hole of the first acoustic resistance net 1193 and the second acoustic resistance net 1194 may be between 18 μm-44 μm.

In some embodiments, a porosity of the first acoustic resistance net 1193 and/or the second acoustic resistance net 1194 may be in a range of 11%-18%. The term "porosity" may be understood as a ratio of an area of the plurality of holes of the acoustic resistance net to a total area of the acoustic resistance net. The greater the porosity, the more a count of holes per unit area when a size of a single hole is constant, and the smaller the acoustic resistance of the acoustic resistance net. In some embodiments, to make the acoustic resistance of the first acoustic resistance network 1193 and/or the second acoustic resistance network 1194 between 45 Mryls-320 Mryls, the porosity of the first acoustic resistance network 1193 and/or the second acoustic resistance network 1194 may be 11%-18%. Similarly, in some embodiments, to make the acoustic resistance of the first acoustic resistance network 1193 and/or the second acoustic resistance network 1194 between 45 Mryls-320 Mryls, the thickness of the first acoustic resistance network 1193 and/or the second acoustic resistance net 1194 may be in a range of 55 μm-108 μm.

Figure 24:
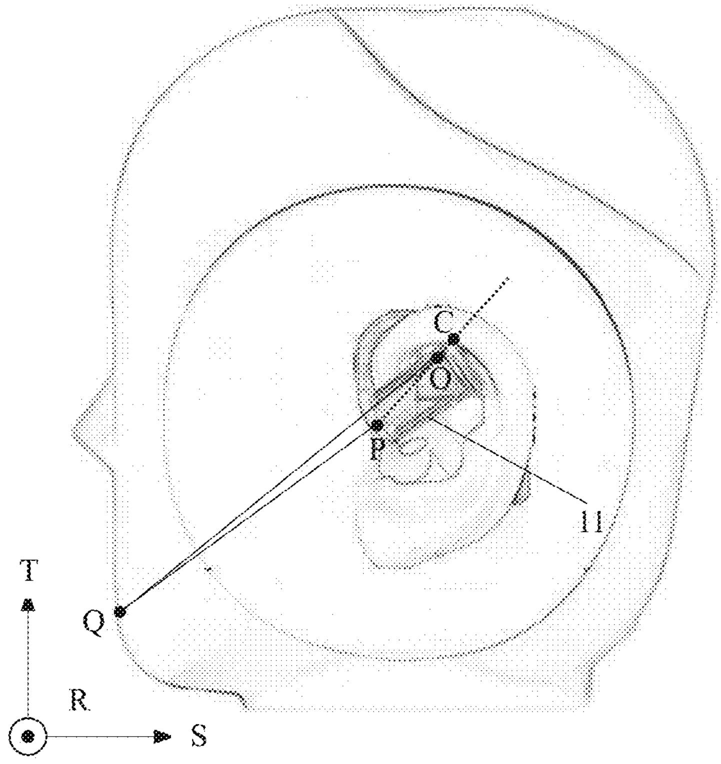
FIG. 24 is a schematic diagram illustrating an exemplary wearing state of an earphone according to some other embodiments of the present disclosure.

FIG. 24 is a schematic diagram illustrating an exemplary wearing state of an earphone according to some other embodiments of the present disclosure.

Referring to FIG. 24, in some embodiments, when the earphone 10 is in the wearing state, at least a portion of the sound production component 11 may cover an antihelix region of the user (e.g., at the position of a triangular fossa, an upper antihelix crus, a lower antihelix crus, the antihelix, or the position of the sound production component 11C relative to the ear shown in FIG. 2). In some embodiments, similarly, to ensure that the first microphone and the second microphone have a good sound collection effect, the line connecting the first sound hole 1191 and the second sound hole 1192 may be directed to the user's mouth in the wearing state.

In some embodiments, in the wearing state in which at least a portion of the sound production component 11 covers the antihelix region of the user (hereinafter referred to as a second wearing state), the first sound hole 1191 may be disposed on the earphone 10 close to the mouth, so as to improve the sound collection effect when the first microphone collects the sound from the user's mouth. Similar to the wearing state where at least a portion of the sound production component 11 extends into the user's concha cavity, when the earphone 10 is worn by the user with at least a portion of the sound production component 11 covers the antihelix region of the user, the first sound hole 1191 and the second sound hole 1192 may need to keep a certain distance between each other for subsequent signal processing. Moreover, as the earphone 10 is in the wearing state in which the at least portion of the sound production component 11 covers the antihelix region of the user, at least portion of the sound production component 11 may abut against the inner wall of the user's auricle (e.g., the inner contour 1014). On the premise that the sound hole 1191 is disposed close to the user's mouth and that there is a certain distance between the first sound hole 1191 and the second sound hole 1192, the second sound hole 1192 may be close to the inner contour 1014, which may result in that when the sound wave generated by the user's speech or the external sound wave is transmitted to the inner contour 1014, the inner contour 1014 may have a reflection effect on the sound wave, especially in the frequency range of 3 kHz-4 kHz, thereby resulting in that the sound received by the second microphone is greater than the sound received by the first microphone, which may affect the subsequent noise reduction effect and the sound collection effect.

Accordingly, in some embodiments, the distance between the first sound hole 1191 and the second sound hole 1192 and a distance between the second sound hole 1192 and the inner contour 1014 of the user's auricle may be adjusted to improve the noise reduction effect and the sound collection effect of the earphone. As shown in FIG. 24, when the earphone 10 is in the second wearing state, the first sound hole 1191 may have a first projection point P on the user's sagittal plane (e.g., the T-S plane shown in FIG. 24), and the second sound hole 1192 may have a second projection point O on the sagittal plane of the user. In some embodiments, to more clearly describe the position relationship between the first sound hole 1191, the second sound hole 1192, and the inner contour 1014 of the user's auricle, the distance between the first sound hole 1191 and the second sound hole 1192 may be indicated by a first distance OP between the point P and the point O. In some embodiments, an extension line of a line connecting point P and point O and the projection of the inner contour 1014 of the user's auricle on the sagittal plane may have an intersection point C. The distance between the second sound hole 1192 and the inner contour 1014 of the auricle may be indicated by the second distance between point O and intersection point C. In some embodiments, to ensure that the first microphone and the second microphone in the earphone 10 have better sound collection effects and noise reduction effects in the second wearing state, a ratio of the distance OP between the first projection point P and the second projection point O to the second distance OC between the second projection point O and the intersection point C may be between 1.8-4.4. To reduce the influence of the inner contour of the auricle on the second microphone, the distance between the second sound hole 1192 and the inner contour of the auricle may be increased, and the distance between the first sound hole 1191 and the second sound hole 1192 may be increased at the same time to facilitate the subsequent signal processing. In some embodiments, the ratio of the distance OP between the first projection point P and the second projection point O to the second distance OC between the second projection point O and the intersection point C may be between 2.5-3.8. In some embodiments, when the wearing position of the earphone remains unchanged, to further reduce the influence of the antihelix on the second microphone, the distance between the second sound hole 1192 and the antihelix may be increased, and the distance between the first sound hole 1191 and the second sound hole 1191 may be increased at the same time to facilitate the subsequent signal processing. In some embodiments, the ratio of the distance OP between the first projection point P and the second projection point O to the second distance OC between the second projection point O and the intersection point C may be between 2.8-3.5. To reduce the influence of the antihelix on the second microphone and facilitate the subsequent signal processing, the distance between the second sound hole 1192 and the antihelix may be further increased, and the distance between the first sound hole 1191 and the second sound hole 1192 may be further increased. In some embodiments, the ratio of the distance OP between the first projection point P and the second projection point O to the second distance OC between the second projection point O and the intersection point C may be between 3.0-3.3.

In some embodiments, considering that when the second sound hole 1192 is closer to the inner contour 1014 of the auricle, and when the sound waves generated by the user's speech or external sound waves are transmitted to the inner contour 1014 of the auricle, the inner contour 1014 may have a reflection effect on the sound waves, especially in the frequency range of 3 kHz-8 kHz, which may result in that the sound received by the second microphone is louder than the sound received by the first microphone, thereby affecting the subsequent noise reduction effect and sound collection effect. In addition, due to a limited size of the sound production component 11, it is necessary to ensure a relatively great distance between the first sound hole 1191 and the second sound hole 1192. While when the second sound hole 1192 is far from the inner contour 1014 of the auricle, the distance between the first sound hole 1191 and the second sound hole 1192 becomes smaller, which may affect the subsequent signal processing.

FIGS. 25A-25D are schematic diagrams illustrating frequency response curves when the distance between a second projection point O and an intersection point C varies according to some embodiments of the present disclosure.

Figure 25A:
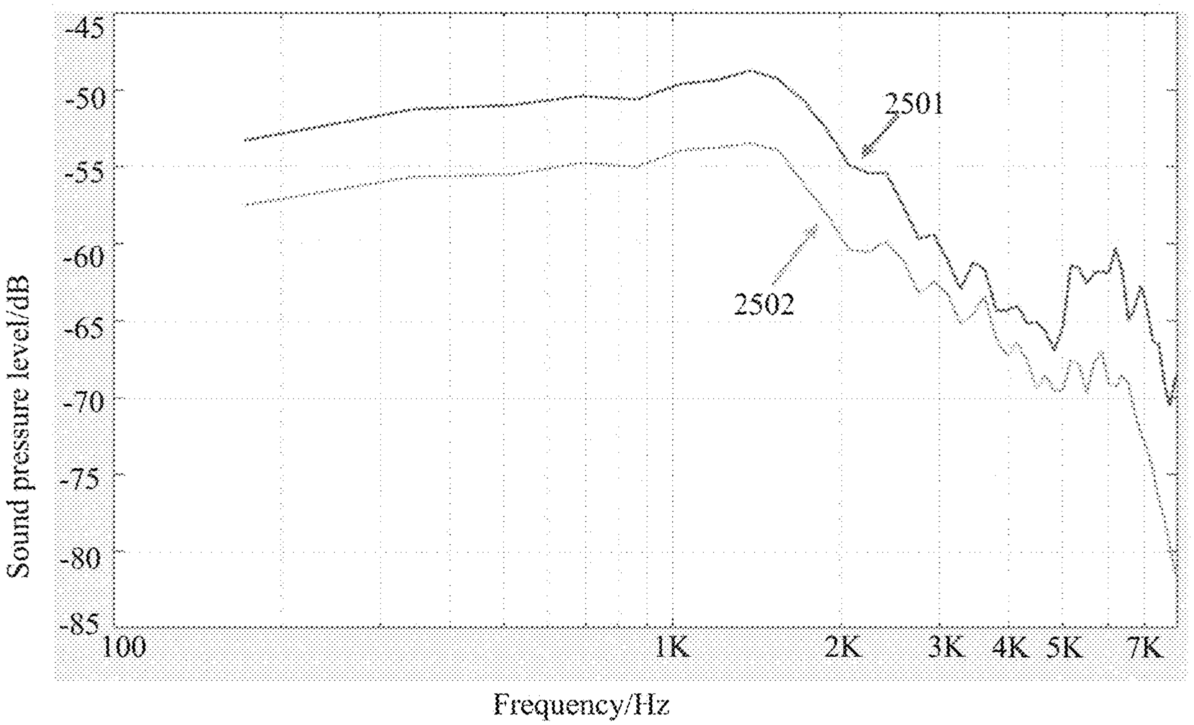
FIG. 25A is a schematic diagram illustrating frequency response curves when a distance between a second projection point O and an intersection point C is 8 mm according to some embodiments of the present disclosure.

Referring to FIG. 25A, curves 2501 and 2502 are frequency response curves of the first microphone and the second microphone when the first distance OP between the first projection point P and the second projection point O is 20 mm and the second distance OC between the second projection point O and the intersection point C is 8 mm. The second sound hole 1192 is disposed on the upper side of the sound production component 11. According to FIG. 25A, when the second sound hole 1192 is disposed on the upper side of the sound production component 11 and the second distance OC is 8 mm, the sound collection effect of the first microphone is better than the second microphone in all frequency bands, the responses of the first microphone and the second microphone to the sound are relatively consistent, and an overall sound collection effect is relatively good.

Figure 25B:
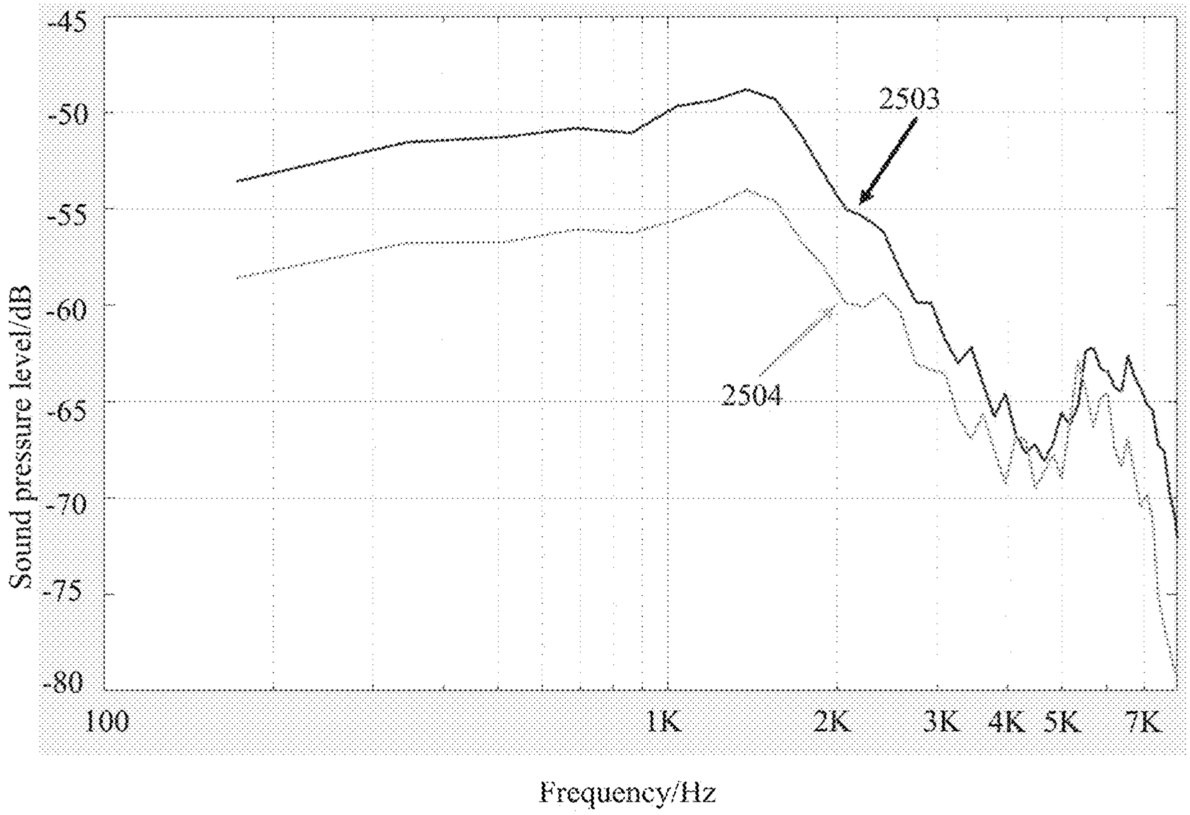
FIG. 25B is a schematic diagram illustrating frequency response curves when a distance between a second projection point O and an intersection point C is 6 mm according to some embodiments of the present disclosure.

Referring to FIG. 25B, the curve 2503 and the curve 2504 are frequency response curves of the first microphone and the second microphone when the first distance OP between the first projection point P and the second projection point O is 20 mm and the second distance OC between the second projection point O and the intersection point C is 6 mm. The second sound hole 1192 is disposed on the upper side of the sound production component 11, which is the same as the situation shown in FIG. 25A. According to FIG. 25B, when the second sound hole 1192 is disposed on the upper side of the sound production component 11 and the second distance OC is 6 mm, a difference between amplitudes of sounds collected by the first microphone and the second microphone in a frequency band above 4 kHz is very small. In such cases, a sound collection effect of the entire microphone assembly on the voice of the user's mouth may be affected, and there may be a loss in a high frequency.

Figure 25C:
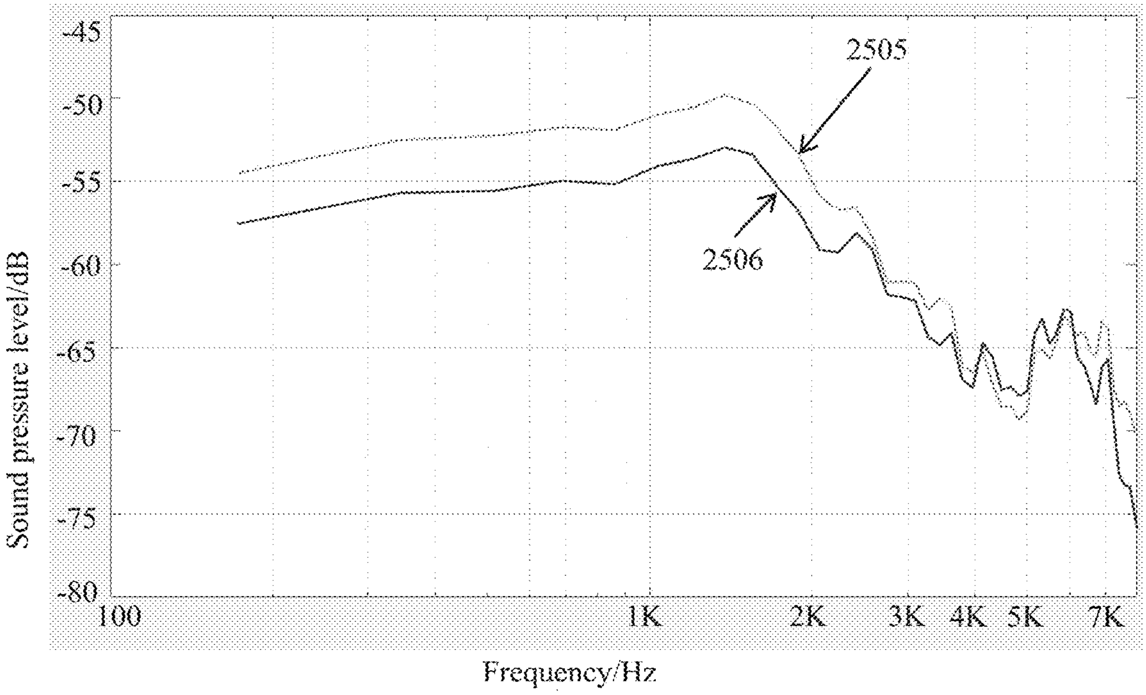
FIG. 25C is a schematic diagram illustrating frequency response curves when a distance between a second projection point O and an intersection point C is 4 mm according to some embodiments of the present disclosure.

Referring to FIG. 25C, the curves 2505 and 2506 are frequency response curves of the first microphone and the second microphone when the first distance OP between the first projection point P and the second projection point O is 20 mm and the second distance OC between the second projection point O and the intersection point C is 4 mm. The second sound hole 1192 is disposed on the upper side of the sound production component 11, which is the same as the situation shown in FIGS. 25A and 25B. According to FIG. 25C, when the second sound hole 1192 is disposed on the upper side of the sound production component 11 and the second distance OC is 4 mm, a difference between amplitudes of sounds collected by the first microphone and the second microphone in a frequency band between 2.2 kHz-4 kHz is also significantly reduced, and the frequency band with a good sound collection effect is further narrowed.

Figure 25D:
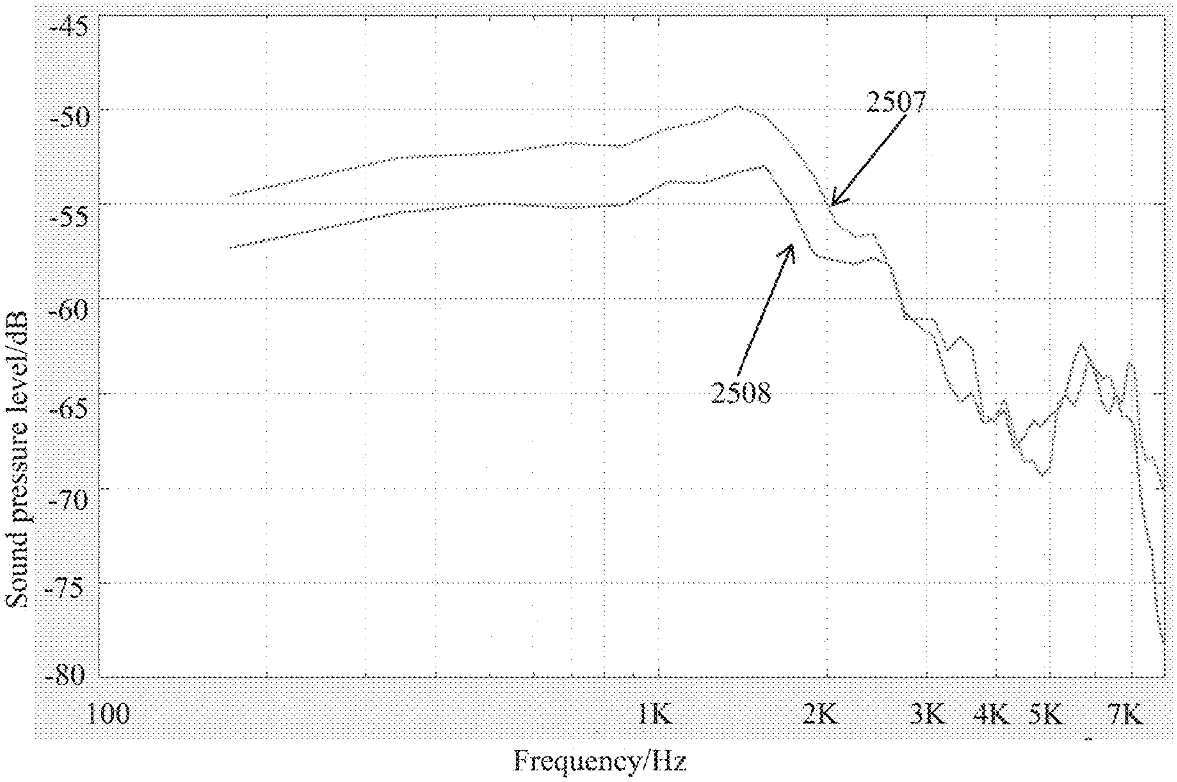
FIG. 25D is a schematic diagram illustrating frequency response curves when a distance between a second projection point O and an intersection point C is 2 mm according to some embodiments of the present disclosure.

Referring to FIG. 25D, the curve 2507 and the curve 2508 are frequency response curves of the first microphone and the second microphone when the first distance OP between the first projection point P and the second projection point O is 20 mm and the second distance OC between the second projection point O and the intersection point C is 2 mm. The second sound hole 1192 is disposed on the upper side of the sound production component 11, which is the same as the situation shown in FIGS. 25A-25C. According to FIG. 25D, when the second sound hole 1192 is disposed on the upper side of the sound production component 11 and the second distance OC is 2 mm, there is almost no difference between the amplitudes of sounds collected by the first microphone and the second microphone in a frequency band above 2.2 kHz, and the sound collection effect of the microphone assembly on the voice of the user's mouth may be seriously affected.

In some embodiments, to ensure that the first microphone and the second microphone have better sound collection effects and noise reduction effects, the distance between the second projection point O and the intersection point C of the second sound hole 1192 on the sagittal plane may be between 2 mm-10 mm. For example, to reduce the reflection effect of the inner auricle 1014 of the auricle on the sound waves and improve the sound collection effects of the first microphone and the second microphone, the distance between the second sound hole 1192 and the inner auricle 1014 of the auricle may be increased. In some embodiments, the distance between the second projection point O and the intersection point C may be between 4 mm-10 mm. To further reduce the reflection effect of the inner auricle 1014 of the profile on the sound waves and further improve the sound collection effects of the first microphone and the second microphone, the distance between the second sound hole 1192 and the inner auricle 1014 of the auricle may be further increased. In some embodiments, the distance between the second projection point O and the intersection point C may be between 6 mm-10 mm. When the second sound hole 1192 is disposed at a position far from the inner auricle 1014 of the auricle, the reflection effect of the inner auricle 1014 of the auricle on the sound wave may hardly affect the second sound hole 1192. In some embodiments, the distance between the second projection point O and the intersection point C may be between 8 mm-10 mm.

It should be noted that the above description is mainly aimed at the situation where the second sound hole 1192 is disposed on the upper side of the sound production component 11. When the second sound hole 1192 is disposed on the outer side of the sound production component, since the second sound hole 1192 is basically on the same plane with the user's helix, the distance between the second projection point O and the intersection point C has no significant influence on the sound collection effect of the second microphone. In such cases, it only needs to ensure that the user's helix is not significantly higher than the second sound hole 1192.

Continuing to refer to FIG. 24, in the second wearing state, the distance between the first sound hole 1191 and the user's mouth (referring to point Q in FIG. 24) may be smaller than the distance between the second sound hole 1192 and the user's mouth, so as to facilitate the subsequent signal processing. As shown in FIG. 24, when the earphone 10 is in the second wearing state, the first sound hole 1191 may have the first projection point P on the sagittal plane of the user (e.g., the T-S plane shown in FIG. 24), the second sound hole 1192 may have the second projection point O on the sagittal plane of the user, and the third projection point Q is used to indicate the projection of the user's mouth (e.g., the lip bead) on the sagittal plane of the user. The distance between PQ is less than the distance between OQ.

In some embodiments, the line connecting the first projection point P of the first sound hole 1191 on the sagittal plane of the user and the second projection point O of the second sound hole 1192 on the sagittal plane approximately points to the third projection point Q of the user's mouth on the sagittal plane. In such cases, a directivity algorithm may be constructed based on the sounds received by the first microphone and the second microphone such that the received voice of the user may be clearer.

In some embodiments, the line PQ connecting the first projection point P and the third projection point Q may form a certain angle with respect to the line OQ connecting the second projection point O and the third projection point Q. To ensure the directivity of the first sound hole 1191 and the second sound hole 1192, an angle between PQ and OQ may be made smaller than 30°. In some embodiments, the angle between PQ and OQ may be 0°-25°. In some embodiments, the angle between PQ and OQ may be 5°-20°. For example, in some embodiments, the angle between PQ and OQ may be 0°, 3°, 9° or 15°, etc.

When the distance between the first sound hole 1191 and the second sound hole 1192 is too small, the difficulty of processing low-frequency signals may increase (mainly because a phase difference of the low-frequency signals may be small), which may increase the difficulty of performing an accurate calculation. Therefore, the distance between the sound hole 1191 and the second sound hole 1192 may be not too small. More descriptions regarding the distance between the first sound hole 1191 and the second sound hole 1192 may be found elsewhere in the present disclosure. See, e.g., FIG. 7 and relevant descriptions thereof, the details are not repeated here.

Figure 26:
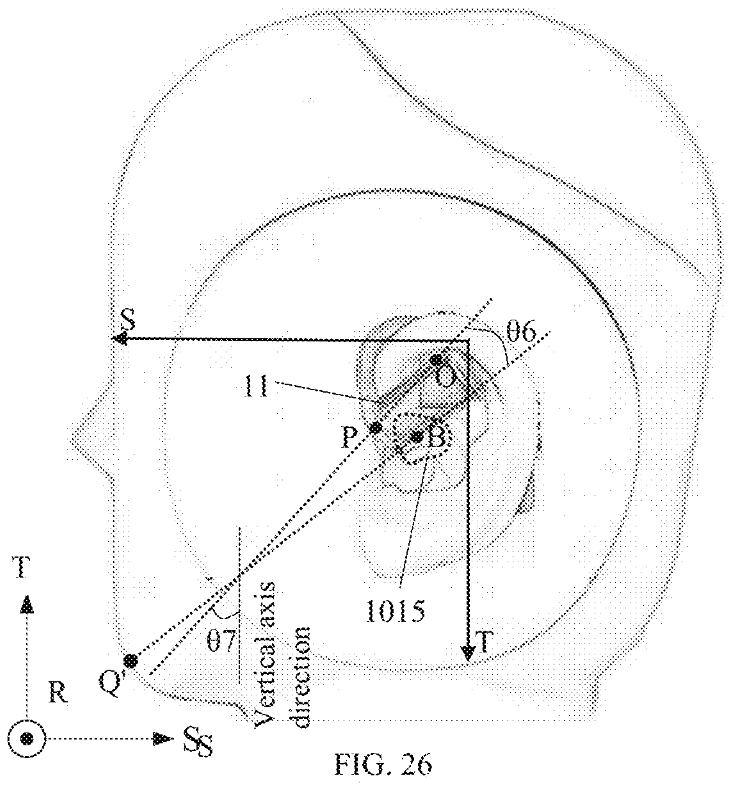
FIG. 26 is a schematic diagram illustrating an exemplary wearing state of an earphone according to some other embodiments of the present disclosure.

FIG. 26 is a schematic diagram illustrating an exemplary wearing state of an earphone according to some other embodiments of the present disclosure.

Referring to FIG. 26, when the earphone 10 is in the second wearing state, the bottom of the mandible of the user may have a fifth projection point Q' on a sagittal plane of the user, and a centroid of the projection of the opening of the ear canal of the user on the sagittal plane (e.g., the dotted line area 1015 in FIG. 26) is B. The line connecting the fifth projection point Q' and the center B on the sagittal plane may reflect a relative position between the sound production component 11 and the bottom of the mandible of the user.

Continuing to refer to FIG. 26, the first sound hole 1191 may have a first projection point P on the sagittal plane of the user, and the second sound hole 1192 may have a second projection point O on the sagittal plane of the user. In some embodiments, to make the first sound hole 1191 and the second sound hole 1192 have better directivity, that is, the line connecting the first sound hole 1191 and the second sound hole 1192 point to the region between the user's mouth and the bottom of the mandible of the user, an angle θ6 between the line connecting the first projection point P and the second projection point O and a line connecting the fifth projection point Q' and the centroid B of the projection of the opening of the ear canal on the sagittal plane may be not greater than 45°. In some embodiments, when the earphone 10 is in the second wearing state, the angle θ6 may be 6°-35°. In such cases, the line connecting the first sound hole 1191 and the second sound hole 1192 may point to the region close to the user's mouth. In some embodiments, the angle θ6 may be 10°-25°. In such cases, the line connecting the first sound hole 1191 and the second sound hole 1192 may point to the user's mouth more accurately.

Continuing to refer to FIG. 26, the sagittal axis S and the vertical axis T may represent critical directions of the line connecting the first sound hole 1191 and the second sound hole 1192. That is, in some embodiments of the present disclosure, to improve the sound collection effects of the first microphone and the second microphone when collecting the user's speech, the line connecting the first sound hole 1191 and the second sound hole 1192 may be between the sagittal axis S and the vertical axis T. The line connecting the first projection point P and the second projection point O may form a certain angle θ7 with the vertical axis of the user. The angle θ7 may reflect the directivity of the line connecting the first sound hole 1191 and the second sound hole 1192. Accordingly, in some embodiments, to improve the sound collection effects of the first sound hole 1191 and the second sound hole 1192, the angle θ7 between the line connecting the first projection point P and the second projection point O and the vertical axis of the user may be in a range of 20°-80°. In such cases, the line connecting the first projection point P and the second projection point O may point to the region close to the user's mouth or the bottom of the mandible of the user. In some embodiments, the angle θ7 may be in a range of 40°-70°. In such cases, the line connecting the first projection point P and the second projection point O points to the region of the user's mouth or the bottom of the mandible of the user. In some embodiments, the angle θ7 may be in the range of 42°–65°. In such cases, the line connecting the first projection point P and the second projection point O may point to the region of the user's mouth more accurately.

Figure 27:
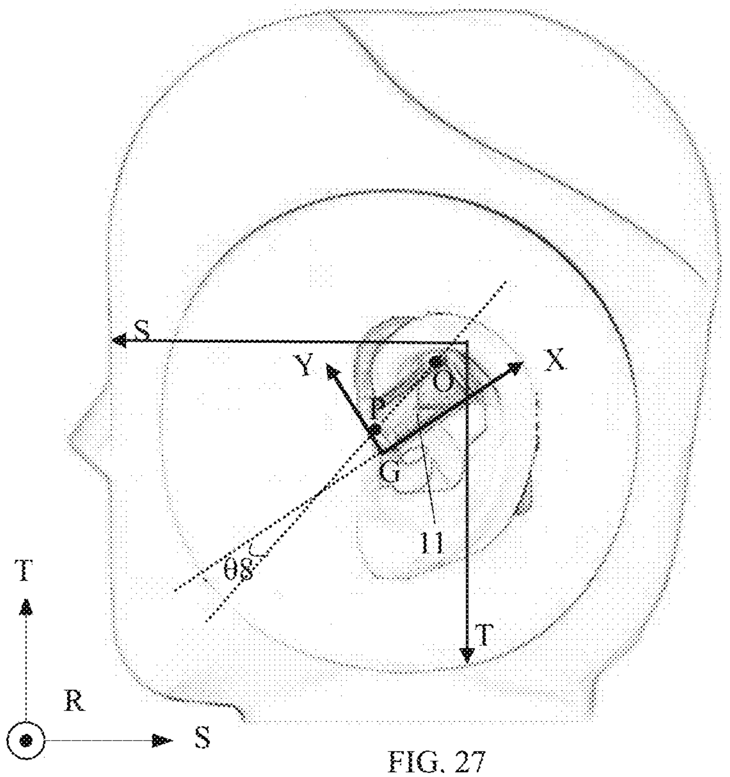
FIG. 27 is a schematic diagram illustrating an exemplary wearing state of an earphone according to some other embodiments of the present disclosure.

FIG. 27 is a schematic diagram illustrating an exemplary wearing state of an earphone according to some other embodiments of the present disclosure.

Referring to FIG. 27, a projection of the sound production component 11 on a sagittal plane may include a long axis direction X and a short axis direction Y. The long axis direction X refers to a length extension direction of the sound production component 11, and the short axis direction Y refers to a height (or width) extension direction of the sound production component 11. When the earphone 10 is in the second wearing state, the first sound hole 1191 may have a first projection point P on the sagittal plane of the user, and the second sound hole 1192 may have a second projection point O on the sagittal plane of the user. The angle between the line connecting the projection point P and the second projection point O and the long axis direction X of the projection of the sound production component 11 on the sagittal plane may be indicated as θ8. In some embodiments, the sound collection effects of the first sound hole 1191 and the second sound hole 1192 may be controlled by adjusting the angle θ8.

As shown in FIG. 27, the sagittal axis S and the vertical axis T may represent the critical directions of the line connecting the first projection point P and the second projection point O relative to the long axis direction X of the projection of the sound production component 11 on the sagittal plane. In other words, in some embodiments of the present disclosure, the direction of the line connecting the first projection point P and the second projection point O may be between the sagittal axis S and the vertical axis T, so as to improve the sound collection effects of the first microphone and the second microphone when the user speaks. In some embodiments, an angle between the line connecting the first projection point P and the second projection point O and the long axis direction X of the projection of the sound production component 11 on the sagittal plane may be indicated by taking a negative direction of the long axis direction X shown in FIG. 27 as 0° and the counterclockwise direction as the positive direction. Specifically, in some embodiments of the present disclosure, to make the first microphone and the second microphone have better sound collection effects, the θ8 may be between −45°-45°. In some embodiments, the angle θ8 may be −25°-30°. In such cases, the line connecting the first projection point P and the second projection point O may point to a region between the user's mouth and the bottom of the mandible of the user. In some embodiments, the angle θ8 may be −20°-25°. In such cases, the line connecting the first projection point P and the second projection point O may point to the region between the user's mouth and the bottom of the mandible of the user more accurately. It should be noted that, in some embodiments, the earphone may further be in the wearing state shown in FIG. 28A. In such cases, the upper or lower side of the sound production component is approximately parallel to the horizontal direction. In such cases, the angle θ8 may be between 0-90°.

Similar to the wearing state in which at least a portion of the sound production component 11 extends into the user's concha cavity, in some embodiments, when the earphone 10 is worn by the user with at least a portion of the sound production component 11 covers the antihelix region of the user, to ensure that the line connecting the first sound hole 1191 and the second sound hole 1192 has a better directivity, an angle between the line connecting the first sound hole 1191 and the second sound hole 1192 and the coronal axis of the user (such as the R axis in FIG. 27, the R axis being perpendicular to the sagittal plane of the user (S-T plane)) may be between −30°-- 135°. In some embodiments, the angle between the line connecting the first sound hole 1191 and the second sound hole 1192 and the coronal axis of the user may be between −50°--125°. In such cases, the line connecting the first sound hole 1191 and the second sound hole 1192 points to the region near the left and right sides of the user's mouth. In some embodiments, the angle between the line connecting the first sound hole 1191 and the second sound hole 1192 and the coronal axis of the user may be between −90°--115°. In such cases, the line connecting the first sound hole 1191 and the second sound hole 1192 may point to the region of the user's mouth. When the angle between the line connecting the first sound hole 1191 and the second sound hole 1192 and the coronal axis of the user is −90°, the line connecting the first sound hole 1191 and the second sound hole 1192 is parallel to the sagittal plane of the user.

In some embodiments, when the earphone 10 is in the second wearing state, a coordinate system may be established with the long axis direction X, the short axis direction Y, and the thickness direction Z of the sound production component 11, and positions of the sound hole 1191 and/or the second sound hole 1192 relative to the sound production component 11 may be indicated by the coordinates in the coordinate system. For example, the distances between the first sound hole 1191 and/or the second sound hole 1192 relative to the inner side of the sound production component 11 may be represented by Z values in the coordinate system. The distances between the first sound hole 1191 and/or the second sound hole 1191 relative to the front side of the sound production component 11 may be represented by X values in the coordinate system. The distances between the first sound hole 1191 and/or the second sound hole 1192 relative to the lower side of the sound production component 11 may be represented by Y values in the coordinate system. In some embodiments, the greater the Z value in the coordinate system, the farther the distance between the first sound hole 1191 and the inner side of the sound production component 11; the greater the X value, the farther the distance between the first sound hole 1191 and the front side of the sound production component 11; the greater the Y value, the farther the distance between the first sound hole 1191 and the lower side of the sound production component 11.

Similar to the wearing state in which at least a portion of the sound production component 11 extends into the user's concha cavity, in some embodiments, when the earphone 10 is in the second wearing mode, to make the first microphone have a better sound collection effect, a ratio of the distance between the first projection point P of the first sound hole 1191 on the sagittal plane and the projection of the front side of the sound production component 11 on the sagittal plane in the long axis direction X to a size of the projection of the sound production component 11 on the sagittal plane along the long axis direction may be not greater than 0.75. That is, when the sound production component 11 is divided into 4 equal portions along the long axis direction X, the first projection point P may be disposed in a region where X≤3. To make the first sound hole 1191 close to the user's mouth so as to improve the sound collection effect of the first microphone, in some embodiments, the ratio of the distance between the first projection point P of the first sound hole 1191 on the sagittal plane and the projection of the front side of the sound production component 11 on the sagittal plane in the long axis direction X to the size of the projection of the sound production component 11 on the sagittal plane along the long axis direction may be not greater than 0.5. In some embodiments, to make the first sound hole 1191 closer to the user's mouth so as to improve the sound collection effect of the first microphone, the ratio of the distance between the first projection point P of the first sound hole 1191 on the sagittal plane and the projection of the front side of the sound production component 11 on the sagittal plane in the long axis direction X to the size the projection of the sound production component 11 on the sagittal plane in the long axis direction may be not greater than 0.3. In some embodiments, to make the first sound hole 1191 closer to the user's mouth so as to improve the sound collection effect of the first microphone, the ratio of the distance between the first projection point P of the first sound hole 1191 on the sagittal plane and the projection of the front side of the sound production component 11 on the sagittal plane in the long axis direction X to the size of the projection of the sound production component 11 on the sagittal plane along the long axis direction may be not greater than 0.2. Moreover, the first sound hole 1191 may be disposed near the front side of the sound production component such that more choices for the position of the second sound hole 1192 may be provided, which may ensure that the second sound hole may have a specific distance from the first sound hole and that the second sound hole may be as far away from the antihelix as possible. Accordingly, in some embodiments, the ratio of the distance between the first projection point P of the first sound hole 1191 on the sagittal plane and the projection of the front side of the sound production component 11 on the sagittal plane in the long axis direction X to the size of the projection of the sound production component 11 on the sagittal plane along the in axis direction may be not greater than 0.1. In some embodiments, the first sound hole 1191 may be disposed on the front side of the sound production component 11. In such cases, the first sound hole 1191 may be closer to the user's mouth in the horizontal direction, and the sound collection effect of the first microphone may be improved.

In some embodiments, to make the first microphone have a better sound collection effect, a ratio of a distance between the first projection point P of the first sound hole 1191 on the sagittal plane and the projection of the front side of the sound production component 11 on the sagittal plane in the short axis direction Y to a size of the projection of the sound production component 11 on the sagittal plane in the short axis direction may be not greater than 0.5. That is, when the sound production component is divided into 4 equal parts along the short axis direction Y, the first projection point P is disposed in a region where Y≤2. In some embodiments, to make the first sound hole 1191 closer to the user's mouth and improve the sound collection effect of the first microphone, the ratio of the distance between the first projection point P of the first sound hole 1191 on the sagittal plane and the projection of the front side of the sound production component 11 on the sagittal plane in the short axis direction Y to the size of the projection of the sound production component 11 on the sagittal plane along the short axis direction may be not greater than 0.4. In some embodiments, the ratio of the distance between the first projection point P of the first sound hole 1191 on the sagittal plane and the projection of the front side of the sound production component 11 on the sagittal plane in the short axis direction Y to the size of the projection of the sound production component 11 on the sagittal plane along the short axis direction may be not greater than 0.3. Moreover, the first sound hole 1191 may be disposed near the lower side of the sound production component such that more choices for the position of the second sound hole 1192 may be provided, which may ensure that the second sound hole may have a specific distance from the first sound hole and that the line connecting the first sound hole and the second sound hole may point to the user's mouth more accurately. Accordingly, in some embodiments, the ratio of the distance between the first projection point P of the first sound hole 1191 on the sagittal plane and the projection of the front side of the sound production component 11 on the sagittal plane in the short axis direction Y to the size of the projection of the sound production component 11 on the sagittal plane along the short axis direction may be less than or equal to 0.1. In some embodiments, the first sound hole 1911 may be disposed on the lower side of the sound production component 11. In such cases, the first sound hole 1191 may be closer to the user's mouth in the vertical direction, and the sound collection effect of the first microphone may be improved.

Similar to the wearing state in which at least a portion of the sound production component 11 extends into the user's concha cavity, in some embodiments, when the earphone 10 is worn by the user with at least a portion of the sound production component 11 covers the antihelix region of the user, the first sound hole 1192 may be disposed on the lower side or the front side of the sound production component 11. In some embodiments, considering that when the first sound hole 1191 is too close to the inner side of the sound production component 11 (e.g., less than 2 mm), the first sound hole 1191 may be blocked by the user's ear in the wearing state, and the first microphone may collect the noise generated by a friction between the user's ear and the sound production component 11, and on the other hand, when the first sound hole 1191 is disposed on the lower side or the front side of the sound production component 11, the greater the distance between the first sound hole 1191 and the inner side of the portion 11, the smaller the volume of sound collected by the first sound hole 1191 from the user's mouth. Therefore, in some embodiments, to simultaneously improve the sound collection effect of the first sound hole 1191 and the volume of the sound collected from the user's mouth, a ratio of a distance between the first sound hole 1191 and the inner side of the sound production component 11 in the thickness direction Z to a size of the sound production component 11 along the thickness direction Z may be between 0.25-0.7. For example, in some embodiments, the ratio of the distance between the first sound hole 1191 and the inner side of the sound production component 11 in the thickness direction Z to the size of the sound production component 11 along the thickness direction Z may be between 0.25-0.65. The first sound hole 1191 may be disposed at a position with a relatively far distance from the inner side of the sound production component 11, which may reduce the influence of the noise generated by the friction between the sound production component 11 and the ear. Moreover, the distance between the first sound hole 1191 and the outer side of the sound production component 11 may be reduced such that the line connecting the first sound hole 1191 and the second sound hole 1192 may point to the user's mouth. In some embodiments, the ratio of the distance between the first sound hole 1191 and the inner side of the sound production component 11 in the thickness direction Z to the size of the sound production component 11 along the thickness direction Z may be between 0.3-0.65. In such cases, the distance between the first sound hole 1191 and the outer side of the sound production component 11 may be further reduced such that the line connecting the first sound hole 1191 and the second sound hole 1192 may point to the user's mouth more accurately.

Referring to FIG. 27, in some embodiments, the projection (or an extension line of the projection) of the front side of the sound production component 11 on the sagittal plane of the user may have an intersection point G with the projection (or an extension line of the projection) of the lower side of the sound production component 11 on the sagittal plane of the user. The greater the distance between the first projection point P of the first sound hole 1191 on the sagittal plane and the intersection G, the greater the distance between the first projection point P and the user's mouth, and the worse the sound collection effect of the first microphone. Accordingly, in some embodiments, to improve the sound collection effect of the first microphone, the distance between the first projection point P and the intersection point G may be not greater than 5 mm. In some embodiments, the distance between the first projection point and the intersection point G may be not greater than 3 mm. To improve the sound collection effect of the first microphone, the first sound hole 1191 may be disposed on the sound production component 11 closer to the user's mouth. In some embodiments, the distance between the first projection point and the intersection point G may be not greater than 1 mm, in such cases, the first sound hole 1191 may be closer to the position of the user's mouth, which may further improve the sound collection effect of the first microphone.

Similar to the wearing state in which at least a portion of the sound production component 11 extends into the user's concha cavity, in some embodiments, when the earphone 10 is worn by the user with at least a portion of the sound production component 11 covers the antihelix region of the user, the second sound hole 1192 may be disposed on a side of the sound production component 11 that does not form an auxiliary cavity with the antihelix of the user. For example, the second sound hole 1192 may be disposed on the upper side US, the lower side LS, the outer side OS, etc. of the sound production component 11. In some embodiments, the second sound hole 1192 may be disposed on the outer side OS of the sound production component 11. In some embodiments, to avoid that the distance between the second sound hole 1192 and the user's auricle is too small to affect the quality of the sound collected by the earphone 10, the distance between the second sound hole 1192 and the upper side US of the sound production component 11 may be 1 mm-3 mm. The distance between the second sound hole 1192 and the rear side FE (also referred to as an end FE of the sound production component 11) is 8 mm-12 mm. In some embodiments, the distance between the second sound hole 1192 and the upper side US may be 2 mm-2.5 mm, and the distance between the second sound hole 1192 and the rear side FE may be 9 mm-10 mm. In some embodiments, the distance between the second sound hole 1192 and the upper side US may be 2.47 mm, and the distance between the second sound hole 1192 and the rear side FE may be 9.96 mm. Similarly, to avoid that the distance between the second sound hole 1192 and the first sound hole 1191 is too small, in some embodiments, the distance between the second sound hole 1192 and the front side CE may be 8 mm-12 mm. In some embodiments, the distance between the second sound hole 1192 and the front side CE may be 8.5 mm-12 mm. In some embodiments, the distance between the second sound hole 1192 and the lower side LS may be 4 mm-8 mm. In some embodiments, the distance between the second sound hole 1192 and the lower side LS may be 6 mm-8 mm. It should be noted that, in the present disclosure, the distances from the first sound hole 1192 to the upper side, the front side, the rear side, and the lower side of the sound production component 11 refer to distances from the center of the opening of the first sound hole 1192 on the outer side of the housing of the sound production component 11 to the upper side, the front side, the rear side, and the lower side of the sound production component 11. When the side of the sound production component 11 (such as the upper side, the front side, the rear side, and the lower side) is a plane, the distance refers to the center of the opening of the first sound hole 1192 on the outer side of the housing of the sound production component 11 to the side. When the side of the sound production component 11 is a curved side, the distance refers to a distance from the center of the opening of the first sound hole 1192 on the outer side of the housing of the sound production component 11 to a tangent plane corresponding to the curved side.

Figure 28A:
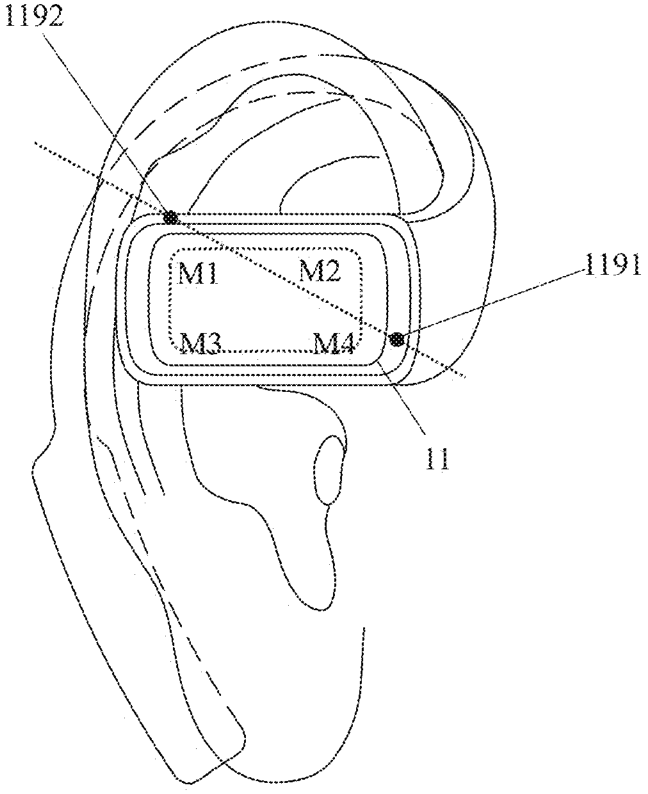
FIG. 28A is a schematic diagram illustrating an exemplary wearing state of an earphone according to some other embodiments of the present disclosure.
Figure 28B:
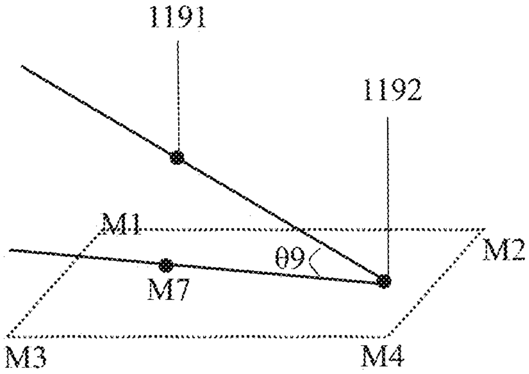
FIG. 28B is a schematic diagram illustrating an angle between a line connecting a first sound hole and a second sound hole and an outer side of a sound production component according to some embodiments of the present disclosure.

FIG. 28A is a schematic diagram illustrating an exemplary wearing state of an earphone according to some other embodiments of the present disclosure. FIG. 28B is a schematic diagram illustrating an angle between a line connecting a first sound hole and a second sound hole and an outer side of a sound production component according to some embodiments of the present disclosure.

As shown in FIGS. 28A and 28B, in some embodiments, when the earphone 10 is in the second wearing mode, an angle between a line connecting the first sound hole 1191 and the second sound hole 1192 and the outer side of the sound production component 11 may be indicated as θ9. In some embodiments, the outer side of the sound production component 11 may be a plane. In such cases, the angle between the line connecting the first sound hole and the second sound hole and the outer side may be an angle between the line connecting the first sound hole and the second sound hole and the plane. In some embodiments, the outer side of the sound production component 11 may be a curved surface, and the angle between the line connecting the first sound hole and the second sound hole and the outer side refers to an angle between the line connecting the first sound hole and the second sound hole and a plane tangent to the curved side of the outer side. Take the outer side being a plane as an example for illustration. In some embodiments, the outer side of the sound production component 11 may be indicated by four points M1, M2, M3, and M4 on the outer side. In some embodiments, the first sound hole 1191 and the second sound hole 1192 may be disposed on the same side or on different sides of the sound production component 11. For example, the first sound hole 1191 and the second sound hole 1192 may both be disposed on the outer side of the sound production component 11. As another example, the first sound hole 1191 may be disposed on the front side of the sound production component 11, and the second sound hole 1192 may be disposed on the outer side of the sound production component 11. As another example, in some embodiments, the first sound hole 1191 may be disposed on the lower side of the sound production component 11, and the second sound hole 1192 may be disposed on the outer side of the sound production component 11.

As shown in FIG. 28B, in some embodiments, the first sound hole 1191 has a projection point M7 on the outer side M1M2M3M4, and the second sound hole 1192 may be disposed on the outer side of the sound production component 11 (that is, on the plane M1M2M3M4). The angle θ9 between the line connecting the first sound hole 1191 and the second sound hole 1192 and the outer side of the sound production component 11 refers to an angle between the line connecting the projection point M7 and the second sound hole 1192 and the line connecting the first sound hole 1191 and the second sound hole. In some embodiments, when the second sound hole 1192 is not disposed on the outer side of the sound production component 11, the second sound hole 1192 may have a projection point M8 (not shown) on the outer side M1M2M3M4. The angle θ9 refers to an angle between the line connecting the projection point M7 and the projection point M8 and the line connecting the first sound hole 1191 and the second sound hole 1192. It should be understood that the angle θ9 may reflect a relative position relationship between the first sound hole 1191 and the second sound hole 1192 in the thickness direction of the sound production component 11, and may further reflect the directivity of the line connecting the first sound hole 1191 and the second sound hole 1192 relative to the user's mouth. Accordingly, in some embodiments, to make the line connecting the first sound hole 1191 and the second sound hole 1192 have a better directivity, so as to ensure that the first sound hole 1191 and the second sound hole 1192 have better sound collection effects, the angle θ9 may be between 0°-60°. In such cases, the line connecting the first sound hole 1191 and the second sound hole 1192 may approximately point to a front region of the facial region of the user such that the first microphone and the second microphone may have better sound collection effects. For example, in some embodiments, the angle θ9 may be 10°-40°. In such cases, the line connecting the first sound hole 1191 and the second sound hole 1192 may approximately point to the region near the left and right sides of the user's mouth, which may improve the sound collection effects of the first microphone and the second microphone. In some embodiments, the angle θ9 may be 25°-38°. In such cases, the line connecting the first sound collection hole 1191 and the second sound collection 1192 may point to the user's mouth, thereby further improving the sound collection effects of the first microphone and the second microphone.

For more details about the second wearing state, please refer to the descriptions described elsewhere in the present disclosure (e.g., the relevant descriptions regarding the wearing state in which at least a portion of the sound production component extends into the user's concha cavity) under the condition of no conflict, which is not repeated here.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These modifications, improvements, and amendments are suggested in the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. In addition, some features, structures, or characteristics of one or more embodiments in the present disclosure may be appropriately combined.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described. The specific embodiments described in the present disclosure are only exemplary, and one or more technical features in the specific embodiments are optional or additional, and do not constitute essential technical features of the inventive concept of the present disclosure. In other words, the protection scope of the present disclosure covers and is far greater than the specific embodiments.

What is claimed is:

1. An earphone, comprising:

a sound production component;

an ear hook configured to place the sound production component near an ear canal of a user without blocking an opening of the ear canal, at least a portion of the sound production component extending into a concha cavity of the user; and a microphone assembly, at least including a first microphone and a second microphone, the first microphone or the second microphone being disposed in the sound production component or the ear hook, the sound production component or the ear hook including a first sound hole and a second sound hole corresponding to the first microphone and the second microphone, respectively; wherein an angle between a line connecting a projection of the first sound hole on a sagittal plane of the user and a projection of a mouth of the user on the sagittal plane and a line connecting a projection of the second sound hole on the sagittal plane and the projection of the mouth of the user on the sagittal plane is not greater than 30°.

2. The earphone of claim 1, wherein the angle between the line connecting the projection of the first sound hole on the sagittal plane of the user and the projection of the mouth of the user on the sagittal plane and the line connecting the projection of the second sound hole on the sagittal plane and the projection of the mouth of the user on the sagittal plane is in a range of 5°-25°.

3. The earphone of claim 1, wherein the second sound hole is located on at least one of an upper side, a lower side, or an outer side of the sound production component.

4. The earphone of claim 1, wherein the second sound hole is located at a connection of any two of an upper side, a lower side, or an outer side of the sound production component.

5. The earphone of claim 1, wherein the second sound hole is located on an outer side of the sound production component, and a distance between the second sound hole and an upper side of the sound production component is 1 mm-3 mm.

6. The earphone of claim 1, wherein the second sound hole is located on an outer side of the sound production component, and a distance between the second sound hole and a lower side of the sound production component is 4 mm-8 mm.

7. The earphone of claim 1, wherein the second sound hole is located on an outer side of the sound production component, and a distance between the second sound hole and a rear side of the sound production component is 8 mm-12 mm.

8. The earphone of claim 1, wherein an extension line of a line connecting the projection of the first sound hole on the sagittal plane and the projection of the second sound hole on the sagittal plane has an intersection point with a projection of an antihelix of the user on the sagittal plane, a first distance is between the projection of the first sound hole on the sagittal plane and the projection of the second sound hole on the sagittal plane, a second distance is between the projection of the second sound hole on the sagittal plane and the intersection point, and a ratio of the first distance to the second distance is 1.8-4.4.

9. The earphone of claim 8, wherein the ratio of the first distance to the second distance is 2.5-3.8.

10. The earphone of claim 8, wherein the second distance is 2 mm-10 mm.

11. The earphone of claim 10, wherein the second distance is 6 mm-10 mm.

12. The earphone of claim 8, wherein the first distance is 10 mm-50 mm.

13. The earphone of claim 12, wherein the first distance is 25 mm-30 mm.

14. The earphone of claim 1, wherein an angle between a line connecting the projection of the first sound hole on the sagittal plane and the projection of the second sound hole on the sagittal plane and a line connecting a projection of a bottom of a mandible of the user on the sagittal plane and a center of a projection of the opening of the ear canal on the sagittal plane is not greater than 45°.

15. The earphone of claim 14, wherein the angle between the line connecting the projection of the first sound hole on the sagittal plane and the projection of the second sound hole on the sagittal plane and the line connecting the projection of the bottom of the mandible of the user on the sagittal plane and the center of the projection of the opening of the ear canal on the sagittal plane is in a range of 6°-35°.

16. The earphone of claim 1, wherein a diameter of the first sound hole or the second sound hole is in a range of 0.8 mm-3 mm.

17. The earphone of claim 1, wherein an acoustic resistance net is disposed at the first sound hole or the second sound hole, and a distance between the acoustic resistance net and an outer side of a housing of the sound generating sound production component is in a range of 0.5 mm-2 mm.

18. The earphone of claim 1, wherein the ear hook is disposed between an auricle and a head of the user, a portion of the ear hook close to the sound production component extends toward an anterolateral side of the auricle and connects the sound production component, the first sound hole is disposed on the portion of the ear hook close to the sound production component, and a shortest distance from the projection of the first sound hole on the sagittal plane to a connection between the sound production component and the portion of the ear hook close to the sound production component is not greater than 4 mm.

19. The earphone of claim 1, wherein a projection of the sound production component on the sagittal plane includes a long axis direction and a short axis direction, wherein a ratio of a distance between the projection of the first sound hole on the sagittal plane and a projection of a front side of the sound production component on the sagittal plane along the long axis direction to a size of the projection of the sound production component on the sagittal plane along the long axis direction is not greater than 0.75.

20. The earphone of claim 19, wherein a ratio of a distance between the projection of the first sound hole on the sagittal plane and a projection of a lower side of the sound production component on the sagittal plane along the short axis direction to a size of the projection of the sound production component on the sagittal plane along the short axis direction is not greater than 0.5.

* * * * *